US012766815B2

(12) United States Patent
Chowdhury et al.

(10) Patent No.: US 12,766,815 B2
(45) **Date of Patent: *Oct. 20, 2026**

(54) HYDROPHOBIC SILICA WET GEL AND AEROGEL

(71) Applicant: Cardinal CG Company, Eden Prairie, MN (US)

(72) Inventors: Reaz Ahmed Chowdhury, Middleton, WI (US); Kari B. Myli, Sauk City, WI (US)

(73) Assignee: Cardinal CG Company, Eden Prairie, MN (US)

( * ) Notice: Subject to any disclaimer, the term of this patent is extended or adjusted under 35 U.S.C. 154(b) by 123 days.

This patent is subject to a terminal disclaimer.

(21) Appl. No.: 18/636,421

(22) Filed: Apr. 16, 2024

(65) Prior Publication Data

US 2024/0351313 A1 Oct. 24, 2024

Related U.S. Application Data

(60) Provisional application No. 63/497,253, filed on Apr. 20, 2023.

(51) Int. Cl.

*B32B 17/06* (2006.01)
*B32B 5/18* (2006.01)
*C01B 33/16* (2006.01)

(52) U.S. Cl.

CPC .............. *B32B 17/066* (2013.01); *B32B 5/18* (2013.01); *C01B 33/163* (2013.01); (Continued)

(58) Field of Classification Search

CPC .............. B32B 17/066; B32B 2250/02; B32B 2250/44; B32B 2266/057; (Continued)

(56) References Cited

U.S. PATENT DOCUMENTS 3,672,833 A 6/1972 Teichner et al.
4,327,065 A 4/1982 Von Dardel et al.
(Continued)

FOREIGN PATENT DOCUMENTS

AU 688208 B2 3/1998
CN 102180603 A 9/2011
(Continued)

OTHER PUBLICATIONS

Rao et al., "Influence of Molar Ratios of Precursor, Catalyst, Solvent and Water on Monolithicity and Physical Properties of TMOS Silica Aerogels" Journal of Sol-Gel Science and Technology 3, Jan. 1994, 205-217 (Year: 1994).*
(Continued)

*Primary Examiner* — Richard M Rump
*Assistant Examiner* — Abdul-Rahman Yusuf Waleed Smari
(74) *Attorney, Agent, or Firm* — Fredrikson & Byron, P.A.

(57) ABSTRACT

The invention provides hydrophobic silica wet gel, hydrophobic silica aerogel, and methods that can be used to form an enhanced hydrophobic silica aerogel sheet having an advantageous combination of properties. Some embodiments of the invention provide a hydrophobic silica aerogel having advantageous properties, such as desirable performance on visible transmission, haze, or both.

23 Claims, 7 Drawing Sheets

(52) U.S. Cl.
CPC ..... *B32B 2250/02* (2013.01); *B32B 2266/057* (2016.11); *B32B 2266/126* (2016.11); *B32B 2307/412* (2013.01); *B32B 2307/72* (2013.01); *B32B 2307/73* (2013.01); *B32B 2307/7376* (2023.05)

(58) Field of Classification Search
CPC ........ B32B 2266/126; B32B 2307/412; B32B 2307/72; B32B 2307/73; B32B 2307/7376; B32B 3/06; B32B 5/18; B32B 7/05; C01B 33/1585; C01B 33/163; E06B 3/66314; E06B 3/66319; E06B 3/66328; E06B 3/6715
See application file for complete search history.

(56) References Cited

U.S. PATENT DOCUMENTS

| | | | | |
|---|---|---|---|---|
| 4,402,927 | A | 9/1983 | Von Dardel et al. | |
| 4,610,863 | A | 9/1986 | Tewari et al. | |
| 4,667,417 | A | 5/1987 | Graser et al. | |
| 5,294,480 | A | 3/1994 | Mielke et al. | |
| 5,395,805 | A | 3/1995 | Droege et al. | |
| 5,409,683 | A | 4/1995 | Tillotson et al. | |
| 5,496,527 | A | 3/1996 | Yokogawa et al. | |
| 5,587,107 | A | 12/1996 | Schwertfeger et al. | |
| 5,795,557 | A | 8/1998 | Pajonk et al. | |
| 5,830,387 | A | 11/1998 | Yokogawa et al. | |
| 5,958,363 | A | 9/1999 | Coronado | |
| 6,197,270 | B1 | 3/2001 | Sonoda et al. | |
| 6,627,305 | B1 | 9/2003 | Deane et al. | |
| 6,656,527 | B1 | 12/2003 | Gessner et al. | |
| 6,740,416 | B1 * | 5/2004 | Yokogawa | C03C 17/36 428/209 |
| 7,074,880 | B2 | 7/2006 | Rhine et al. | |
| 7,384,988 | B2 | 6/2008 | Gauthier et al. | |
| 7,560,062 | B2 | 7/2009 | Gould et al. | |
| 7,771,609 | B2 | 8/2010 | Leventis et al. | |
| 8,029,871 | B2 | 10/2011 | Nakayama et al. | |
| 8,142,856 | B2 | 3/2012 | Chevalier | |
| 8,202,502 | B2 | 6/2012 | Floess et al. | |
| 8,258,251 | B2 | 9/2012 | Meador et al. | |
| 8,298,622 | B2 | 10/2012 | Nakayama et al. | |
| 8,889,749 | B2 | 11/2014 | Suh et al. | |
| 8,906,973 | B2 | 12/2014 | Rhine et al. | |
| 9,068,346 | B1 | 6/2015 | Lu et al. | |
| 9,764,301 | B2 | 9/2017 | Joshi et al. | |
| 9,834,446 | B2 | 12/2017 | Kim et al. | |
| 9,862,614 | B2 | 1/2018 | Oh et al. | |
| 10,294,111 | B2 | 5/2019 | Kim et al. | |
| 10,336,621 | B2 | 7/2019 | Kim et al. | |
| 10,401,876 | B1 | 9/2019 | Coleman | |
| 10,421,253 | B2 | 9/2019 | Van Overmeere et al. | |
| 10,563,035 | B2 | 2/2020 | Steiner, III et al. | |
| 10,717,824 | B2 | 7/2020 | Chintapalli et al. | |
| 10,800,883 | B1 | 10/2020 | Vivod et al. | |
| 10,875,776 | B2 | 12/2020 | Sakatani et al. | |
| 10,889,501 | B2 | 1/2021 | Huang et al. | |
| 11,053,127 | B2 | 7/2021 | Pashaei Soorbaghi | |
| 11,170,750 | B2 | 11/2021 | Wang et al. | |
| 11,220,434 | B2 | 1/2022 | Kim et al. | |
| 2002/0102674 | A1 | 8/2002 | Anderson | |
| 2005/0100728 | A1 | 5/2005 | Ristic-Lehmann et al. | |
| 2006/0246806 | A1 | 11/2006 | Rhine et al. | |
| 2006/0247349 | A1 | 11/2006 | Kollmann et al. | |
| 2006/0286360 | A1 | 12/2006 | Rhine et al. | |
| 2007/0148435 | A1 | 6/2007 | Meredith et al. | |
| 2008/0081014 | A1 | 4/2008 | Ahn et al. | |
| 2008/0258065 | A1 | 10/2008 | Banks | |
| 2010/0080949 | A1 | 4/2010 | Ou et al. | |
| 2010/0144962 | A1 | 6/2010 | Jana et al. | |
| 2011/0223329 | A1 | 9/2011 | Meredith et al. | |
| 2012/0128958 | A1 | 5/2012 | Zeng et al. | |
| 2013/0136664 | A1 | 5/2013 | Bono et al. | |
| 2013/0170218 | A1 | 7/2013 | Mazurek et al. | |
| 2013/0202890 | A1 | 8/2013 | Kong et al. | |
| 2014/0065329 | A1 | 3/2014 | Showers | |
| 2014/0323589 | A1 | 10/2014 | Debreceni | |
| 2014/0350134 | A1 | 11/2014 | Rodman et al. | |
| 2015/0004087 | A1 | 1/2015 | Zettl et al. | |
| 2016/0096949 | A1 | 4/2016 | Evans et al. | |
| 2016/0160557 | A1 | 6/2016 | Kim et al. | |
| 2016/0266288 | A1 | 9/2016 | Ozcan | |
| 2017/0369326 | A1 | 12/2017 | Kim et al. | |
| 2018/0093456 | A1 | 4/2018 | Van Overmeere et al. | |
| 2018/0112054 | A1 | 4/2018 | Steiner, III et al. | |
| 2018/0264784 | A1 | 9/2018 | Murofushi et al. | |
| 2018/0264793 | A1 | 9/2018 | Kim et al. | |
| 2019/0143290 | A1 | 5/2019 | Bertino et al. | |
| 2019/0333490 | A1 | 10/2019 | Wang et al. | |
| 2020/0181347 | A1 | 6/2020 | Asefa et al. | |
| 2020/0231452 | A1 | 7/2020 | Takayasu et al. | |
| 2020/0255295 | A1 | 8/2020 | Kim et al. | |
| 2020/0353437 | A1 | 11/2020 | Bertino et al. | |
| 2020/0407231 | A1 | 12/2020 | Choi et al. | |
| 2021/0039954 | A1 | 2/2021 | Numrich et al. | |
| 2021/0207428 | A1 | 7/2021 | Pilon et al. | |
| 2021/0269317 | A1 | 9/2021 | Hsieh et al. | |
| 2022/0042370 | A1 | 2/2022 | Burrows | |
| 2022/0315431 | A1 | 10/2022 | Zenitani et al. | |
| 2023/0286810 | A1 | 9/2023 | Chowdhury et al. | |
| 2023/0286812 | A1 | 9/2023 | Chowdhury et al. | |
| 2023/0286813 | A1 | 9/2023 | Chowdhury et al. | |
| 2023/0416099 | A1 | 12/2023 | Chowdhury et al. | |
| 2024/0199835 | A1 * | 6/2024 | Chen | C08J 3/07 |
| 2024/0351313 | A1 | 10/2024 | Chowdhury et al. | |
| 2024/0351314 | A1 | 10/2024 | Chowdhury et al. | |
| 2024/0351326 | A1 | 10/2024 | Chowdhury et al. | |
| 2024/0351890 | A1 | 10/2024 | Chowdhury et al. | |
| 2024/0351891 | A1 | 10/2024 | Chowdhury et al. | |
| 2024/0359451 | A1 | 10/2024 | Chowdhury et al. | |
| 2024/0367429 | A1 | 11/2024 | Chowdhury et al. | |
| 2024/0367983 | A1 | 11/2024 | Chowdhury et al. | |
| 2025/0326203 | A1 | 10/2025 | Chowdhury et al. | |
| 2025/0326219 | A1 | 10/2025 | Chowdhury et al. | |
| 2025/0326220 | A1 | 10/2025 | Chowdhury et al. | |
| 2025/0326221 | A1 | 10/2025 | Chowdhury et al. | |
| 2025/0326647 | A1 | 10/2025 | Chowdhury et al. | |
| 2025/0326648 | A1 | 10/2025 | Chowdhury et al. | |
| 2025/0326649 | A1 | 10/2025 | Chowdhury et al. | |
| 2025/0326650 | A1 | 10/2025 | Chowdhury et al. | |

FOREIGN PATENT DOCUMENTS

| | | | |
|---|---|---|---|
| CN | 202706291 | U | 1/2013 |
| CN | 104898295 | A | 9/2015 |
| CN | 105201355 | A | 12/2015 |
| CN | 204936377 | U | 1/2016 |
| CN | 105441036 | A | 3/2016 |
| CN | 205117117 | U | 3/2016 |
| CN | 205117118 | U | 3/2016 |
| CN | 106082697 | A | 11/2016 |
| CN | 205736249 | U | 11/2016 |
| CN | 206589417 | U | 10/2017 |
| CN | 107381581 | A | 11/2017 |
| CN | 206983435 | U | 2/2018 |
| CN | 207190441 | U | 4/2018 |
| CN | 108060874 | A | 5/2018 |
| CN | 110902690 | A | 3/2020 |
| CN | 111101819 | A | 5/2020 |
| CN | 112174144 | A | 1/2021 |
| CN | 112299428 | A | 2/2021 |
| CN | 112499635 | A | 3/2021 |
| CN | 114477195 | A | 5/2022 |
| CN | 114538453 | A | 5/2022 |
| CN | 115057447 | A | 9/2022 |
| DE | 3917629 | A1 | 12/1989 |
| DE | 102006050117 | A1 | 4/2008 |
| EP | 193717 | A2 | 9/1986 |
| EP | 653377 | A1 | 5/1995 |
| EP | 849220 | A1 | 6/1998 |
| EP | 1153739 | A1 | 11/2001 |
| EP | 1414266 | A2 | 4/2004 |
| EP | 3112773 | A1 | 1/2017 |

(56) References Cited

FOREIGN PATENT DOCUMENTS

| | | | |
|---|---|---|---|
| EP | 3671291 | A1 | 6/2020 |
| GB | 2241468 | A | 9/1991 |
| JP | H06135712 | A | 5/1994 |
| JP | 11172000 | A | 6/1999 |
| JP | 2003212535 | A | 7/2003 |
| JP | 2004256628 | A | 9/2004 |
| JP | 2005132641 | A | 5/2005 |
| KR | 1020100055248 | A | 5/2010 |
| KR | 101790390 | B1 | 10/2017 |
| WO | 9203378 | A1 | 3/1992 |
| WO | 2008144634 | A2 | 11/2008 |
| WO | 2010080059 | A1 | 7/2010 |
| WO | 2010080060 | A1 | 7/2010 |
| WO | 2014019809 | A1 | 2/2014 |
| WO | 2014126490 | A1 | 8/2014 |
| WO | 2015061075 | A1 | 4/2015 |
| WO | 2015128364 | A1 | 9/2015 |
| WO | 2017090686 | A1 | 6/2017 |
| WO | 2017147463 | A1 | 8/2017 |
| WO | 2017185009 | A1 | 10/2017 |
| WO | 2017222733 | A2 | 12/2017 |
| WO | 2019241604 | A1 | 12/2019 |
| WO | 2020005965 | A1 | 1/2020 |
| WO | 2020220138 | A1 | 11/2020 |
| WO | 2024220696 | A2 | 10/2024 |
| WO | 2024220699 | A1 | 10/2024 |
| WO | 2024220701 | A1 | 10/2024 |

OTHER PUBLICATIONS

English machine translation of CN 111101819 A (Year: 2020).*

Sinko, "Influence of Chemical Conditions on the Nanoporous Structure of Silicate Aerogels". Materials 2010, 3, Published Jan. 26, 2010, pp. 704-740.

Ingale et al., "Physico-chemical properties of silica aerogels prepared from TMOS/MTMS mixtures", Journal Porous Mater 2011, 18:567-572, Published Sep. 4, 2010, pp. 6.

Dieudonne et al "Transformation of nanostructure of silica gels during drying", Journal of Non-Crystalline Solids, vol. 262, Feb. 1, 2000, pp. 155-161.

Duraes et al., "Effect of the Drying Conditions on the Microstructure of Silica Based Xerogels and Aerogels," Journal of Nanoscience and Nanotechnolgy, vol. 12, 2012, pp. 6828-6834.

Haimer et al., "Silica modified cellulosic aerogels," Cellulose, Feb. 2010, 8 pages.

Hasan et al., "Structural, out-gassing and nanomechanical properties of super-hydrophobic transparent silica aerogels developed by ambient pressure drying for space application," Bull Mater Sci (2020) 43: 287.

Krieble et al., "The Hydrolytic Cleavage of Methyl and Chloromethyl Siloxanes," The Research Laboratory, General Electric Company, Nov. 1946, pp. 2291-2294.

Mahadik et al., "Monolithic and shrinkage-free hydrophobic silica aerogels via new rapid supercritical extraction process," The Journal of Supercritical Fluids (2016), Sep. 2, 2015, pp. 84-91.

Mahadik et al., "Recoverable and thermally stable superhydrophobic silica coating," J Sol-Gel Sci Technol (2012) 62, pp. 490-494.

Nadargi et al., "Methyltriethoxysilane: New precursor for synthesizing silica aerogels," Journal of Alloys and Compounds 467 (2009), pp. 397-404.

Omranpour et al., "Mechanical properties improvement of silica aerogel through aging: Role of solvent type, time and temperature," AIP Conference Proceedings 1593 (2014), May 15, 2014, pp. 298-302.

Parale et al., "Flexible and Transparent Silica Aeroegels: An Overview" Journal of the Korean Ceramic Society vol. 54, No. 3, Published May 22, 2017, pp. 184-199.

Parale et al., "Hydrophobic TiO2—SiO2 composite aerogels synthesized via in situ epoxy-ring opening polymerization and sol-gel process for enhanced degradation activity," Ceramics International (2020), 46(4), pp. 4939-4946.

Parale et al., "Sol-gel preparation of PTMS modified hydrophobic and transparent silica coatings," J Porous Matter (2013) 20, Nov. 2, 2012, pp. 733-739.

Pisal et al., "Development of hydrophobic and optically transparent monolithic silica aerogels for window panel applications," Crossmark J Porous Mater (2017) 24, Oct. 26, 2016, pp. 685-695.

Rao et al, "Effect of methyltrimethoxysilane as a co-precursor on the optical properties of silica aerogels," Journal of Non-Crystalline Solids (2001), 285, Issues 1-3, pp. 202-209.

Rao et al, "Hydrophobic and physical properties of the ambient pressure dried silica aerogels with sodium silicate precursor using various surface modification agents," Applied Surface Science 253 (2007) pp. 6032-6040.

Rao et al., "Superhydrophobic silica aerogels based on methyltrimethoxysilane precursor", Journal of Non-Crystalline Solids 330, 2003, pp. 187-195.

Ren et al., "One-step fabrication of transparent hydrophobic silica aerogels via in situ surface modification in drying process," J Sol-Gel Sci Technol (2016) 80, pp. 635-641.

Scherer et al., "Effect of Shrinkage on the Modulus of Silica Gel," Nov. 17, 1988, Journal of Non-Crystalline Solids 109 (1989), pp. 183-190.

Shafi et al., "Superhydrophobic, enhanced strength and thermal insulation silica aerogel/glass fiber felt based on methyltrimethoxysilane precursor and silica gel impregnation." Journal of Porous Materials, 2019, 8 pages.

Silva et al., "Acid and Base Catalysts in the Hybrid Silica Sol-Gel Process," Journal of Colloid and Interface Science 195, May 12, 1997, pp. 381-387.

Smitha et al., "Synthesis of biocompatible hydrophobic silica-gelatin nano-hybrid by sol-gel process," Colloids and Surfaces B: Biointerfaces 55, Nov. 17, 2006, pp. 38-43.

Smitha et al., "Transparent and Hydrophobic MTMS/GPTMS Hybrid Aerogel Monoliths and Coatings by Sol-Gel Method: A Viable Remedy for Oil-Spill Cleanup," ChemistrySelect (2018), 3, pp. 2989-2997.

Strobach et al., "Optically Transparent, Thermally Insulating and Soundproofing (OTTIS) Aerogel for High-efficiency Window Applications," Massachusetts Institute of Technology, Department of Mechanical Engineering (2020)—120 pages.

Su et al., "A review on the emerging resilient and multifunctional ceramic aerogels," Journal of Materials Science & Technology 75 (2021), Oct. 19, 2020, pp. 1-13.

Tabata "Transparent tiles of Silica Aerogels for High-Energy Physics" Feb. 14, 2019, pp. 31.

Tabata et al "Hydrophobic silica aerogel production at KEK", Nuclear Instruments & Methods in Physics Research, A, vol. 668, Dec. 5, 2011, pp. 64-70.

Tabata et al., "Large-area silica aerogel for use as Cherenkov radiators with high refractive index, developed by supercritical carbon dioxide drying," The Journal of Supercritical Fluids (2016) 110, pp. 183-192.

Wei et al., "Transparent, hydrophobic composite aerogels with high mechanical strength and low high-temperature thermal conductivities," J. Phys. Chem. B (2008) 112, pp. 11881-11886.

Wong et al., "Mechanical and thermal properties of nanofibrillated cellulose reinforced silica aerogel composites," Microporous and Mesoporous Materials 217, 2015, pp. 150-158.

Yoda et al., "Supercritical drying media modification for silica aerogel preparation," Journal of Non-Crystalline Solids 248 (1999), Aug. 25, 1998, pp. 224-234.

Cao et al., "Improving the visible transparency of silica aerogels", Journal of Non-Crystalline Solids, North-Holland Physics Publishing, vol. 176, No. 1, Oct. 2, 1994, pp. 18-25.

International Searching Authority "International Search Report and Written Opinion" From Application No. PCT/US2024/025239, Mailed Sep. 11, 2024, pp. 11.

Rao et al., "Effect of methyltrimethoxysilane as a synthesis component on the hydrophobicity and some physical properties of silica aerogels", Microporous and Mesoporous Materials, 30, 1999, pp. 267-273.

Pierre et al., "Chemistry of Aerogels and Their Applications", Chemistry Reviews, vol. 102, No. 11, 2002, pp. 4243-4265.

(56) References Cited

OTHER PUBLICATIONS

Buratti et al., "Glazing Systems with Silica Aerogel for energy Savings in Buildings" , Applied Energy, 98, Apr. 27, 2012, pp. 396-403.
Gao et al., "Synthesis and Characterization of Aerogel Glass Materials for Window Glazing Applications", Advances in Bioceramics and Porous Ceramics VII, 2015, pp. 141-150.
Pajonk et al., "Optical Transmission Properties of Silica Aerogels Prepared from Polyethoxidisiloxanes", Journal of Non-Crystalline Solids, 210, 1997, pp. 224-231.
Pajonk, "Transparent Silica Aerogels", Journal of Non-Crystalline Solids, 225, 1998, pp. 307-314.
Rubin et al., "Transparent Silica Aerogels for Window Insulation", Solar Energy Materials, 7, 1983, pp. 393-400.
Tajiri et al., "Effects of Supercritical Drying Media on Structure and Properties of Silica Aerogel", Journal of Non-Crystalline Solids, 186, 1995, pp. 83-87.
Berardi et al., "The development of a monolithic aerogel glazed window for an energy retrofitting project", Applied Energy, 154, 2015, pp. 603-615.
Buratti et al., "Experimental performance evaluation of aerogel glazing systems", Applied Energy, 97, 2012, pp. 430-437.
Buttner et al., "Thermal Loss Coefficients of Low-Density Silica Aerogel Tiles", Solar Energy, vol. 40, No. 1, 1988, pp. 13-15.
Duer et al., "Monolithic Silica Aerogel in Superinsulating Glazings", Solar Energy, vol. 63, No. 4, 1998, pp. 259-267.
Iswar et al., "Dense and strong, but superinsulating silica aerogel", Acta Materialia, 213, 116959, May 9, 2021, pp. 9.
Lei et al., "Tailoring structural and physical properties of polymethylsilsesquioxane aerogels by adjusting NH3 * H20 concentration", Microporous and Mesoporous Materials, 258, 2018, pp. 236-243.
Merli et al., "Acoustic measurements on monolithic aerogel samples and application of the selected solutions to standard window systems", Applied Acoustics, 142, 2018, pp. 123-131.
Schultz et al., "Evacuated Aerogel Glazings", Vacuum, 82, 2008, pp. 723-729.
Sisib Silicones, "Methyl Silicate 51", retrieved from <URL: http://www.powerchemical.net/silanes/5411.html>, retrieved Apr. 28, 2026, Published 2014, pp. 2.
Yokogawa et al., "Hydrophobic silica aerogels", Journal of Non-Crystaline Solids, 186, 1995, pp. 23-19.
Zhao et al., "Theoretical and experimental investigation of haze in transparent aerogels", Optics Express, 27(4), Feb. 18, 2019, pp. A39-A50.

* cited by examiner

HYDROPHOBIC SILICA WET GEL AND AEROGEL

RELATED APPLICATIONS

This application claims priority to U.S. Provisional Patent Application No. 63/497,253, filed Apr. 20, 2023.

FIELD OF THE INVENTION

The present invention relates to hydrophobic silica wet gel and methods of making hydrophobic silica wet gel. The invention also relates to hydrophobic transparent silica aerogel and methods of making hydrophobic transparent silica aerogel. Additionally, the invention relates to hydrophobic transparent silica aerogel sheets and methods of making hydrophobic transparent silica aerogel sheets. Further, the invention relates to an article having a glass sheet and a hydrophobic transparent silica aerogel sheet, and methods of making such an article. Still further, the invention relates to an insulating glazing unit having a hydrophobic transparent silica aerogel sheet between two glass sheets, and methods of making such an insulating glazing unit. Further yet, the invention relates to a laminated glass assembly having a hydrophobic transparent silica aerogel sheet between glass sheets, and methods of making such a laminated glass assembly.

BACKGROUND OF THE INVENTION

Silica aerogels are thermally insulating materials that have applications in a number of different industries. However, silica aerogels have had limited applications in windows because they have not traditionally achieved the right combination of mechanical, thermal and optical properties to be fully acceptable for all such applications. Researchers have experimented with many different precursor recipes and methods in the hope of producing silica aerogel with an optimum combination of mechanical, thermal and optical properties but have been unsuccessful. While some recipes and methods led to certain properties being optimized, other properties were compromised.

One property desirable for window applications is high visible transmission. When silica aerogel is provided as part of certain windows, it must be transparent to be considered optically acceptable. Another desirable property is low haze. Silica aerogel must have low haze to be ideal for use with many windows. Still another desirable property is moisture resistance. Silica aerogels tend to be hydrophilic and thus prone to deterioration of several different properties when exposed to enough moisture. Too much moisture exposure can cause undesirable optical defects, such as reduction in visible transmission and increase in haze. Since some amount of moisture is often present inside insulating glazing units, it is desirable for silica aerogel to be hydrophobic. Hydrophobic silica aerogel can resist deterioration from moisture, making it particularly advantageous for use in window applications.

Researchers have attempted to produce transparent hydrophobic silica aerogel. However, while researchers have found certain recipes and methods that produce hydrophobic silica aerogel, the resulting aerogel was characterized by lower visible transmission, too much haze, or both. Moreover, existing methods for making silica aerogel hydrophobic have not been ideal for commercial use. For example, some prior methods involve using hydrophobic agents in the production process. These agents, however, may cause an increase in haze and a reduction in visible transmission. Researchers have tried to mitigate this undesirable effect by adding processing steps. One other mitigation step is to add expensive surfactants to control particle size in the silica wet gel. However, the wet gels then must be subjected to further processing, such as excessive solvent baths using expensive solvents, to remove the surfactants and excess hydrophobic agents. This additional processing is not only expensive, but it can actually cause deterioration in optical properties of the resulting silica aerogel.

It would be desirable to provide hydrophobic silica aerogel having a desirable combination of mechanical, thermal and/or optical properties. It would be particularly desirable to provide silica aerogel that is hydrophobic in combination with having high visible transmission and low haze, optionally together with certain advantageous mechanical properties. It would also be desirable to provide methods of making high quality hydrophobic silica aerogel that are commercially feasible and do not require expensive or excessive processing.

SUMMARY OF THE INVENTION

Figure 1:
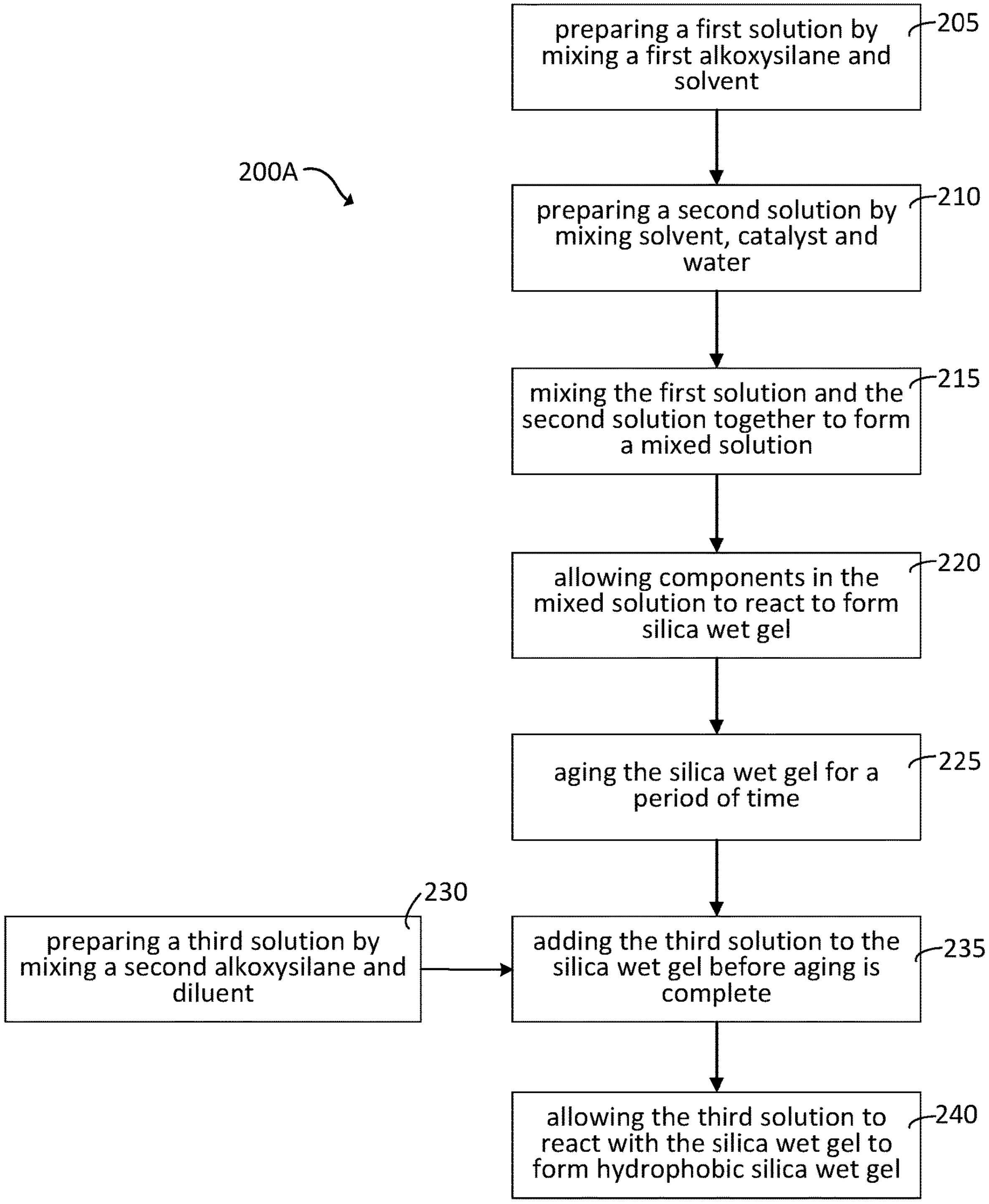
FIG. 1 is a flow chart depicting a method of making hydrophobic silica wet gel in accordance with certain embodiments.

Some embodiments provide a kit for preparing a hydrophobic silica aerogel sheet. The kit can comprise a first solution, a second solution and a third solution. The first solution can comprise tetramethyl orthosilicate (also known as tetramethoxysilane) ("TMOS") and solvent. The second solution can comprise solvent, ammonium hydroxide and water. The third solution can comprise methyltrimethoxysilane ("MTMS") and diluent. Also, the solvent can be selected from methanol, ethanol, 2-propanol, acetone, N,N-demethylformadide and demethylsulfoxide, and in some cases is methanol. The diluent can also be methanol in many cases. The TMOS and MTMS are provided in a controlled amount selected to provide a molar ratio of TMOS:MTMS of greater than or equal to 3.7:1 and less than or equal to 9.2:1.

Other embodiments provide a method of making a hydrophobic silica wet gel having a density of between 100 mg/cc and 200 mg/cc. The method can include the steps of: preparing a first solution by mixing TMOS and solvent;

preparing a second solution by mixing solvent, ammonium hydroxide and water;

mixing the first solution and the second solution together to form a mixed solution;

allowing components in the mixed solution to react to form silica wet gel;

preparing a third solution by mixing MTMS and diluent;

adding the third solution to the silica wet gel; and allowing the third solution to react with the silica wet gel to form hydrophobic silica wet gel.

The TMOS and MTMS are provided in a controlled amount selected to provide a molar ratio of TMOS:MTMS of greater than or equal to 3.7:1 and less than or equal to 9.2:1. In other cases, the molar ratio of TMOS:MTMS is greater than or equal to 3.8:1 and less than or equal to 6.11:1.

In other cases, the method makes a hydrophobic silica wet gel with a density between 120 mg/cc and 200 mg/cc, and the molar ratio of TMOS:MTMS is greater than or equal to 4.6:1 and less than or equal to 9.2:1, for example greater than or equal to 4.83:1 and less than or equal to 6.11:1. In yet other cases, the method makes a hydrophobic silica wet gel with a density between 120 mg/cc and 150 mg/cc, and the molar ratio of TMOS:MTMS is greater than or equal to 4.6:1 and less than or equal to 6.9:1, for example greater than or equal to 4.83:1 and less than or equal to 5.79:1.

The method of making a hydrophobic silica wet gel can further include a step of aging the silica wet gel for a time period of at least 7 days (168 hours), at least 8 days (192 hours), at least 9 days (216 hours) or at least 10 days (240 hours). Further, the solvent can be selected from methanol, ethanol, 2-propanol, acetone, N,N-demethylformadide and demethylsulfoxide, and in some cases is methanol. The diluent can also be methanol in many cases.

Other embodiments include a method of making a hydrophobic silica aerogel that includes steps for making a hydrophobic silica aerogel discussed herein in addition to a step of drying the hydrophobic silica wet gel to form hydrophobic silica aerogel. Also, the drying step can involve subjecting the hydrophobic silica wet gel to drying to form the hydrophobic silica aerogel with a shrinkage value of 4% or less, for example 3.5% or less, 3% or less, 2.5% or less, 2% or less or 1.75% or less.

Additional embodiments provide a hydrophobic silica aerogel synthesized from a precursor material and a hydrophobic agent. The hydrophobic silica aerogel can have a density of between 100 mg/cc and 200 mg/cc. The precursor material can comprise TMOS and the hydrophobic agent can comprise MTMS. The TMOS and MTMS are provided in a controlled amount selected to provide a molar ratio of methyl silicate 51:MTMS of greater than or equal to 3.7:1 and less than or equal to 9.2:1. In other cases, the molar ratio of TMOS:MTMS can be greater than or equal to 3.8:1 and less than or equal to 6.11:1.

In other cases, the density is between 120 mg/cc and 200 mg/cc, and the molar ratio of TMOS:MTMS is greater than or equal to 4.6:1 and less than or equal to 9.2:1, for example greater than or equal to 4.83:1 and less than or equal to 6.11:1. In yet other cases, the density is between 120 mg/cc and 150 mg/cc and the molar ratio of TMOS:MTMS is greater than or equal to 4.6:1 and less than or equal to 6.9:1, for example greater than or equal to 4.83:1 and less than or equal to 5.79:1.

In certain cases, the precursor material comprises TMOS, solvent, water and ammonium hydroxide. The solvent can be selected from methanol, ethanol, 2-propanol, acetone, N,N-demethylformadide and demethylsulfoxide, and in many cases is methanol. Also, in certain cases, the hydrophobic agent comprises the MTMS and a diluent. The diluent can be methanol in many cases.

The hydrophobic silica aerogel can be in the form of a hydrophobic silica aerogel sheet. In some cases, the hydrophobic silica aerogel sheet has a thickness of between 2 mm and 5 mm. Additionally or alternatively, the hydrophobic silica aerogel can have a visible transmission of at least 97.8% and a haze value of 3% or less, for example a visible transmission of at least 98% and a haze value of 3% or less, a visible transmission of at least 98.6% and a haze value of 2.5% or less, or a visible transmission of at least 99% and a haze value of 2% or less. Also, the hydrophobic silica aerogel can have a water contact angle of at least 90°, for example at least 100° or at least 110°.

Other embodiments provide an article comprising a glass substrate and a hydrophobic silica aerogel sheet, the hydrophobic silica aerogel sheet being adhered to the glass substrate. Additional embodiments provide an insulating glazing unit comprising two glass sheets and a between-pane space, the between-pane space being located between the two glass sheets, the insulating glazing unit further comprising a hydrophobic silica aerogel sheet received in the between-pane space. The hydrophobic silica aerogel sheet can be adhered to an interior surface of one of the two glass sheets. Further embodiments provide a laminated glass assembly comprising two glass sheets and a hydrophobic silica aerogel sheet between the two glass sheets. The hydrophobic silica aerogel sheet in these embodiments can have any of the features described herein.

DETAILED DESCRIPTION OF PREFERRED EMBODIMENTS

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

In the present specification, anywhere the terms "comprising" or "comprises" are used, those terms have their ordinary, open-ended meaning. In addition, where appropriate, the disclosure at each such location is to be understood to also disclose that it may, as an alternative, "consist essentially of" or "consist of."

Applicant has developed precursor materials, hydrophobic silica wet gel, hydrophobic silica aerogel and methods of making such materials that can be used to form enhanced silica aerogel sheets. The enhanced silica aerogel sheets can achieve an exceptional, surprising combination of optical, thermal and/or mechanical properties, which makes them highly advantageous for use in window applications.

The term "silica wet gel" refers to a material that is obtained by allowing components of a precursor material to react to form silica wet gel. The precursor material serves as an intermediate product that is used to form silica wet gel. Also, the term "silica aerogel" refers to material that is obtained by removing liquid from silica wet gel material and replacing the liquid with gas or vacuum. Further, the term "hydrophobic silica wet gel" refers to silica wet gel that resists absorbing moisture. Likewise, the term "hydrophobic silica aerogel" refers to silica aerogel that resists absorbing moisture.

Certain embodiments provide a precursor material and a hydrophobic agent for synthesizing a hydrophobic silica wet gel. The precursor material serves as an intermediate product that is used to form silica wet gel, which is treated with the hydrophobic agent to form a hydrophobic silica wet gel. The precursor material comprises a first alkoxysilane, and the hydrophobic agent comprises a second alkoxysilane.

Several reactions take place during silica wet gel synthesis: hydrolysis, condensation, nucleation and growth. These various reactions can have different reaction rates depending on the components used for the precursor material. The reaction rates affect mechanical, thermal and optical properties of a resulting silica aerogel. Thus, the resulting aerogel is extremely sensitive to variations in precursor material components and percentage of components. As an example, the hydrolysis reaction rate is determined by the amount of catalyst in the precursor material. The hydrolysis reaction is also exothermic, so it imparts heat to the precursor material, which in turn accelerates the condensation reaction rate. As a consequence, too much catalyst can accelerate the condensation reaction rate. Accelerated condensation reaction rates are undesirable since they can lead to an accelerated nucleation rate and an accelerated growth rate. Furthermore, if the growth rate exceeds the nucleation rate, the three-dimensional polymer structure will have unduly large particle sizes. Larger particle sizes create more scattering of light, which in turn leads to undesirable properties such as increased haze and reduced visible transmission. All of these variabilities make silica wet gel and aerogel synthesis unpredictable. Even more unpredictability occurs when hydrophobic agents are added to the synthesis process, since hydrophobic agents may agglomerate and cause increased haze and reduced visible transmission.

In some embodiments, the precursor material comprises TMOS, solvent, water and base catalyst. The hydrophobic agent comprises MTMS. Applicant has identified a "sweet spot" of weight percentage ranges for these components along with a molar ratio range of TMOS:MTMS that can be used to form hydrophobic silica wet gel and hydrophobic silica aerogel having a surprising combination of optical, mechanical and/or thermal properties. Particular embodiments using specific methods, weight percentages and molar ratios will be discussed.

In some cases, components in a first solution, a second solution, a third solution, a fourth solution and a fifth solution are present within selected weight percentages. Again, Applicant has identified recipe components along with a "sweet spot" of weight percentage ranges that can be used to form hydrophobic silica wet gel and hydrophobic silica aerogel having an exceptional combination of properties.

As used herein, "weight percent" refers to weight percent of a component in a single solution used to form hydrophobic wet gel (e.g., in the first solution, the second solution or the third solution). Further, as used herein, "total weight percent" refers to total weight percent of a component used to form hydrophobic silica wet gel. For example, if three solutions are used to form the hydrophobic silica wet gel, the total weight percent of a component is the total weight percent of that component in the combination of the first solution, the second solution and the third solution.

Embodiments of Method 200A

Some embodiments provide a method of making a hydrophobic silica wet gel. FIG. 1 illustrates a method 200A of preparing a hydrophobic silica wet gel according to certain embodiments. The method 200A includes a step 205 of preparing a first solution by mixing a first alkoxysilane and solvent, a step 210 of preparing a second solution by mixing solvent, catalyst and water, a step 215 of mixing the first solution and the second solution together to form a mixed solution, a step 220 of allowing components in the mixed solution to react to form silica wet gel, a step 225 of aging the silica wet gel for a period of time, a step 230 of preparing a third solution by mixing a second alkoxysilane and diluent, a step 235 of adding the third solution to the silica wet gel before aging is complete, and a step 240 of allowing the third solution to react with the silica wet gel to form hydrophobic silica wet gel. In method 200A, hydrophobic treatment is performed before the silica wet gel aging is complete.

In certain cases, step 205 comprises preparing the first solution by mixing a first alkoxysilane and methanol, step 210 comprises preparing a second solution by mixing methanol, ammonium hydroxide and water, and step 230 comprises preparing a third solution by mixing an organosilane and methanol. In preferred embodiments of the method 200A, TMOS is used as the first alkoxysilane and MTMS is used as the second alkoxysilane. The step 205 comprises preparing a first solution by mixing TMOS and methanol, step 210 comprises preparing a second solution by mixing methanol, ammonium hydroxide and water, and step 230 comprises preparing a third solution by mixing MTMS and methanol.

Applicant has found that TMOS provides desirable results when used as the first alkoxysilane because the resulting silica aerogel has less scattering of light and thus reduced haze and increased transmissivity. For commercial window applications, aerogel particle size is desirably less than 5 nm to have the lowest possible light scattering and thus acceptable haze and transmissivity. Also, in some cases, the precursor material comprises methanol as the solvent. Applicant has discovered that by using methanol as the solvent, the resulting aerogel material has less haze and less optical distortion than with other solvents. In certain cases, the precursor material comprises ammonium hydroxide as the catalyst. Applicant has discovered that by using ammonium hydroxide as the catalyst, the resulting aerogel material has less haze and less optical distortion than with other catalysts.

In some embodiments, the method 200A makes a hydrophobic silica wet gel having a density of between 100 mg/cc and 200 mg/cc, and the TMOS and MTMS can be provided in a controlled amount selected to provide a molar ratio of TMOS:MTMS of greater than or equal to 3.7:1 and less than or equal to 9.2:1, for example greater than or equal to 3.8:1 and less than or equal to 6.11:1. In other cases, the density is between 120 mg/cc and 200 mg/cc, and the molar ratio of TMOS:MTMS is greater than or equal to 4.6:1 and less than or equal to 9.2:1, for example greater than or equal to 4.83:1 and less than or equal to 6.11:1. In yet other cases, the density is between 120 mg/cc and 150 mg/cc and the molar ratio of TMOS:MTMS is greater than or equal to 4.6:1 and less than or equal to 6.9:1, for example greater than or equal to 4.83:1 and less than or equal to 5.79:1.

In further embodiments, the density of the hydrophobic silica wet gel is between 100 mg/cc and 200 mg/cc and the TMOS is provided having a total weight percent of greater than or equal to 13.8% and less than or equal to 31% and the MTMS is provided having a total weight percent of greater than or equal to 3.2% and less than or equal to 4.6%. The total weight percent represents a total weight percent of a component in the first, second and third solutions. As an example, in certain cases, the total weight percent of the TMOS is greater than or equal to 13.8% and less than or equal to 31%, the total weight percent of the MTMS is greater than or equal to 3.2% and less than or equal to 4.6%, the methanol has a total weight percent of greater than or equal to 53.4% and less than or equal to 71.3%, the water has a total weight percent of greater than or equal to 10.6% and less than or equal to 13.7%, and the ammonium hydroxide has a total weight percent of greater than or equal to 0.034% and less than or equal to 0.126%. In another example, the total weight percent of the TMOS is greater than or equal to 13.8% and less than or equal to 31%, the total weight percent of the MTMS is greater than or equal to 3.2% and less than or equal to 4.6%, the methanol has a total weight percent of greater than or equal to 53.4% and less than or equal to 71.3%, the water has a total weight percent of greater than or equal to 11% and less than or equal to 11.8%, and the ammonium hydroxide has a total weight percent of greater than or equal to 0.034% and less than or equal to 0.038%.

Also, in some cases, the density of the hydrophobic silica wet gel is between 120 mg/cc and 200 mg/cc and the total weight percent of the TMOS is greater than or equal to 16.9% and less than or equal to 31%, and the total weight percent of the MTMS is greater than or equal to 2.6% and less than or equal to 4.6%. For example, in certain cases, the total weight percent of the TMOS is greater than or equal to 16.9% and less than or equal to 31%, the total weight percent of the MTMS is greater than or equal to 2.6% and less than or equal to 4.6%, the methanol has a total weight percent of greater than or equal to 53.4% and less than or equal to 68.5%, the water has a total weight percent of greater than or equal to 10.6% and less than or equal to 13.7%, and the ammonium hydroxide has a total weight percent of greater than or equal to 0.034% and less than or equal to 0.126%. In another example, the total weight percent of the TMOS is greater than or equal to 16.9% and less than or equal to 31%, the total weight percent of the MTMS is greater than or equal to 3.1% and less than or equal to 4.6%, the methanol has a total weight percent of greater than or equal to 53.4% and less than or equal to 68.5%, the water has a total weight percent of greater than or equal to 11% and less than or equal to 11.5%, and the ammonium hydroxide has a total weight percent of greater than or equal to 0.034% and less than or equal to 0.037%.

Also, in some cases, the density of the hydrophobic silica wet gel is between 120 mg/cc and 150 mg/cc and the total weight percent of the TMOS is greater than or equal to 16.9% and less than or equal to 24.7% and the total weight percent of the MTMS is greater than or equal to 2.9% and less than or equal to 3.9%. For example, in certain cases, the total weight percent of the TMOS is greater than or equal to 16.9% and less than or equal to 24.7%, the total weight percent of the MTMS is greater than or equal to 2.9% and less than or equal to 3.9%, the methanol has a total weight percent of greater than or equal to 60.3% and less than or equal to 68.5%, the water has a total weight percent of greater than or equal to 10.6% and less than or equal to 11.5%, and the ammonium hydroxide has a total weight percent of greater than or equal to 0.034% and less than or equal to 0.13%. In another example, the total weight percent of the TMOS is greater than or equal to 16.9% and less than or equal to 24.7%, the total weight percent of the MTMS is greater than or equal to 3.1% and less than or equal to 3.9%, the methanol has a total weight percent of greater than or equal to 60.3% and less than or equal to 68.5%, the water has a total weight percent of greater than or equal to 11.1% and less than or equal to 11.5%, and the ammonium hydroxide has a total weight percent of greater than or equal to 0.034% and less than or equal to 0.037%.

Even further, in some cases where it is desired to obtain a hydrophobic silica wet gel with a density between 100 mg/cc and 200 mg/cc, the first solution comprises TMOS at a weight percent of greater than or equal to 38.1% and less than or equal to 68.4% and methanol at a weight percent of greater than or equal to 31.6% and less than or equal to 61.9%, the second solution comprises methanol at a weight percent of greater than or equal to 54.9% and less than or equal to 65.7%, water at a weight percent of greater than or equal to 33.9% and less than or equal to 44.7%, and ammonium hydroxide at a weight percent of greater than or equal to 0.10% and less than or equal to 0.42%, and the third solution comprises methanol at a weight percent of greater than or equal to 84.5% and less than or equal to 89.2% and MTMS at a weight percent of greater than or equal to 10.8% and less than or equal to 15.5%. In another example, the first solution comprises TMOS at a weight percent of greater than or equal to 38.1% and less than or equal to 68.4% and methanol at a weight percent of greater than or equal to 31.6% and less than or equal to 61.9%, the second solution comprises methanol at a weight percent of greater than or equal to 56.3% and less than or equal to 65.7%, water at a weight percent of greater than or equal to 34.2% and less than or equal to 43.5%, and ammonium hydroxide at a weight percent of greater than or equal to 0.10% and less than or equal to 0.15%, and the third solution comprises methanol at a weight percent of greater than or equal to 84.5% and less than or equal to 89.2% and MTMS at a weight percent of greater than or equal to 10.8% and less than or equal to 15.5%.

In other cases where it is desired to obtain a hydrophobic silica wet gel with a density between 120 mg/cc and 200 mg/cc, the first solution comprises TMOS at a weight percent of greater than or equal to 44.2% and less than or equal to 68.4% and methanol at a weight percent of greater than or equal to 31.6% and less than or equal to 55.8%, the second solution comprises methanol at a weight percent of greater than or equal to 54.9% and less than or equal 65%, water at a weight percent of greater than or equal to 34.6% and less than or equal to 44.7%, and ammonium hydroxide at a weight percent of greater than or equal to 0.10% and less than or equal to 0.42%, and the third solution comprises methanol at a weight percent of greater than or equal to 84.5% and less than or equal to 89.2% and MTMS at a weight percent of greater than or equal to 10.8% and less than or equal to 15.5%. In another example, the first solution comprises TMOS at a weight percent of greater than or equal to 44.2% and less than or equal to 68.4% and methanol at a weight percent of greater than or equal to 31.6% and less than or equal to 55.8%, the second solution comprises methanol at a weight percent of greater than or equal to 56.3% and less than or equal 65%, water at a weight percent of greater than or equal to 34.9% and less than or equal to 43.5%, and ammonium hydroxide at a weight percent of greater than or equal to 0.10% and less than or equal to 0.15%, and the third solution comprises methanol at a weight percent of greater than or equal to 84.5% and less than or equal to 89.2% and MTMS at a weight percent of greater than or equal to 10.8% and less than or equal to 15.5%.

In yet other cases where it is desired to obtain a hydrophobic silica wet gel with a density between 120 mg/cc and 150 mg/cc, the first solution comprises TMOS at a weight percent of greater than or equal to 44.2% and less than or equal to 58.4% and methanol at a weight percent of greater than or equal to 41.6% and less than or equal to 55.8%, the second solution comprises methanol at a weight percent of greater than or equal to 61.1% and less than or equal to 65%, water at a weight percent of greater than or equal to 34.6% and less than or equal to 38.8%, and ammonium hydroxide at a weight percent of greater than or equal to 0.10% and less than or equal to 0.38%, and the third solution comprises methanol at a weight percent of greater than or equal to 86.8% and less than or equal to 89.2% and MTMS at a weight percent of greater than or equal to 10.8% and less than or equal to 13.2%. In another example, the first solution comprises TMOS at a weight percent of greater than or equal to 44.2% and less than or equal to 58.4% and methanol at a weight percent of greater than or equal to 41.6% and less than or equal to 55.8%, the second solution comprises methanol at a weight percent of greater than or equal to 61.1% and less than or equal to 65%, water at a weight percent of greater than or equal to 34.9% and less than or equal to 38.8%, and ammonium hydroxide at a weight percent of greater than or equal to 0.10% and less than or equal to 0.13%, and the third solution comprises methanol at a weight percent of greater than or equal to 86.8% and less than or equal to 89.2% and MTMS at a weight percent of greater than or equal to 10.8% and less than or equal to 13.2%.

Specific embodiments of the method 200A will now be described. In some embodiments of the method 200A, TMOS and MTMS are provided in a controlled amount to provide a molar ratio of the TMOS:MTMS of greater than or equal to 3.7:1 and less than or equal to 9.2:1. In specific cases, the molar ratio is greater than or equal to 3.7:1 and less than or equal to 6.9:1, such as greater than or equal to 3.7:1 and less than or equal to 4.6:1. In further cases, the molar ratio is greater than or equal to 4.6:1 and less than or equal to 9.2:1, such as greater than or equal to 4.6:1 and less than or equal to 6.9:1.

Also, in some cases, the TMOS has a total weight percent of greater than or equal to 13.821% and less than or equal to 28.368% and the MTMS has a total weight percent of greater than or equal to 2.63% and less than or equal to 3.204%. In certain cases, the TMOS has a total weight percent of greater than or equal to 13.821% and less than or equal to 23.676% and the MTMS has a total weight percent of greater than or equal to 2.927% and less than or equal to 3.204%. In yet other cases, the TMOS has a total weight percent of greater than or equal to 13.821% and less than or equal to 16.915% and the MTMS has a total weight percent of greater than or equal to 3.137% and less than or equal to 3.204%. In further cases, the TMOS has a total weight percent of greater than or equal to 16.915% and less than or equal to 28.368% and the MTMS has a total weight percent of greater than or equal to 2.63% and less than or equal to 3.137%. In even further cases, the TMOS has a total weight percent of greater than or equal to 16.915% and less than or equal to 23.676% and the MTMS has a total weight percent of greater than or equal to 2.927% and less than or equal to 3.137%.

In some embodiments, the first solution comprises TMOS at a weight percent of greater than or equal to 38.17% and less than or equal to 62.82% and methanol at a weight percent of greater than or equal to 37.18% and less than or equal to 61.87%, the second solution comprises methanol at a weight percent of greater than or equal to 54.96% and less than or equal to 65.66%, water at a weight percent of greater than or equal to 33.98% and less than or equal to 44.63%, and ammonium hydroxide at a weight percent of greater than or equal to 0.36% and less than or equal to 0.41%, and the third solution comprises MTMS at a weight percent of about 10.83% and methanol at a weight percent of about 89.17%. The resulting hydrophobic silica wet gel obtained by method 200A is thereby synthesized from TMOS at a total weight percent of greater than or equal to 13.821% and less than or equal to 28.368%, MTMS at a total weight percent of greater than or equal to 2.63% and less than or equal to 3.204%, methanol at a total weight percent of greater than or equal to 55.244% and less than or equal to 71.246%, water at a total weight percent of greater than or equal to 10.604% and less than or equal to 13.633% and ammonium hydroxide at a total weight percent of greater than or equal to 0.112% and less than or equal to 0.125%. The resulting hydrophobic silica wet gel also has a density of greater than or equal to 100 mg/cc and less than or equal to 200 mg/cc.

In other embodiments, the first solution comprises TMOS at a weight percent of greater than or equal to 38.17% and less than or equal to 55.11% and methanol at a weight percent of greater than or equal to 44.89% and less than or equal to 61.87%, the second solution comprises methanol at a weight percent of greater than or equal to 64.28% and less than or equal to 65.66%, water at a weight percent of greater than or equal to 33.98% and less than or equal to 35.35%, and ammonium hydroxide at a weight percent of greater than or equal to 0.36% and less than or equal to 0.37%, and the third solution comprises organo-silane at a weight percent of about 10.83% and methanol at a weight percent of about 89.17%. The resulting hydrophobic silica wet gel obtained by method 200A is thereby synthesized from TMOS at a total weight percent of greater than or equal to 13.821% and less than or equal to 23.676%, MTMS at a total weight percent of greater than or equal to 2.927% and less than or equal to 3.204%, methanol at a total weight percent of greater than or equal to 62.681% and less than or equal to 71.246%, water at a total weight percent of greater than or equal to 10.604% and less than or equal to 11.607% and ammonium hydroxide at a total weight percent of greater than or equal to 0.112% and less than or equal to 0.122%. The resulting hydrophobic silica wet gel also has a density of greater than or equal to 100 mg/cc and less than or equal to 150 mg/cc.

In further embodiments, the first solution comprises TMOS at a weight percent of greater than or equal to 38.17% and less than or equal to 44.25% and methanol at a weight percent of greater than or equal to 55.75% and less than or equal to 61.87%, the second solution comprises methanol at a weight percent of greater than or equal to 64.28% and less than or equal to 65.66%, water at a weight percent of greater than or equal to 33.98% and less than 34.65%, and ammonium hydroxide at a weight percent of about 0.36%, and the third solution comprises MTMS at a weight percent of about 10.83% and methanol at a weight percent of about 89.17%. The resulting hydrophobic silica wet gel obtained by method 200A is thereby synthesized from TMOS at a total weight percent of greater than or equal to 13.821% and less than or equal to 16.915%, MTMS at a total weight percent of greater than or equal to 3.137% and less than or equal to 3.204%, methanol at a total weight percent of greater than or equal to 68.464% and less than or equal to 71.246%, water at a total weight percent of greater than or equal to 11.364% and less than or equal to 11.607% and ammonium hydroxide at a total weight percent of greater than or equal to 0.120% and less than or equal to 0.122%. The resulting hydrophobic silica wet gel also has a density of greater than or equal to 100 mg/cc and less than or equal to 120 mg/cc.

Further, in some embodiments, the first solution comprises TMOS at a weight percent of greater than or equal to 44.25% and less than or equal to 62.82% and methanol at a weight percent of greater than or equal to 37.18% and less than or equal to 55.75%, the second solution comprises methanol at a weight percent of greater than or equal to 54.96% and less than or equal to 64.99%, water at a weight percent of greater than or equal to 34.65% and less than or equal to 44.63%, and ammonium hydroxide at a weight percent of greater than or equal to 0.36% and less than or equal to 0.41%, and the third solution comprises MTMS at a weight percent of about 10.83% and methanol at a weight percent of about 89.17%. The resulting hydrophobic silica wet gel obtained by method 200A is thereby synthesized from TMOS at a total weight percent of greater than or equal to 16.915% and less than or equal to 28.368%, MTMS at a total weight percent of greater than or equal to 2.63% and less than or equal to 3.137%, methanol at a total weight percent of greater than or equal to 55.244% and less than or equal to 68.464%, water at a total weight percent of greater than or equal to 10.604% and less than or equal to 13.633% and ammonium hydroxide at a total weight percent of greater than or equal to 0.112% and less than or equal to 0.125%. The resulting hydrophobic silica wet gel also has a density of greater than or equal to 120 mg/cc and less than or equal to 200 mg/cc.

In even further embodiments, the first solution comprises TMOS at a weight percent of greater than or equal to 44.25% and less than or equal to 55.11% and methanol at a weight percent of greater than or equal to 44.89% and less than or equal to 55.75%, the second solution comprises methanol at a weight percent of greater than or equal to 64.28% and less than or equal to 64.99%, water at a weight percent of greater than or equal to 34.65% and less than or equal to 35.35%, and ammonium hydroxide at a weight percent of greater than or equal to 0.36% and less than or equal to 0.37%, and the third solution comprises MTMS at a weight percent of about 10.83% and methanol at a weight percent of about 89.17%. The resulting hydrophobic silica wet gel obtained by method 200A is thereby synthesized from TMOS at a total weight percent of greater than or equal to 16.915% and less than or equal to 23.676%, MTMS at a total weight percent of greater than or equal to 2.927% and less than or equal to 3.137%, methanol at a total weight percent of greater than or equal to 62.681% and less than or equal to 68.464%, water at a total weight percent of greater than or equal to 10.604% and less than or equal to 11.364% and ammonium hydroxide at a total weight percent of greater than or equal to 0.112% and less than or equal to 0.120%. The resulting hydrophobic silica wet gel also has a density of greater than or equal to 120 mg/cc and less than or equal to 150 mg/cc.

In some embodiments of the method 200A, TMOS and MTMS are provided in a controlled amount to provide a molar ratio of the TMOS:MTMS of greater than or equal to 3.86:1 and less than or equal to 6.11:1. In specific cases, the molar ratio is greater than or equal to 3.86:1 and less than or equal to 5.79:1, such as greater than or equal to 3.86:1 and less than or equal to 4.83:1. In further cases, the molar ratio is greater than or equal to 4.83:1 and less than or equal to 6.11:1, such as greater than or equal to 4.83:1 and less than or equal to 5.79:1.

Also, in some cases, the TMOS has a total weight percent of greater than or equal to 13.82% and less than or equal to 30.937% and the MTMS has a total weight percent of greater than or equal to 3.136% and less than or equal to 4.529%. In certain cases, the TMOS has a total weight percent of greater than or equal to 13.82% and less than or equal to 24.684% and the MTMS has a total weight percent of greater than or equal to 3.136% and less than or equal to 3.814%. In yet other cases, the TMOS has a total weight percent of greater than or equal to 13.82% and less than or equal to 16.914% and the MTMS has a total weight percent of greater than or equal to 3.136% and less than or equal to 3.203%. In further cases, the TMOS has a total weight percent of greater than or equal to 16.914% and less than or equal to 30.937% and the MTMS has a total weight percent of greater than or equal to 3.136% and less than or equal to 4.529%. In even further cases, the TMOS has a total weight percent of greater than or equal to 16.914% and less than or equal to 24.684% and the MTMS has a total weight percent of greater than or equal to 3.136% and less than or equal to 3.814%.

In some embodiments, the first solution comprises TMOS at a weight percent of greater than or equal to 38.13% and less than or equal to 68.39% and methanol at a weight percent of greater than or equal to 31.61% and less than or equal to 61.87%, the second solution comprises methanol at a weight percent of greater than or equal to 56.38% and less than or equal to 65.65%, water at a weight percent of greater than or equal to 34.25% and less than or equal to 43.41%, and ammonium hydroxide at a weight percent of greater than or equal to 0.11% and less than or equal to 0.14%, and the third solution comprises MTMS at a weight percent of greater than or equal to 10.83% and less than or equal to 15.41% and methanol at a weight percent of greater than or equal to 84.59% and less than or equal to 89.17%. The resulting hydrophobic silica wet gel obtained by method 200A is thereby synthesized from TMOS at a total weight percent of greater than or equal to 13.82% and less than or equal to 30.937%, MTMS at a total weight percent of greater than or equal to 3.136% and less than or equal to 4.529%, methanol at a total weight percent of greater than or equal to 53.471% and less than or equal to 71.24%, water at a total weight percent of greater than or equal to 11.028% and less than or equal to 11.7% and ammonium hydroxide at a total weight percent of greater than or equal to 0.035% and less than or equal to 0.037%. The resulting hydrophobic silica wet gel also has a density of greater than or equal to 100 mg/cc and less than or equal to 200 mg/cc.

In other embodiments, the first solution comprises TMOS at a weight percent of greater than or equal to 38.13% and less than or equal to 58.38% and methanol at a weight percent of greater than or equal to 41.62% and less than or equal to 61.87%, the second solution comprises methanol at a weight percent of greater than or equal to 61.14% and less than or equal to 65.65%, water at a weight percent of greater than or equal to 34.25% and less than or equal to 38.73%, and ammonium hydroxide at a weight percent of greater than or equal to 0.11% and less than or equal to 0.12%, and the third solution comprises MTMS at a weight percent of greater than or equal to 10.83% and less than or equal to 13.18% and methanol at a weight percent of greater than or equal to 86.82% and less than or equal to 89.17%. The resulting hydrophobic silica wet gel obtained by the method 200A is thereby synthesized from TMOS at a total weight percent of greater than or equal to 13.82% and less than or equal to 24.684%, MTMS at a total weight percent of greater than or equal to 3.136% and less than or equal to 3.814%, methanol at a total weight percent of greater than or equal to 60.322% and less than or equal to 71.24%, water at a total weight percent of greater than or equal to 11.145% and less than or equal to 11.7% and ammonium hydroxide at a total weight percent of greater than or equal to 0.035% and less than or equal to 0.037%. The resulting hydrophobic silica wet gel also has a density of greater than or equal to 100 mg/cc and less than or equal to 150 mg/cc.

In additional embodiments, the first solution comprises TMOS at a weight percent of greater than or equal to 38.13% and less than or equal to 44.25% and methanol at a weight percent of greater than or equal to 55.75% and less than or equal to 61.87%, the second solution comprises methanol at a weight percent of greater than or equal to 64.97% and less than or equal to 65.65%, water at a weight percent of greater than or equal to 34.25% and less than or equal to 34.92%, and ammonium hydroxide at a weight percent of about 0.11%, and the third solution comprises MTMS at a weight percent of about 10.83% and methanol at a weight percent of about 89.17%. The resulting hydrophobic silica wet gel is thereby synthesized from TMOS at a total weight percent of greater than or equal to 13.82% and less than or equal to 16.914%, MTMS at a total weight percent of greater than or equal to 3.136% and less than or equal to 3.203%, methanol at a total weight percent of greater than or equal to 68.459% and less than or equal to 71.24%, water at a total weight percent of greater than or equal to 11.455% and less than or equal to 11.7% and ammonium hydroxide at a total weight percent of greater than or equal to 0.036% and less than or equal to 0.037%. The resulting hydrophobic silica wet gel also has a density of greater than or equal to 100 mg/cc and less than or equal to 120 mg/cc.

Further, in some embodiments, the first solution comprises TMOS at a weight percent of greater than or equal to 44.25% and less than or equal to 68.39% and methanol at a weight percent of greater than or equal to 31.61% and less than or equal to 55.75%, the second solution comprises methanol at a weight percent of greater than or equal to 56.38% and less than or equal to 64.97%, water at a weight percent of greater than or equal to 34.92% and less than or equal to 43.41%, and ammonium hydroxide at a weight percent of greater than or equal to 0.11% and less than or equal to 0.14%, and the third solution comprises MTMS at a weight percent of greater than or equal to 10.83% and less than or equal to 15.41% and methanol at a weight percent of greater than or equal to 84.59% and less than or equal to 89.17%. The resulting hydrophobic silica wet gel obtained by method 200A is thereby synthesized from TMOS at a total weight percent of greater than or equal to 16.914% and less than or equal to 30.937%, MTMS at a total weight percent of greater than or equal to 3.136% and less than or equal to 4.529%, methanol at a total weight percent of greater than or equal to 53.471% and less than or equal to 68.459%, water at a total weight percent of greater than or equal to 11.028% and less than or equal to 11.455% and ammonium hydroxide at a total weight percent of greater than or equal to 0.035% and less than or equal to 0.036%. The resulting hydrophobic silica wet gel also has a density of greater than or equal to 120 mg/cc and less than or equal to 200 mg/cc.

In even further embodiments, the first solution comprises TMOS at a weight percent of greater than or equal to 44.25% and less than or equal to 58.38% and methanol at a weight percent of greater than or equal to 41.62% and less than or equal to 55.75%, the second solution comprises methanol at a weight percent of greater than or equal to 61.14% and less than or equal to 64.97%, water at a weight percent of greater than or equal to 34.92% and less than or equal to 38.73%, and ammonium hydroxide at a weight percent of greater than or equal to 0.11% and less than or equal to 0.12%, and the third solution comprises MTMS at a weight percent of greater than or equal to 10.83% and less than or equal to 13.18% and methanol at a weight percent of greater than or equal to 86.82% and less than or equal to 89.17%. The resulting hydrophobic silica wet gel obtained by method 200A is thereby synthesized from TMOS at a total weight percent of greater than or equal to 16.914% and less than or equal to 24.684%, MTMS at a total weight percent of greater than or equal to 3.136% and less than or equal to 3.814%, methanol at a total weight percent of greater than or equal to 60.322% and less than or equal to 68.459%, water at a total weight percent of greater than or equal to 11.145% and less than or equal to 11.455% and ammonium hydroxide at a total weight percent of greater than or equal to 0.35% and less than or equal to 0.36%. The resulting hydrophobic silica wet gel also has a density of greater than or equal to 120 mg/cc and less than or equal to 150 mg/cc.

Embodiments of Method 300A

Figure 3:
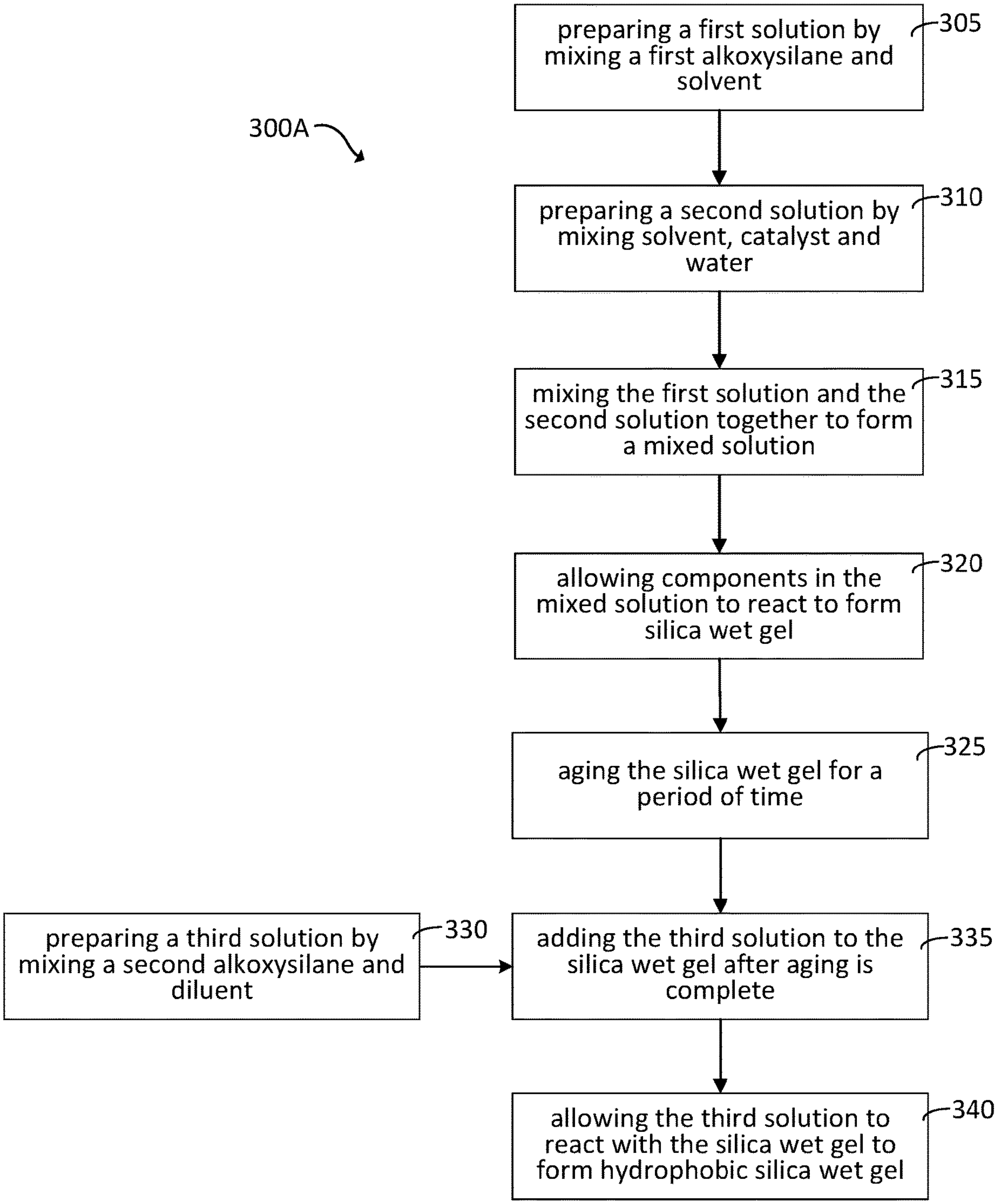
FIG. 3 is a flow chart depicting another method of making hydrophobic silica wet gel in accordance with certain embodiments.

FIG. 3 illustrates a method 300A according to certain embodiments. The method includes a step 305 of preparing a first solution by mixing a first alkoxysilane and solvent, a step 310 of preparing a second solution by mixing solvent, catalyst and water, a step 315 of mixing the first solution and the second solution together to form a mixed solution, a step 320 of allowing components in the mixed solution to react to form silica wet gel, a step 325 of aging the silica wet gel for a period of time, a step 330 of preparing a third solution by mixing a second alkoxysilane and diluent, a step 335 of adding the third solution to the silica wet gel after aging is complete, and a step 340 of allowing the third solution to react with the silica wet gel to form hydrophobic silica wet gel. In the method 300A, the step 335 of adding the third solution to the silica wet gel takes places after the aging step 325 is complete. The third solution serves as a hydrophobic agent. Therefore, the silica wet gel is aged completely before making it hydrophobic. In preferred embodiments of the method 300A, step 305 comprises preparing a first solution by mixing TMOS and methanol, step 310 comprises preparing a second solution by mixing methanol, ammonium hydroxide and water, and step 330 comprises preparing a third solution by mixing MTMS and methanol.

In some embodiments, the method 200A makes a hydrophobic silica wet gel having a density of between 100 mg/cc and 200 mg/cc, and the TMOS and MTMS can be provided in a controlled amount selected to provide a molar ratio of TMOS:MTMS of greater than or equal to 3.7:1 and less than or equal to 9.2:1, for example greater than or equal to 3.8:1 and less than or equal to 6.11:1. In other cases, the density is between 120 mg/cc and 200 mg/cc, and the molar ratio of TMOS:MTMS is greater than or equal to 4.6:1 and less than or equal to 9.2:1, for example greater than or equal to 4.83:1 and less than or equal to 6.11:1. In yet other cases, the density is between 120 mg/cc and 150 mg/cc and the molar ratio of TMOS:MTMS is greater than or equal to 4.6:1 and less than or equal to 6.9:1, for example greater than or equal to 4.83:1 and less than or equal to 5.79:1.

In further embodiments, the density of the hydrophobic silica wet gel is between 100 mg/cc and 200 mg/cc and the TMOS is provided at a total weight percent of greater than or equal to 2.3% and less than or equal to 5.7% and the MTMS is provided at a total weight percent of greater than or equal to 0.5% and less than or equal to 0.8%. The total weight percent represents a total weight percent of a component in the first, second and third solutions. As an example, in certain cases, the total weight percent of the TMOS is greater than or equal to 2.3% and less than or equal to 5.7%, the total weight percent of the MTMS is greater than or equal to 0.5% and less than or equal to 0.8%, the methanol has a total weight percent of greater than or equal to 91% and less than or equal to 95.2%, the water has a total weight percent of greater than or equal to 1.9% and less than or equal to 2.8%, and the ammonium hydroxide has a total weight percent of greater than or equal to 0.005% and less than or equal to 0.026%. In another example, the total weight percent of the TMOS is greater than or equal to 2.3% and less than or equal to 5.5%, the total weight percent of the MTMS is greater than or equal to 0.5% and less than or equal to 0.8%, the methanol has a total weight percent of greater than or equal to 91.8% and less than or equal to 95.2%, the water has a total weight percent of greater than or equal to 1.9% and less than or equal to 2%, and the ammonium hydroxide has a total weight percent of greater than or equal to 0.005% and less than or equal to 0.007%.

Also, in some cases, the density of the hydrophobic silica wet gel is between 120 mg/cc and 200 mg/cc and the total weight percent of the TMOS is greater than or equal to 2.8% and less than or equal to 5.7%, and the total weight percent of the MTMS is greater than or equal to 0.5% and less than or equal to 0.8%. For example, in certain cases, the total weight percent of the TMOS is greater than or equal to 2.8% and less than or equal to 5.7%, the total weight percent of the MTMS is greater than or equal to 0.5% and less than or equal to 0.8%, the methanol has a total weight percent of greater than or equal to 91% and less than or equal to 94.7%, the water has a total weight percent of greater than or equal to 1.9% and less than or equal to 2.8%, and the ammonium hydroxide has a total weight percent of greater than or equal to 0.005% and less than or equal to 0.026%. In another example, the total weight percent of the TMOS is greater than or equal to 2.8% and less than or equal to 5.5%, the total weight percent of the MTMS is greater than or equal to 0.5% and less than or equal to 0.8%, the methanol has a total weight percent of greater than or equal to 91.8% and less than or equal to 94.7%, the water has a total weight percent of greater than or equal to 1.9% and less than or equal to 2%, and the ammonium hydroxide has a total weight percent of greater than or equal to 0.005% and less than or equal to 0.007%.

Further, in some cases, the density of the hydrophobic silica wet gel is between 120 mg/cc and 150 mg/cc and the total weight percent of the TMOS is greater than or equal to 2.8% and less than or equal to 4.3%, and the total weight percent of the MTMS is greater than or equal to 0.5% and less than or equal to 0.7%. For example, in certain cases, the total weight percent of the TMOS is greater than or equal to 2.8% and less than or equal to 4.3%, the total weight percent of the MTMS is greater than or equal to 0.5% and less than or equal to 0.7%, the methanol has a total weight percent of greater than or equal to 93% and less than or equal to 94.7%, the water has a total weight percent of greater than or equal to 1.9% and less than or equal to 2%, and the ammonium hydroxide has a total weight percent of greater than or equal to 0.005% and less than or equal to 0.021%. In another example, the total weight percent of the TMOS is greater than or equal to 2.8% and less than or equal to 4.3%, the total weight percent of the MTMS is greater than or equal to 0.5% and less than or equal to 0.7%, the methanol has a total weight percent of greater than or equal to 93% and less than or equal to 94.7%, the water has a total weight percent of greater than or equal to 1.9% and less than or equal to 2%, and the ammonium hydroxide has a total weight percent of greater than or equal to 0.005% and less than or equal to 0.007%.

Even further, in some cases where it is desired to obtain a hydrophobic silica wet gel with a density between 100 mg/cc and 200 mg/cc, the first solution comprises TMOS at a weight percent of greater than or equal to 38.1% and less than or equal to 68.4% and methanol at a weight percent of greater than or equal to 31.6% and less than or equal to 61.9%, the second solution comprises methanol at a weight percent of greater than or equal to 49.4% and less than or equal to 65.7%, water at a weight percent of greater than or equal to 33.9% and less than or equal to 50.2%, and ammonium hydroxide at a weight percent of greater than or equal to 0.10% and less than or equal to 0.47%, and the third solution comprises methanol at a weight percent of greater than or equal to 99% and less than or equal to 99.4% and MTMS at a weight percent of greater than or equal to 0.6% and less than or equal to 1%. In another example, first solution comprises TMOS at a weight percent of greater than or equal to 38.1% and less than or equal to 68.4% and methanol at a weight percent of greater than or equal to 31.6% and less than or equal to 61.9%, the second solution comprises methanol at a weight percent of greater than or equal to 56.3% and less than or equal to 65.7%, water at a weight percent of greater than or equal to 34.2% and less than or equal to 43.5%, and ammonium hydroxide at a weight percent of greater than or equal to 0.10% and less than or equal to 0.15%, and the third solution comprises methanol at a weight percent of greater than or equal to 99% and less than or equal to 99.4% and MTMS at a weight percent of greater than or equal to 0.6% and less than or equal to 1%.

In other cases where it is desired to obtain a hydrophobic silica wet gel with a density between 120 mg/cc and 200 mg/cc, the first solution comprises TMOS at a weight percent of greater than or equal to 44.2% and less than or equal to 68.4% and methanol at a weight percent of greater than or equal to 31.6% and less than or equal to 55.8%, the second solution comprises methanol at a weight percent of greater than or equal to 49% and less than or equal to 65%, water at a weight percent of greater than or equal to 34.6% and less than or equal to 50.2%, and ammonium hydroxide at a weight percent of greater than or equal to 0.10% and less than or equal to 0.47%, and the third solution comprises methanol at a weight percent of greater than or equal to 99% and less than or equal to 99.4% and MTMS at a weight percent of greater than or equal to 0.6% and less than or equal to 1%. In another example, the first solution comprises TMOS at a weight percent of greater than or equal to 44.2% and less than or equal to 68.4% and methanol at a weight percent of greater than or equal to 31.6% and less than or equal to 55.8%, the second solution comprises methanol at a weight percent of greater than or equal to 56.3% and less than or equal 65%, water at a weight percent of greater than or equal to 34.9% and less than or equal to 43.5%, and ammonium hydroxide at a weight percent of greater than or equal to 0.10% and less than or equal to 0.15%, and the third solution comprises methanol at a weight percent of greater than or equal to 99% and less than or equal to 99.4% and MTMS at a weight percent of greater than or equal to 0.6% and less than or equal to 1%.

In yet other cases where it is desired to obtain a hydrophobic silica wet gel with a density between 120 mg/cc and 150 mg/cc, the first solution comprises TMOS at a weight percent of greater than or equal to 44.2% and less than or equal to 58.4% and methanol at a weight percent of greater than or equal to 41.6% and less than or equal to 55.8%, the second solution comprises methanol at a weight percent of greater than or equal to 61.1% and less than or equal to 65%, water at a weight percent of greater than or equal to 34.6% and less than or equal to 38.8%, and ammonium hydroxide at a weight percent of greater than or equal to 0.10% and less than or equal to 0.38%, and the third solution comprises methanol at a weight percent of greater than or equal to 99.2% and less than or equal to 99.4% and MTMS at a weight percent of greater than or equal to 0.6% and less than or equal to 0.8%. In another example, the first solution comprises TMOS at a weight percent of greater than or equal to 44.2% and less than or equal to 58.4% and methanol at a weight percent of greater than or equal to 41.6% and less than or equal to 55.8%, the second solution comprises methanol at a weight percent of greater than or equal to 61.1% and less than or equal to 65%, water at a weight percent of greater than or equal to 34.9% and less than or equal to 38.8%, and ammonium hydroxide at a weight percent of greater than or equal to 0.10% and less than or equal to 0.13%, and the third solution comprises methanol at a weight percent of greater than or equal to 99.2% and less than or equal to 99.4% and MTMS at a weight percent of greater than or equal to 0.6% and less than or equal to 0.8%.

Specific embodiments of method 300A will now be described. In some embodiments of the method 300A, TMOS and MTMS are provided in a controlled amount to provide a molar ratio of the TMOS:MTMS of greater than or equal to 3.7:1 and less than or equal to 9.2:1. In specific cases, the molar ratio is greater than or equal to 3.7:1 and less than or equal to 6.9:1, such as greater than or equal to 3.7:1 and less than or equal to 4.6:1. In further cases, the molar ratio is greater than or equal to 4.6:1 and less than or equal to 9.2:1, such as greater than or equal to 4.6:1 and less than or equal to 6.9:1.

Also, in some cases, the TMOS has a total weight percent of greater than or equal to 2.308% and less than or equal to 5.643% and the MTMS has a total weight percent of greater than or equal to 0.523% and less than or equal to 0.535%. In certain cases, the TMOS has a total weight percent of greater than or equal to 2.308% and less than or equal to 4.27% and the MTMS has a total weight percent of greater than or equal to 0.528% and less than or equal to 0.535%. In yet other cases, the TMOS has a total weight percent of greater than or equal to 2.308% and less than or equal to 2.875% and the MTMS has a total weight percent of greater than or equal to 0.533% and less than or equal to 0.535%. In further cases, the TMOS has a total weight percent of greater than or equal to 2.875% and less than or equal to 5.643% and the MTMS has a total weight percent of greater than or equal to 0.523% and less than or equal to 0.533%. In even further cases, the TMOS has a total weight percent of greater than or equal to 2.875% and less than or equal to 4.27% and the MTMS has a total weight percent of greater than or equal to 0.528% and less than or equal to 0.533%.

Specific embodiments of method 300A will now be described. In some embodiments, the first solution comprises TMOS at a weight percent of greater than or equal to 38.13% and less than or equal to 67.87% and methanol at a weight percent of greater than or equal to 32.13% and less than or equal to 61.87%, the second solution comprises methanol at a weight percent of greater than or equal to 49.4% and less than or equal to 65.66%, water at a weight percent of greater than or equal to 33.98% and less than or equal to 50.14%, and ammonium hydroxide at a weight percent of greater than or equal to 0.36% and less than or equal to 0.46%, and the third solution comprises MTMS at a weight percent of about 0.61% and methanol at a weight percent of about 99.39%. The resulting hydrophobic silica wet gel obtained by the method 300A is thereby synthesized from TMOS at a total weight percent of greater than or equal to 2.308% and less than or equal to 5.643%, MTMS at a total weight percent of greater than or equal to 0.523% and less than or equal to 0.535%, methanol at a total weight percent of greater than or equal to 91.097% and less than or equal to 95.197%, water at a total weight percent of greater than or equal to 1.94% and less than or equal to 2.712% and ammonium hydroxide at a total weight percent of greater than or equal to 0.020% and less than or equal to 0.025%. The resulting hydrophobic silica wet gel also has a density of greater than or equal to 100 mg/cc and less than or equal to 200 mg/cc.

In additional embodiments, the first solution comprises TMOS at a weight percent of greater than or equal to 38.13% and less than or equal to 55.11% and methanol at a weight percent of greater than or equal to 44.89% and less than or equal to 61.87%, the second solution comprises methanol at a weight percent of greater than or equal to 64.28% and less than or equal to 65.66%, water at a weight percent of greater than or equal to 33.98% and less than or equal to 35.35%, and ammonium hydroxide at a weight percent of greater than or equal to 0.36% and less than or equal to 0.37%, and the third solution comprises MTMS at a weight percent of about 0.61% and methanol at a weight percent of about 99.39%. The resulting hydrophobic silica wet gel obtained by the method 300A is thereby synthesized from TMOS at a total weight percent of greater than or equal to 2.308% and less than or equal to 4.27%, MTMS at a total weight percent of greater than or equal to 0.528% and less than or equal to 0.535%, methanol at a total weight percent of greater than or equal to 93.269% and less than or equal to 95.197%, water at a total weight percent of greater than or equal to 1.913% and less than or equal to 1.94% and ammonium hydroxide at a total weight percent of about 0.020%. The resulting hydrophobic silica wet gel also has a density of greater than or equal to 100 mg/cc and less than or equal to 150 mg/cc.

In other embodiments, the first solution comprises TMOS at a weight percent of greater than or equal to 38.13% and less than or equal to 44.25% and methanol at a weight percent of greater than or equal to 55.75% and less than or equal to 61.87%, the second solution comprises methanol at a weight percent of greater than or equal to 64.99% and less than or equal to 65.66%, water at a weight percent of greater than or equal to 33.98% and less than 34.65%, and ammonium hydroxide at a weight percent of about 0.36%, and the third solution comprises MTMS at a weight percent of about 0.61% and methanol at a weight percent of about 99.39%. The resulting hydrophobic silica wet gel obtained by the method 300A is thereby synthesized from TMOS at a total weight percent of greater than or equal to 2.308% and less than or equal to 2.875%, MTMS at a total weight percent of greater than or equal to 0.533% and less than or equal to 0.535%, methanol at a total weight percent of greater than or equal to 94.639% and less than or equal to 95.197%, water at a total weight percent of greater than or equal to 1.933% and less than or equal to 1.94% and ammonium hydroxide at a total weight percent of about 0.020%. The resulting hydrophobic silica wet gel also has a density of greater than or equal to 100 mg/cc and less than or equal to 120 mg/cc.

Further, in some embodiments, the first solution comprises TMOS at a weight percent of greater than or equal to 44.25% and less than or equal to 67.87% and methanol at a weight percent of greater than or equal to 32.13% and less than or equal to 55.75%, the second solution comprises methanol at a weight percent of greater than or equal to 49.4% and less than or equal to 64.99%, water at a weight percent of greater than or equal to 34.65% and less than or equal to 50.14%, and ammonium hydroxide at a weight percent of greater than or equal to 0.36% and less than or equal to 0.46%, and the third solution comprises MTMS at a weight percent of about 0.61% and methanol at a weight percent of about 99.39%. The resulting hydrophobic silica wet gel obtained by the method 300A is thereby synthesized from TMOS at a total weight percent of greater than or equal to 2.875% and less than or equal to 5.643%, MTMS at a total weight percent of greater than or equal to 0.523% and less than or equal to 0.533%, methanol at a total weight percent of greater than or equal to 91.097% and less than or equal to 94.639%, water at a total weight percent of greater than or equal to 1.933% and less than or equal to 2.712% and ammonium hydroxide at a total weight percent of greater than or equal to 0.020% and less than or equal to 0.025%. The resulting hydrophobic silica wet gel also has a density of greater than or equal to 120 mg/cc and less than or equal to 200 mg/cc.

In even further embodiments, the first solution comprises TMOS at a weight percent of greater than or equal to 44.25% and less than or equal to 55.11% and methanol at a weight percent of greater than or equal to 44.89% and less than or equal to 55.75%, the second solution comprises methanol at a weight percent of greater than or equal to 64.28% and less than or equal to 64.99%, water at a weight percent of greater than or equal to 34.65% and less than or equal to 35.35%, and ammonium hydroxide at a weight percent of greater than or equal to 0.36% and less than or equal to 0.37%, and the third solution comprises MTMS at a weight percent of about 0.61% and methanol at a weight percent of about 99.39%. The resulting hydrophobic silica wet gel obtained by the method 300A is thereby synthesized from TMOS at a total weight percent of greater than or equal to 2.875% and less than or equal to 4.27%, MTMS at a total weight percent of greater than or equal to 0.528% and less than or equal to 0.533%, methanol at a total weight percent of greater than or equal to 93.269% and less than or equal to 94.639%, water at a total weight percent of greater than or equal to 1.913% and less than or equal to 1.933% and ammonium hydroxide at a total weight percent of about 0.020%. The resulting hydrophobic silica wet gel also has a density of greater than or equal to 120 mg/cc and less than or equal to 150 mg/cc.

In additional embodiments of the method 300A, TMOS and MTMS are provided in a controlled amount to provide a molar ratio of the TMOS:MTMS of greater than or equal to 3.86:1 and less than or equal to 6.11:1. In specific cases, the molar ratio is greater than or equal to 3.86:1 and less than or equal to 5.79:1, such as greater than or equal to 3.86:1 and less than or equal to 4.83:1. In further cases, the molar ratio is greater than or equal to 4.83:1 and less than or equal to 6.11:1, such as greater than or equal to 4.83:1 and less than or equal to 5.79:1.

Also, in some cases, the TMOS has a total weight percent of greater than or equal to 2.308% and less than or equal to 5.427% and the MTMS has a total weight percent of greater than or equal to 0.533% and less than or equal to 0.795%. In certain cases, the TMOS has a total weight percent of greater than or equal to 2.308% and less than or equal to 4.293% and the MTMS has a total weight percent of greater than or equal to 0.533% and less than or equal to 0.663%. In yet other cases, the TMOS has a total weight percent of greater than or equal to 2.308% and less than or equal to 2.875% and the MTMS has a total weight percent of greater than or equal to 0.533% and less than or equal to 0.535%. In further cases, the TMOS has a total weight percent of greater than or equal to 2.875% and less than or equal to 5.427% and the MTMS has a total weight percent of greater than or equal to 0.533% and less than or equal to 0.795%. In even further cases, the TMOS has a total weight percent of greater than or equal to 2.875% and less than or equal to 4.293% and the MTMS has a total weight percent of greater than or equal to 0.533% and less than or equal to 0.663%.

In some embodiments, the first solution comprises TMOS at a weight percent of greater than or equal to 38.13% and less than or equal to 68.39% and methanol at a weight percent of greater than or equal to 31.61% and less than or equal to 61.87%, the second solution comprises methanol at a weight percent of greater than or equal to 56.38% and less than or equal to 65.65%, water at a weight percent of greater than or equal to 34.25% and less than or equal to 43.48%, and ammonium hydroxide at a weight percent of greater than or equal to 0.11% and less than or equal to 0.14%, and the third solution comprises MTMS at a weight percent of greater than or equal to 0.61% and less than or equal to 0.91% and methanol at a weight percent of greater than or equal to 99.09% and less than or equal to 99.39%. The resulting hydrophobic silica wet gel obtained by the method 300A is thereby synthesized from TMOS at a total weight percent of greater than or equal to 2.308% and less than or equal to 5.427%, MTMS at a total weight percent of greater than or equal to 0.533% and less than or equal to 0.795%, methanol at a total weight percent of greater than or equal to 91.838% and less than or equal to 95.196%, water at a total weight percent of greater than or equal to 1.934% and less than or equal to 1.955% and ammonium hydroxide at a total weight percent of about 0.006%. The resulting hydrophobic silica wet gel also has a density of greater than or equal to 100 mg/cc and less than or equal to 200 mg/cc.

In additional embodiments, the first solution comprises TMOS at a weight percent of greater than or equal to 38.13% and less than or equal to 58.38% and methanol at a weight percent of greater than or equal to 41.66% and less than or equal to 61.87%, the second solution comprises methanol at a weight percent of greater than or equal to 61.15% and less than or equal to 65.65%, water at a weight percent of greater than or equal to 34.25% and less than or equal to 38.73%, and ammonium hydroxide at a weight percent of greater than or equal to 0.11% and less than or equal to 0.12%, and the third solution comprises MTMS at a weight percent of greater than or equal to 0.61% and less than or equal to 0.76% and methanol at a weight percent of greater than or equal to 99.24% and less than or equal to 99.39%. The resulting hydrophobic silica wet gel obtained by the method 300A is thereby synthesized from TMOS at a total weight percent of greater than or equal to 2.308% and less than or equal to 4.293%, MTMS at a total weight percent of greater than or equal to 0.533% and less than or equal to 0.663%, methanol at a total weight percent of greater than or equal to 93.1% and less than or equal to 95.196%, water at a total weight percent of greater than or equal to 1.938% and less than or equal to 1.955% and ammonium hydroxide at a total weight percent of about 0.006%. The resulting hydrophobic silica wet gel also has a density of greater than or equal to 100 mg/cc and less than or equal to 150 mg/cc.

In other embodiments, the first solution comprises TMOS at a weight percent of greater than or equal to 38.13% and less than or equal to 44.25% and methanol at a weight percent of greater than or equal to 55.75% and less than or equal to 61.87%, the second solution comprises methanol at a weight percent of greater than or equal to 64.97% and less than or equal to 65.65%, water at a weight percent of greater than or equal to 34.25% and less than or equal to 34.92%, and ammonium hydroxide at a weight percent of about 0.11%, and the third solution comprises MTMS at a weight percent of about 0.61% and methanol at a weight percent of about 99.39%. The resulting hydrophobic silica wet gel obtained by the method 300A is thereby synthesized from TMOS at a total weight percent of greater than or equal to 2.308% and less than or equal to 2.875%, MTMS at a total weight percent of greater than or equal to 0.533% and less than or equal to 0.535%, methanol at a total weight percent of greater than or equal to 94.638% and less than or equal to 95.196%, water at a total weight percent of greater than or equal to 1.948 and less than or equal to 1.955% and ammonium hydroxide at a total weight percent of about 0.006%. The resulting hydrophobic silica wet gel also has a density of greater than or equal to 100 mg/cc and less than or equal to 120 mg/cc.

Further, in some embodiments, the first solution comprises TMOS at a weight percent of greater than or equal to 44.25% and less than or equal to 68.39% and methanol at a weight percent of greater than or equal to 31.61% and less than or equal to 55.75%, the second solution comprises methanol at a weight percent of greater than or equal to 56.38% and less than or equal to 64.97%, water at a weight percent of greater than or equal to 34.92% and less than or equal to 43.48%, and ammonium hydroxide at a weight percent of greater than or equal to 0.11% and less than or equal to 0.14%, and the third solution comprises MTMS at a weight percent of greater than or equal to 0.61% and less than or equal to 0.91% and methanol at a weight percent of greater than or equal to 99.09% and less than or equal to 99.39%. The resulting hydrophobic silica wet gel obtained by the method 300A is thereby synthesized from TMOS at a total weight percent of greater than or equal to 2.875% and less than or equal to 5.427%, MTMS at a total weight percent of greater than or equal to 0.533% and less than or equal to 0.795%, methanol at a total weight percent of greater than or equal to 91.838% and less than or equal to 94.638%, water at a total weight percent of greater than or equal to 1.934% and less than or equal to 1.948% and ammonium hydroxide at a total weight percent of about 0.006%. The resulting hydrophobic silica wet gel also has a density of greater than or equal to 120 mg/cc and less than or equal to 200 mg/cc.

In even further embodiments of the method 300A, the first solution comprises TMOS at a weight percent of greater than or equal to 44.25% and less than or equal to 58.38% and methanol at a weight percent of greater than or equal to 41.66% and less than or equal to 55.75%, the second solution comprises methanol at a weight percent of greater than or equal to 61.15% and less than or equal to 64.97%, water at a weight percent of greater than or equal to 34.92% and less than or equal to 38.73%, and ammonium hydroxide at a weight percent of greater than or equal to 0.11% and less than or equal to 0.12%, and the third solution comprises MTMS at a weight percent of greater than or equal to 0.61% and less than or equal to 0.76% and methanol at a weight percent of greater than or equal to 99.24% and less than or equal to 99.39%. The resulting hydrophobic silica wet gel obtained by the method 300A is thereby synthesized from TMOS at a total weight percent of greater than or equal to 2.875% and less than or equal to 4.293%, MTMS at a total weight percent of greater than or equal to 0.533% and less than or equal to 0.663%, methanol at a total weight percent of greater than or equal to 93.1% and less than or equal to 94.638%, water at a total weight percent of greater than or equal to 1.938% and less than or equal to 1.948% and ammonium hydroxide at a total weight percent of about 0.006%. The resulting hydrophobic silica wet gel also has a density of greater than or equal to 120 mg/cc and less than or equal to 150 mg/cc.

In the method of 200A, the step 235 of adding the third solution to the silica wet gel occurs before aging is complete. In the method of 300A, the step 335 of adding the third solution to the silica wet gel occurs after aging is complete. The aging step includes keeping the silica wet gel (or hydrophobic silica wet gel) in an airtight environment for a selected period of time. Applicant has found that the aging process allows structural transformations to occur in the three-dimensional polymer structure of the silica wet gel (or hydrophobic silica wet gel) that enhance the mechanical strength of the structure. One exemplary significant structural transformation that takes place during aging is a decrease in spherical silica particle diameter. Another exemplary structural transformation is a decrease in pore size. Pore size is a size of pore spaces between spherical silica particles. Pore sizes are often recorded in terms of average pore size. Another exemplary structural transformation is a strengthening of the necking point between two spherical silica particles. The necking point is the point where two adjacent spherical silica particles adjoin.

In each of the embodiments discussed herein, the selected time period for aging is a time period in which the aging process reaches saturation. Once saturation has occurred, no further structural transformation of the wet gel occurs. Applicant has discovered that optimal properties are obtained when the selected time period is a time period of at least 7 days (168 hours), at least 8 days (192 hours), at least 9 days (216 hours) or at least 10 days (240 hours). Additionally, warping of the hydrophobic silica wet gel often takes place during subsequent processes. For example, in many cases, silica wet gel shrinks during drying. However, Applicant has found that a time period of at least 7 days helps prevent warping such as shrinking.

Figure 2:
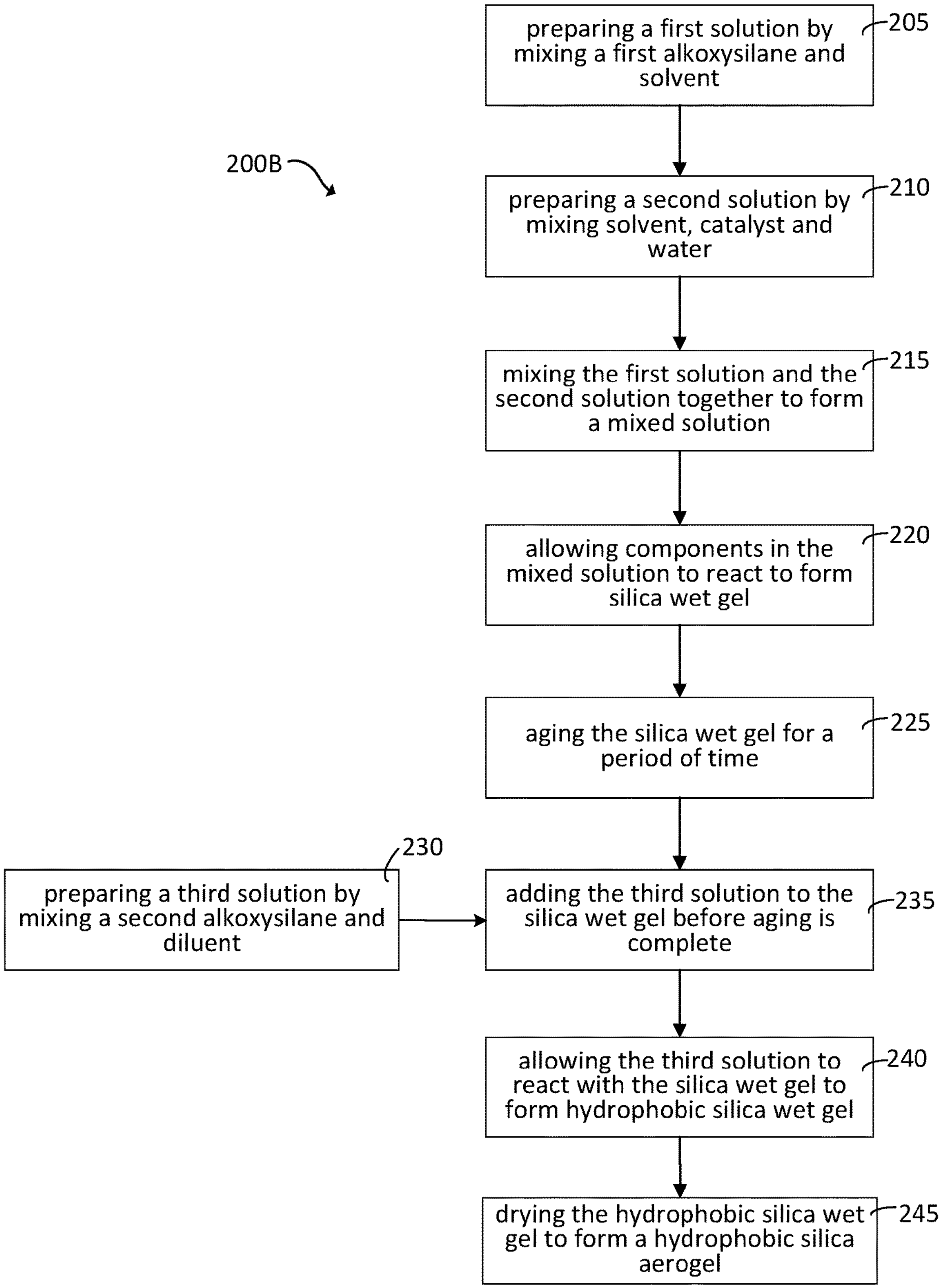
FIG. 2 is a flow chart depicting a method of making hydrophobic silica aerogel in accordance with certain embodiments.
Figure 4:
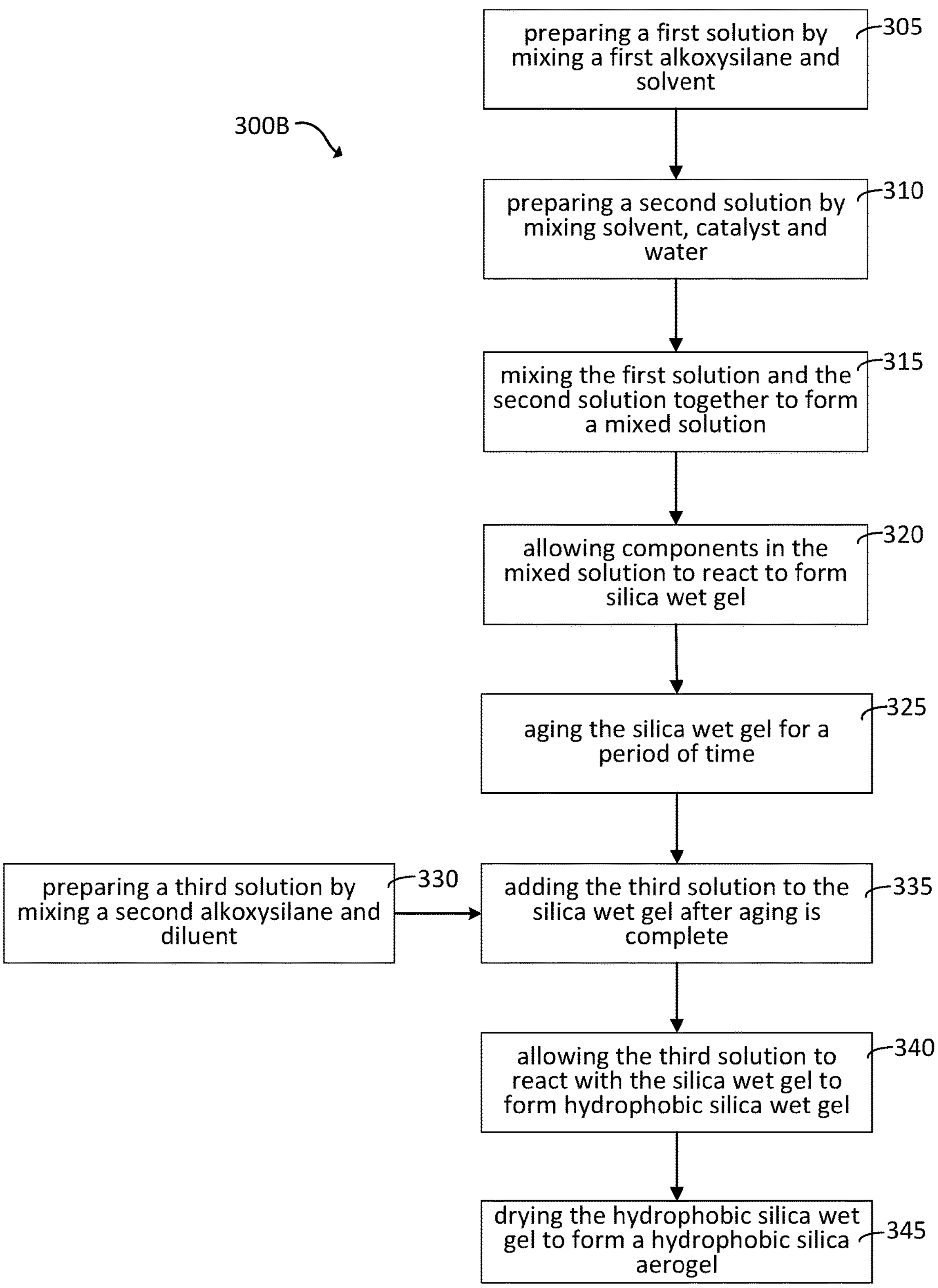
FIG. 4 is a flow chart depicting another method of making hydrophobic silica aerogel in accordance with certain embodiments.

Other embodiments provide a method of making hydrophobic silica aerogel. FIG. 2 illustrates method 200B according to certain embodiments. The method 200B comprises steps 205 through 240 of making hydrophobic silica wet gel as described with regard to method 200A in FIG. 1, in addition to a step 245 of drying the hydrophobic silica wet gel to form hydrophobic silica aerogel. Additionally, FIG. 4 illustrates a method 300B according to certain embodiments. The method 300B comprises steps 305 through 340 of making hydrophobic silica wet gel as described with regard to method 300A in FIG. 3, in addition to a step 345 of drying the hydrophobic silica wet gel to form hydrophobic silica aerogel.

In many cases, the drying step results in a hydrophobic silica aerogel having a shrinkage value of 4% or less, for example 3.5% or less, 3% or less, 2.5% or less, 2% or less or 1.75% or less. Also, in some cases, the drying step results in hydrophobic silica aerogel having a visible transmission of at least 97.8% and a haze value of 3% or less, for example a visible transmission of at least 98% and a haze value of 3% or less, a visible transmission of at least 98.6% and a haze value of 2.5% or less, or a visible transmission of at least 99% and a haze value of 2% or less. Further, in some cases, the drying step results in hydrophobic silica aerogel having a water contact angle of at least 90%, for example at least 100% or at least 110%.

In certain embodiments, the hydrophobic silica wet gel is dried using a conventional aerogel drying method. In many cases, the hydrophobic silica wet gel is placed in either a freeze dryer, a supercritical dryer, or an ambient dryer. In such instances, the step 245 of drying the hydrophobic silica wet gel comprises either a freeze-drying process, a supercritical drying process, or an ambient drying process.

In some cases, the hydrophobic silica wet gel is dried using a supercritical drying method (also known as a critical point drying method). As is well-known to skilled artisans, supercritical drying involves a solvent exchange. Specifically, the water initially inside the hydrophobic silica wet gel is replaced with a suitable organic solvent (e.g., methanol, ethanol, or acetone). The hydrophobic silica wet gel is then placed in a pressure vessel along with liquid carbon dioxide.

The pressure vessel may be filled with, and emptied of, liquid carbon dioxide multiple times, so as to remove the organic solvent and leave liquid carbon dioxide in its place. The liquid carbon dioxide is then heated past its critical temperature and pressure and removed, thereby leaving a hydrophobic silica aerogel.

Applicant has achieved great results when using methanol as the organic solvent in the solvent exchange. By using methanol as the solvent, the resulting aerogel material has less haze and less optical distortion than with other solvents. In certain embodiments, the hydrophobic silica wet gel can be placed in a methanol solvent bath for 8 hours, removed and then placed in another methanol solvent bath for 8 more hours. The total time period in which the hydrophobic silica wet gel is in the solvent bath can be less than 20 hours, such as less than 17 hours. This is desirable as longer solvent processing time can lead to deterioration in optical properties. Additionally, a shorter solvent processing time is advantageous for commercial production.

In other cases, the hydrophobic silica wet gel is dried using an ambient drying method. As used herein, ambient drying involves drying the hydrophobic silica wet gel under ambient conditions (e.g., at a temperature in a range of from about 50 degrees to about 85 degrees fahrenheit, and more typically in a range of from 68 degrees to 72 degrees fahrenheit). The liquid in the hydrophobic silica wet gel is allowed to slowly evaporate under controlled conditions, leaving a hydrophobic silica aerogel. The controlled conditions ensure that the evaporation is slow enough so that the silica network of the gel does not collapse during the drying. With ambient drying, the dryer is configured to establish a controlled environment in its interior. This may involve a controlled temperature, a controlled pressure, a controlled airflow, a controlled humidity, or any combination thereof.

In still other cases, the hydrophobic silica wet gel is dried using a freeze-drying method. The hydrophobic silica wet gel is frozen and then put into a vacuum chamber. The solvent is then removed to leave a hydrophobic silica aerogel. Any suitable freeze-drying technique known in the art may be used. As non-limiting examples, the hydrophobic silica wet gel can be placed into a household freezer, liquid nitrogen, or in a cryogenic mixture (e.g., a dry-ice/solvent mixture, such as a dry-ice and acetone bath).

Other fabrication techniques can be used, such as a rapid supercritical extraction technique. Reference is made to U.S. Pat. No. 8,080,591, the salient teachings of which are incorporated herein by reference.

In some cases, the hydrophobic silica aerogel is provided in the form of a hydrophobic silica aerogel sheet. This is in contrast to aerogel in flowable granular or otherwise particulate form. The hydrophobic silica aerogel sheet preferably is self-supporting, i.e., once fully synthesized and formed, the sheet can retain sheet form without being adhered to glass or another support. This can optionally be the case for any embodiment of the present disclosure involving a hydrophobic silica aerogel sheet.

The hydrophobic silica aerogel sheet is an enhanced sheet having an advantageous combination of properties. First, the hydrophobic silica aerogel sheet desirably has low haze. For any embodiment involving a hydrophobic silica aerogel sheet, the haze can optionally be less than or equal to 4%, such as less than or equal to 3%, e.g., less than or equal to 2.5%, less than or equal to 2%, or less than or equal to 1.75%. In some cases, the hydrophobic silica aerogel sheet has a haze of less than or equal to 1.5%, less than or equal to 1.25%, or even less than or equal to 1%. This preferably is the case for any embodiment involving a hydrophobic silica aerogel sheet. Haze can be measured in well-known fashion, e.g., using a BYK Haze-Gard plus instrument. Reference is made to ASTM D 1003-00:Standard Test method for Haze and Luminous Transmittance of Transparent Plastics, the contents of which are incorporated herein by reference.

The hydrophobic silica aerogel sheet desirably has high visible transmission. In some cases, the hydrophobic silica aerogel sheet has a visible transmission of at least 97.8%, at least 97.9%, at least 98%, at least 98.1%, at least 98.2%, at least 98.3%, at least 98.4%, at least 98.5%, at least 98.6%, at least 98.7%, at least 98.8%, at least 98.9%, or at least 99%, such as at least 99.1%, at least 99.2%, at least 99.3%, at least 99.4%, or perhaps at least 99.5%. The term "visible transmission" is well known in the art and is used herein in accordance with its well-known meaning to refer to the percentage of all incident visible radiation that is transmitted through an object (e.g., through the hydrophobic silica aerogel sheet). Visible radiation constitutes the wavelength range of between about 380 nm and about 780 nm. Visible transmission, as well as visible reflection, can be determined in accordance with NFRC 300-2017, Standard Test Method for Determining the Solar and Infrared Optical Properties of Glazing Materials and Fading Resistance of Systems. The well-known and commercially available LBNL WINDOW 7.4 computer program can be used in calculating these and other reported optical properties.

The hydrophobic silica aerogel sheet can also have desirable transmitted color characterized by "a" and "b" color coordinates that are each between −2 and 2. The present discussion of color properties is reported using the well-known color coordinates of "a" and "b." In more detail, the color coordinates are indicated herein using the subscript h (i.e., $a_h$ and $b_h$) to represent the conventional use of the well-known Hunter Lab Color System (Hunter methods/units, Ill. D65, 10 degree observer). The present color properties can be calculated as specified in "Insight on Color," "Hunter L, a, b Color Scale," Applications Note, Vol. 8, No. 9, 06/08 (2008), the relevant teachings of which are incorporated herein by reference.

In addition, the hydrophobic silica aerogel sheet can have a low bulk density. In certain embodiments, the hydrophobic silica aerogel sheet has a bulk density of 200 mg/cc or less. In some cases, the hydrophobic silica aerogel sheet has a bulk density of 150 mg/cc or less, such as 140 mg/cc or less, 130 mg/cc or less, or 125 mg/cc or less. In certain embodiments, the hydrophobic silica aerogel sheet has a bulk density of at least 70 mg/cc. In some cases, the hydrophobic silica aerogel sheet has a bulk density of at least 80 mg/cc, such as at least 85 mg/cc or at least 95 mg/cc. In preferred embodiments, the hydrophobic silica aerogel sheet has a bulk density of between 100 mg/cc and 150 mg/cc, such as between 120 mg/cc and 150 mg/cc. In certain cases, the bulk density is 120 mg/cc. The density of the hydrophobic silica aerogel sheet can optionally be in this range for any embodiment of the present disclosure, preferably in combination with visible transmission and haze levels in the ranges noted above (e.g., $T_{vis}$ of at least 97.8%, at least 98%, at least 98.6% or at least 99%, together with a haze of 3% or less, 2% or less, 1.75% or less, or 1.5% or less). Bulk density can be determined by weighing the hydrophobic silica aerogel sheet and then calculating the volume using the dimensions of the hydrophobic silica aerogel sheet.

The hydrophobic silica aerogel sheet can also have low thermal conductivity. For example, the hydrophobic silica aerogel sheet can have a thermal conductivity of 14 mW/m*K or less in air, such as 13.5 mW/m*K or less, 13 mW/m*K or less, 12 mW/m*K or less, or 11.5 mW/m*K or less. Furthermore, the hydrophobic silica aerogel sheet can have a thermal conductivity of 10 mW/m*K or less in an inert gas, such as argon. The thermal conductivity of the hydrophobic silica aerogel sheet can optionally be in one or more (optionally all) of these ranges for any embodiment of the present disclosure. Thermal conductivity can be determined using a conventional heat flow meter, such as the well-known TA Instruments Fox 200 heat flow meter, which is commercially available from Waters Corporation (New Castle, Delaware, U.S.A.).

Further, the hydrophobic silica aerogel sheet can have a flexural modulus of 6000 kPa or less, such as 4500 kPa or less, 2400 kPa or less, 2300 kPa or less, 2000 kPa or less, 1900 kPa or less, 1800 kPa or less, 1700 kPa or less, 1600 kPa or less, 1500 kPa or less, 1400 kPa or less, 1300 kPa or less, 1200 kPa or less, 1100 kPa or less, 1000 kPa or less, 900 kPa or less, 800 kPa or less, 750 kPa or less, or even 700 kPa or less. In some cases, the hydrophobic silica aerogel sheet can have a flexural modulus of between 700 kPa and 6000 kPa, such as between 750 kPa and 6000 kPa, between 800 kPa and 6000 kPa, between 900 kPa and 6000 kPa, between 1000 kPa and 6000 kPa, between 1100 kPa and 6000 kPa, between 1200 kPa and 6000 kPa, between 1300 kPa and 6000 kPa, between 1400 kPa and 6000 kPa, between 1500 kPa and 6000 kPa, between 1600 kPa and 6000 kPa, between 1700 kPa and 6000 kPa, between 1800 kPa and 6000 kPa, between 1900 kPa and 6000 kPa, between 2000 kPa and 6000 kPa, between 2300 kPa and 6000 kPa and between 2400 kPa and 6000 kPa.

The flexural modulus of a material is a mechanical property that measures a material's stiffness or resistance to bending and is defined as the ratio of stress to strain in flexural deformation. It is determined from the slope of a stress-strain curve produced by a flexural test, such as ASTM D790:Standard Test Methods for Flexural Properties of Unreinforced and Reinforced Plastics and Electrical Insulating Material, the contents of which are incorporated herein by reference. The higher the flexural modulus of a material, the harder it is to bend. Conversely, the lower the flexural modulus, the easier it is for the material to bend under an applied force.

Even further, the hydrophobic silica aerogel sheet can have an average pore size of 31 nm or less, such as 30 nm or less, 29 nm or less, 28 nm or less, 27 nm or less, 26 nm or less, 25 nm or less, 24 nm or less, 23 nm or less, 22 nm or less, 21 nm or less, or even 20 nm or less. This can optionally be the case for any embodiment of the present disclosure that involves the silica aerogel sheet. The average pore size can be determined using a Quantachrome "autosorb-iQ" gas absorption analyzer, which is commercially available from Anton Paar (Graz, Austria) along with calculating average pore size using density functional theory (DFT) calculations.

The silica aerogel sheet can also have a specific surface area of at least 750 $m^2/g$, such as at least 800 $m^2/g$, at least 850 $m^2/g$, at least 900 $m^2/g$, at least 950 $m^2/g$, or at least 1000 $m^2/g$. This can optionally be the case for any embodiment of the present disclosure that involves the hydrophobic silica aerogel sheet, preferably in combination with an average pore diameter in one or more (optionally all) of the ranges noted in the paragraph above and/or in combination with a density of between 100 mg/cc and 150 mg/cc, optionally in further combination with visible transmission and haze levels in the ranges noted above (e.g., $T_{vis}$ of at least 97.8%, perhaps at least 98%, at least 98.6%, or at least 99%, together with haze of 3% or less, 2% or less, 1.75% or less, or 1.5% or less). The specific surface area can also be determined using a Quantachrome "autosorb-iQ" gas absorption analyzer, which is commercially available from Anton Paar (Graz, Austria) along with calculating specific surface area using density functional theory (DFT) calculations.

Further, the silica aerogel sheet can have a water contact angle of at least 90°, such as at least 95°, at least 100°, at least 105°, at least 110°, at least 115°, at least 120°, or at least 125°. A Ramé-Hart Contact Angle Goniometer (Model No. 100-00) was used for the detection of static contact angle measurement. The measurement was performed by using a traditional sessile drop technique.

The silica aerogel sheet can also have a linear shrinkage (X/Y direction) of 4% or less, 3.5% or less, 3% or less, 2.5% or less, 2% or less, 1.75% or less, or perhaps 1.7% or less. Sample images were taken with a regular camera with known scale. The images were analyzed with image J software and the final length of the aerogel was determined after CPD drying with respect to the known initial length (Initial length-120 mm).

Certain embodiments provide a hydrophobic silica aerogel sheet synthesized from TMOS and MTMS and having a visible transmission of at least 97.8% and a haze value of 3% or less. The hydrophobic silica aerogel sheet can also include at least one of the following features (A) through (E):

(A) a water contact angle of at least 90°;
(B) a thermal conductivity in air of 13.5 mW/m·K or less;
(C) a flexural modulus of 6000 kPa or less;
(D) a specific surface area of at least 750 $m^2/g$;
(E) an average pore diameter of 30 nm or less.

The hydrophobic silica aerogel sheet can optionally include at least two of the features (A) through (E), at least three of the features (A) through (E), at least four of the features (A) through (E), or all of the features (A) through (E). Also, in some cases, the visible transmission of the hydrophobic silica aerogel sheet is at least 98.6%, and the haze value is 2.5% or less. In further cases, the visible transmission of the hydrophobic silica aerogel sheet is at least 99%, and the haze value is 2% or less. The water contact angle in feature (A) can optionally be at least 100°, such as at least 110° or at least 120°. The flexural modulus in feature (C) can optionally be 4500 kPa or less. Further, the specific surface area in feature (D) can optionally be at least 800 $m^2/g$. Even further, the average pore diameter in feature (E) can optionally be 27 nm or less.

Other embodiments provide a hydrophobic silica aerogel sheet synthesized from TMOS and MTMS and having a visible transmission of at least 98% and a haze value of 2% or less. The hydrophobic silica aerogel sheet can also include at least one of the following features (A) through (E):

(A) a water contact angle of at least 110°;
(B) a thermal conductivity in air of 13 mW/m·K or less;
(C) a flexural modulus of 6000 kPa or less;
(D) a specific surface area of at least 750 $m^2/g$;
(E) an average pore diameter of 29 nm or less.

Again, the hydrophobic silica aerogel sheet can optionally include at least two of the features (A) through (E), at least three of the features (A) through (E), at least four of the features (A) through (E), or all of the features (A) through (E).

Other embodiments provide a hydrophobic silica aerogel sheet synthesized from TMOS and MTMS and having a visible transmission of at least 98.6% and a haze value of 1.5% or less. The hydrophobic silica aerogel sheet can also include at least one of the following features (A) through (E):

(A) a water contact angle of at least 120°;
(B) a thermal conductivity in air of 13 mW/m·K or less;
(C) a flexural modulus of 6000 kPa or less;
(D) a specific surface area of at least 900 $m^2/g$;
(E) an average pore diameter of 28 nm or less.

Here too, the hydrophobic silica aerogel sheet can optionally include at least two of the features (A) through (E), at least three of the features (A) through (E), at least four of the features (A) through (E) or all of the features (A) through (E).

EXAMPLES

Exemplary hydrophobic silica aerogel sheets (Examples #1-#4) were prepared using TMOS and MTMS at densities of 100 mg/cc, 120 mg/cc, 150 mg/cc, and 200 mg/cc. In these examples, a hydrophobic silica wet gel sheet was formed before aging was completed. Properties obtained for hydrophobic silica aerogel sheets obtained for these examples were also measured using methods described herein and tabulated in Tables 1-2.

Example #1 (TMOS/MTMS at 3.7:1 Ratio at 100 mg/cc)

Example #1 was prepared according to the following steps:

A. Preparing a first solution by mixing 8 mL TMOS and 17 mL methanol. The weight percent of the first solution included TMOS at a weight percent of 38.13% and methanol at a weight percent of 61.87%.
B. Preparing a second solution by mixing 17 mL methanol, 0.08 mL ammonium hydroxide, and 6.92 mL water. The weight percent of the second solution included methanol at a weight percent of 65.66%, water at a weight percent of 33.98%, and ammonium hydroxide at a weight percent of 0.36%.
C. Mixing the first solution and second solution together to form a mixed solution. The weight percent of the mixed solution included TMOS at a weight percent of 19.63%, methanol at a weight percent of 63.71%, water at a weight percent of 19.49%, and ammonium hydroxide at a weight percent of 0.17%.
D. Depositing the mixed solution into a mold having interior dimensions of 5 inches by 5 inches by 3.5 mm. Sealing the mold to provide an airtight environment.
E. Allowing components in the mixed solution to react to form a silica wet gel sheet having dimensions of 5 inches by 5 inches by 3.5 mm.
F. Preparing a third solution by mixing 2 mL MTMS and 20 mL methanol. The MTMS was provided in a controlled amount such that a molar ratio of the TMOS: MTMS was 3.7:1. The weight percent of the third solution included MTMS at a weight percent of 10.83%, and methanol at a weight percent of 89.17%.
G. Begin aging the silica wet gel sheet in the mold at room temperature for a time period of 240 hours.
H. Adding the third solution to the silica wet gel sheet in the mold before aging is complete.
I. Allowing the third solution to react with the silica wet gel sheet to form a hydrophobic silica wet gel sheet. The total weight percent of all components used to form the hydrophobic silica wet gel sheet of Example #1 is listed in Table 1.
J. Removing the hydrophobic silica wet gel sheet from the mold.
K. Placing the hydrophobic silica wet gel sheet in a first methanol bath and allowing solvent exchange to take place for 8 hours.
L. Placing the hydrophobic silica wet gel sheet in a second methanol bath and allowing solvent exchange to take place for 8 more hours.
M. Placing the hydrophobic wet gel sheet in a dryer and performing critical point drying with a complete $CO_2$ exchange to obtain a hydrophobic silica aerogel sheet.

Properties obtained for the resulting hydrophobic silica aerogel sheet of Example #1 are shown in Table 1.

Example #2 (TMOS/MTMS at 4.6:1 Ratio at 120 mg/cc)

Example #2 was prepared according to the following steps:

A. Preparing a first solution by mixing 10 mL TMOS and 16.5 mL methanol. The weight percent of the first solution included TMOS at a weight percent of 44.25% and methanol at a weight percent of 55.75%.
B. Preparing a second solution by mixing 16.5 mL methanol, 0.08 mL ammonium hydroxide, and 6.92 mL water. The weight percent of the second solution included methanol at a weight percent of 64.99%, water at a weight percent of 34.65%, and ammonium hydroxide at a weight percent of 0.36%.
C. Mixing the first solution and second solution together to form a mixed solution. The weight percent of the mixed solution included TMOS at a weight percent of 23.81%, methanol at a weight percent of 60.02%, water at a weight percent of 16%, and ammonium hydroxide at a weight percent of 0.17%.
D. Depositing the mixed solution into a mold having interior dimensions of 5 inches by 5 inches by 3.5 mm. Sealing the mold to provide an airtight environment.
E. Allowing components in the mixed solution to react to form a silica wet gel sheet having dimensions of 5 inches by 5 inches by 3.5 mm.
F. Preparing a third solution by mixing 2 mL MTMS and 20 mL methanol. The MTMS was provided in a controlled amount such that a molar ratio of the TMOS: MTMS was 4.6:1. The weight percent of the third solution included MTMS at a weight percent of 10.83% and methanol at a weight percent of 89.17%.
G. Begin aging the silica wet gel sheet in the mold at room temperature for a time period of 240 hours.
H. Adding the third solution to the silica wet gel sheet in the mold before aging is complete.
I. Allowing the third solution to react with the silica wet gel sheet to form a hydrophobic silica wet gel sheet. The total weight percent of all components used to form the hydrophobic silica wet gel sheet of Example #2 is listed in Table 1.

Steps J through M were repeated as performed in Example #1. Properties obtained for the resulting hydrophobic silica aerogel sheet of Example #2 are shown in Table 1.

Example #3 (TMOS/MTMS at 6.9:1 Ratio at 150 mg/cc)

Example #3 was prepared according to the following steps:

A. Preparing a first solution by mixing 15 mL TMOS and 16 mL methanol. The weight percent of the first solution included TMOS at a weight percent of 55.11% and methanol at a weight percent of 44.89%.

B. Preparing a second solution by mixing 16 mL methanol, 0.08 mL ammonium hydroxide, and 6.92 mL water. The weight percent of the second solution included methanol at a weight percent of 64.28%, water at a weight percent of 35.35%, and ammonium hydroxide at a weight percent of 0.37%.

C. Mixing the first solution and second solution together to form a mixed solution. The weight percent of the mixed solution included TMOS at a weight percent of 32.45%, methanol at a weight percent of 52.87%, water at a weight percent of 14.53%, and ammonium hydroxide at a weight percent of 0.15%.

D. Depositing the mixed solution into a mold having interior dimensions of 5 inches by 5 inches by 3.5 mm. Sealing the mold to provide an airtight environment.

E. Allowing components in the mixed solution to react to form a silica wet gel having dimensions of 5 inches by 5 inches by 3.5 mm.

F. Preparing a third solution by mixing 2 mL MTMS and 20 mL methanol. The MTMS was provided in a controlled amount such that a molar ratio of the TMOS:MTMS was 6.9:1. The weight percent of the third solution included MTMS at a weight percent of 10.83%, and methanol at a weight percent of 89.17%.

G. Begin aging the silica wet gel sheet in the mold at room temperature for a time period of 240 hours.

H. Adding the third solution to the silica wet gel in the mold before aging is complete.

I. Allowing the third solution to react with the silica wet gel sheet to form a hydrophobic silica wet gel sheet. The total weight percent of all components used to form the hydrophobic silica wet gel sheet of Example #3 is listed in Table 1.

Steps J through M were repeated as performed in Example #1. Properties obtained for the resulting hydrophobic silica aerogel sheet of Example #3 are shown in Table 1.

Example #4 (TMOS/MTMS at 9.2:1 Ratio at 200 mg/cc)

Example #4 was prepared according to the following steps:

A. Preparing a first solution by mixing 20 mL TMOS and 15.5 mL methanol. The weight percent of the first solution included TMOS at a weight percent of 62.82% and methanol at a weight percent of 37.18%.

B. Preparing a second solution by mixing 15.5 mL methanol, 0.1 mL ammonium hydroxide, and 9.9 mL water. The weight percent of the second solution included methanol at a weight percent of 54.96%, water at a weight percent of 44.63%, and ammonium hydroxide at a weight percent of 0.41%.

C. Mixing the first solution and second solution together to form a mixed solution. The weight percent of the mixed solution included TMOS at a weight percent of 37.47%, methanol at a weight percent of 44.35%, water at a weight percent of 18%, and ammonium hydroxide at a weight percent of 0.17%.

D. Depositing the mixed solution into a mold having interior dimensions of 5 inches by 5 inches by 3.5 mm. Sealing the mold to provide an airtight environment.

E. Allowing components in the mixed solution to react to form a silica wet gel having dimensions of 5 inches by 5 inches by 3.5 mm.

F. Preparing a third solution by mixing 2 mL MTMS and 20 mL methanol. The MTMS was provided in a controlled amount such that a molar ratio of the TMOS:MTMS was 9.2:1. The weight percent of the third solution included MTMS at a weight percent of 10.83% and methanol at a weight percent of 89.17%.

G. Begin aging the silica wet gel sheet in the mold at room temperature for a time period of 240 hours.

H. Adding the third solution to the silica wet gel in the mold before aging is complete.

I. Allowing the third solution to react with the silica wet gel sheet to form a hydrophobic silica wet gel sheet. The total weight percent of all components used to form the hydrophobic silica wet gel sheet of Example #4 is listed in Table 1.

Steps J through M were repeated as performed in Example #1. Properties obtained for the resulting hydrophobic silica aerogel sheet of Example #4 are shown in Table 1.

TABLE 1

| | Example #1 | Example #2 | Example #3 | Example #4 |
|---|---|---|---|---|
| Density | 100 mg/cc | 120 mg/cc | 150 mg/cc | 200 mg/cc |
| TMOS | 13.821 wt % | 16.915 wt % | 23.676 wt % | 28.368 wt % |
| MTMS | 3.204 wt % | 3.137 wt % | 2.927 wt % | 2.630 wt % |
| Methanol | 71.246 wt % | 68.464 wt % | 62.681 wt % | 55.244 wt % |
| Water | 11.607 wt % | 11.364 wt % | 10.604 wt % | 13.633 wt % |
| $NH_4OH$ | 0.122 wt % | 0.120 wt % | 0.112 wt % | 0.125 wt % |
| TMOS:MTMS Molar Ratio | 3.7:1 | 4.6:1 | 6.9:1 | 9.2:1 |
| Transmission | 98.5-99.2% | 98.2-99.0% | 98.0-99.0% | 97.8-98.5% |
| Haze | 1.5-1.8 | 1.6-1.9 | 1.8-2.2 | 2.1-2.9 |
| Water Contact Angle | 110 | 110 | 110 | 110 |
| Thermal Conductivity | 11-13 mW/m · K | 11-13 mW/m · K | 11-13 mW/m · K | 11-13 mW/m · K |
| Specific Surface Area | 900-1000 $m^2/g$ | 800-950 $m^2/g$ | 800-850 $m^2/g$ | 750-850 $m^2/g$ |
| Average Pore Size | 16-19 nm | 18-23 nm | 18-27 nm | 19-30 nm |
| Shrinkage | 1.70% | 1.75% | 1.75% | 1.60% |
| Thickness | 3.5 mm | 3.5 mm | 3.5 mm | 3.5 mm |

Example #5 (TMOS/MTMS at 3.8:1 Ratio at 100 mg/cc)

Example #5 was prepared according to the following steps:

A. Preparing a first solution by mixing 8 mL TMOS and 17 mL methanol. The weight percent of the first solution included TMOS at a weight percent of 38.13% and methanol at a weight percent of 61.87%.

B. Preparing a second solution by mixing 17 mL methanol, 0.024 mL ammonium hydroxide, and 6.98 mL water. The weight percent of the second solution included methanol at a weight percent of 65.65%, water at a weight percent of 34.24%, and ammonium hydroxide at a weight percent of 0.11%.

C. Mixing the first solution and second solution together to form a mixed solution. The weight percent of the mixed solution included TMOS at a weight percent of 19.63%, methanol at a weight percent of 63.7%, water at a weight percent of 16.62%, and ammonium hydroxide at a weight percent of 0.05%.

D. Depositing the mixed solution into a mold having interior dimensions of 5 inches by 5 inches by 3.5 mm. Sealing the mold to provide an airtight environment.

E. Allowing components in the mixed solution to react to form a silica wet gel sheet having dimensions of 5 inches by 5 inches by 3.5 mm.

F. Preparing a third solution by mixing 2 mL MTMS and 20 mL methanol. The MTMS was provided in a controlled amount such that a molar ratio of the TMOS: MTMS was 3.86:1. The weight percent of the third solution included MTMS at a weight percent of 10.83% and methanol at a weight percent of 89.17%.

G. Begin aging the silica wet gel sheet in the mold at room temperature for a time period of 240 hours.

H. Adding the third solution to the silica wet gel sheet in the mold before aging is complete.

I. Allowing the third solution to react with the silica wet gel sheet to form a hydrophobic silica wet gel sheet. The total weight percent of all components used to form the hydrophobic silica wet gel sheet of Example #5 is listed in Table 2.

Steps J through M were repeated as performed in Example #1. Properties obtained for the resulting hydrophobic silica aerogel sheet of Example #5 are shown in Table 2.

Example #6 (TMOS/MTMS at 4.83:1 Ratio at 120 mg/cc)

Example #6 was prepared according to the following steps:

A. Preparing a first solution by mixing 10 mL TMOS and 16.5 mL methanol. The weight percent of the first solution included TMOS at a weight percent of 44.25% and methanol at a weight percent of 55.75%.

B. Preparing a second solution by mixing 16.5 mL methanol, 0.024 mL ammonium hydroxide, and 6.98 mL water. The weight percent of the second solution included methanol at a weight percent of 64.97%, water at a weight percent of 34.92%, and ammonium hydroxide at a weight percent of 0.11%.

C. Mixing the first solution and second solution together to form a mixed solution. The weight percent of the mixed solution included TMOS at a weight percent of 23.81%, methanol at a weight percent of 60.01%, water at a weight percent of 16.13%, and ammonium hydroxide at a weight percent of 0.05%.

D. Depositing the mixed solution into a mold having interior dimensions of 5 inches by 5 inches by 3.5 mm. Sealing the mold to provide an airtight environment.

E. Allowing components in the mixed solution to react to form a silica wet gel sheet having dimensions of 5 inches by 5 inches by 3.5 mm.

F. Preparing a third solution by mixing 2 mL MTMS and 20 mL methanol. The MTMS was provided in a controlled amount such that a molar ratio of the TMOS: MTMS was 4.83:1. The weight percent of the third solution included MTMS at a weight percent of 10.83% and methanol at a weight percent of 89.17%.

G. Begin aging the silica wet gel sheet in the mold at room temperature for a time period of 240 hours.

H. Adding the third solution to the silica wet gel sheet in the mold before aging is complete.

I. Allowing the third solution to react with the silica wet gel sheet to form a hydrophobic silica wet gel sheet. The total weight percent of all components used to form the hydrophobic silica wet gel sheet of Example #6 is listed in Table 2.

Steps J through M were repeated as performed in Example #1. Properties obtained for the resulting hydrophobic silica aerogel sheet of Example #6 are shown in Table 2.

Example #7 (TMOS/MTMS at 5.79:1 Ratio at 150 mg/cc)

Example #7 was prepared according to the following steps:

A. Preparing a first solution by mixing 15 mL TMOS and 14 mL methanol. The weight percent of the first solution included TMOS at a weight percent of 58.38% and methanol at a weight percent of 41.62%.

B. Preparing a second solution by mixing 14 mL methanol, 0.024 mL ammonium hydroxide, and 6.98 mL water. The weight percent of the second solution included methanol at a weight percent of 61.15%, water at a weight percent of 38.73%, and ammonium hydroxide at a weight percent of 0.12%.

C. Mixing the first solution and second solution together to form a mixed solution. The weight percent of the mixed solution included TMOS at a weight percent of 34.74%, methanol at a weight percent of 49.52%, water at a weight percent of 15.69%, and ammonium hydroxide at a weight percent of 0.05%.

D. Depositing the mixed solution into a mold having interior dimensions of 5 inches by 5 inches by 3.5 mm. Sealing the mold to provide an airtight environment.

E. Allowing components in the mixed solution to react to form a silica wet gel having dimensions of 5 inches by 5 inches by 3.5 mm.

F. Preparing a third solution by mixing 2.5 mL MTMS and 20 mL methanol. The MTMS was provided in a controlled amount such that a molar ratio of the TMOS: MTMS was 5.79:1. The weight percent of the third solution included MTMS at a weight percent of 13.18% and methanol at a weight percent of 86.82%.

G. Begin aging the silica wet gel sheet in the mold at room temperature for a time period of 240 hours.

H. Adding the third solution to the silica wet gel in the mold before aging is complete.

I. Allowing the third solution to react with the silica wet gel sheet to form a hydrophobic silica wet gel sheet. The total weight percent of all components used to form the hydrophobic silica wet gel sheet of Example #7 is listed in Table 2.

Steps J through M were repeated as performed in Example #1. Properties obtained for the resulting hydrophobic silica aerogel sheet of Example #7 are shown in Table 2.

Example #8 (TMOS/MTMS at 6.11:1 Ratio at 200 mg/cc)

Example #8 was prepared according to the following steps:

A. Preparing a first solution by mixing 19 mL TMOS and 11.5 mL methanol. The weight percent of the first solution included TMOS at a weight percent of 68.39% and methanol at a weight percent of 31.61%.

B. Preparing a second solution by mixing 11.5 mL methanol, 0.024 mL ammonium hydroxide, and 6.89 mL water. The weight percent of the second solution included methanol at a weight percent of 56.38%, water at a weight percent of 43.48%, and ammonium hydroxide at a weight percent of 0.14%.

C. Mixing the first solution and second solution together to form a mixed solution. The weight percent of the mixed solution included TMOS at a weight percent of 43.82%, methanol at a weight percent of 50.51%, water at a weight percent of 15.62%, and ammonium hydroxide at a weight percent of 0.05%.

D. Depositing the mixed solution into a mold having interior dimensions of 5 inches by 5 inches by 3.5 mm. Sealing the mold to provide an airtight environment.

E. Allowing components in the mixed solution to react to form a silica wet gel having dimensions of 5 inches by 5 inches by 3.5 mm.

F. Preparing a third solution by mixing 3 mL MTMS and 20 mL methanol. The MTMS was provided in a controlled amount such that a molar ratio of the TMOS:MTMS was 6.11:1. The weight percent of the third solution included MTMS at a weight percent of 15.41% and methanol at a weight percent of 84.59%.

G. Begin aging the silica wet gel sheet in the mold at room temperature for a time period of 240 hours.

H. Adding the third solution to the silica wet gel in the mold before aging is complete.

I. Allowing the third solution to react with the silica wet gel sheet to form a hydrophobic silica wet gel sheet. The total weight percent of all components used to form the hydrophobic silica wet gel sheet of Example #8 is listed in Table 2.

Steps J through M were repeated as performed in Example #1. Properties obtained for the resulting hydrophobic silica aerogel sheet of Example #8 are shown in Table 2.

TABLE 2

| | Example #5 | Example #6 | Example #7 | Example #8 |
|---|---|---|---|---|
| Density | 100 mg/cc | 120 mg/cc | 150 mg/cc | 200 mg/cc |
| TMOS | 13.820 wt % | 16.914 wt % | 24.684 wt % | 30.937 wt % |
| MTMS | 3.203 wt % | 3.136 wt % | 3.814 wt % | 4.529 wt % |
| Methanol | 71.240 wt % | 68.459 wt % | 60.322 wt % | 53.471 wt % |
| Water | 11.700 wt % | 11.455 wt % | 11.145 wt % | 11.028 wt % |
| $NH_4OH$ | 0.037 wt % | 0.036 wt % | 0.035 wt % | 0.035 wt % |
| TMOS:MTMS Molar Ratio | 3.86:1 | 4.83:1 | 5.79:1 | 6.11:1 |
| Transmission | 98.5-99.2% | 98.2-99.0% | 98.0-99.0% | 97.8-98.5% |
| Haze | 1.5-1.8 | 1.6-1.9 | 1.8-2.2 | 2.1-2.9 |
| Water Contact Angle | 110 | 110 | 110 | 110 |
| Thermal Conductivity | 11-13 mW/m · K | 11-13 mW/m · K | 11-13 mW/m · K | 11-13 mW/m · K |
| Specific Surface Area | 900-1000 $m^2/g$ | 800-950 $m^2/g$ | 800-850 $m^2/g$ | 750-850 $m^2/g$ |
| Average Pore Size | 16-19 nm | 18-23 nm | 18-27 nm | 19-30 nm |
| Shrinkage | 1.70% | 1.75% | 1.75% | 1.60% |
| Thickness | 3.5 mm | 3.5 mm | 3.5 mm | 3.5 mm |

Additional exemplary hydrophobic silica aerogel sheets (Examples #9-#16) were prepared using TMOS and MTMS at densities of 100 mg/cc, 120 mg/cc, 150 mg/cc, and 200 mg/cc. In these examples, a hydrophobic silica wet gel sheet was formed after aging was completed. Properties obtained for hydrophobic silica aerogel sheets in these examples were also measured using methods described herein and tabulated in Tables 3-4.

Example #9 (TMOS/MTMS at 3.7:1 Ratio at 100 mg/cc)

Example #9 was prepared according to the following steps:

A. Preparing a first solution by mixing 8 mL TMOS and 17 mL methanol. The weight percent of the first solution included TMOS at a weight percent of 38.13% and methanol at a weight percent of 61.87%.

B. Preparing a second solution by mixing 17 mL methanol, 0.08 mL ammonium hydroxide and 6.92 mL water. The weight percent of the second solution included methanol at a weight percent of 65.66%, water at a weight percent of 33.98%, and ammonium hydroxide at a weight percent of 0.36%.

C. Mixing the first solution and second solution together to form a mixed solution. The weight percent of the mixed solution included TMOS at a weight percent of 19.63%, methanol at a weight percent of 63.71%, water at a weight percent of 16.49%, and ammonium hydroxide at a weight percent of 0.17%.

D. Depositing the mixed solution into a mold having interior dimensions of 5 inches by 5 inches by 3.5 mm. Sealing the mold to provide an airtight environment.

E. Allowing components in the mixed solution to react to form a silica wet gel sheet having dimensions of 5 inches by 5 inches by 3.5 mm.

F. Aging the silica wet gel sheet in the mold at room temperature for a time period of 240 hours.

G. Preparing a third solution by mixing 2 mL MTMS and 398 mL methanol. The MTMS was provided in a controlled amount such that a molar ratio of the TMOS:MTMS was 3.7:1. The weight percent of the third solution included MTMS at a weight percent of 0.61% and methanol at a weight percent of 99.39%.

H. Adding the third solution to the aged silica wet gel sheet in the mold after aging is complete.

I. Allowing the third solution to react with the aged silica wet gel sheet to form a hydrophobic silica wet gel sheet. The total weight percent of all components used to form the hydrophobic silica wet gel sheet of Example #9 is listed in Table 3.

J. Removing the hydrophobic silica wet gel sheet from the mold.

K. Placing the hydrophobic silica wet gel sheet in a first methanol bath and allowing solvent exchange to take place for 8 hours.

L. Placing the hydrophobic silica wet gel sheet in a second methanol bath and allowing solvent exchange to take place for 8 more hours.

M. Placing the hydrophobic wet gel sheet in a dryer and performing critical point drying with a complete $CO_2$ exchange to obtain a hydrophobic silica aerogel sheet.

Properties obtained for the resulting hydrophobic silica aerogel sheet of Example #9 are shown in Table 3.

Example #10 (TMOS/MTMS at 4.6:1 Ratio at 120 mg/cc)

Example #10 was prepared according to the following steps:

A. Preparing a first solution by mixing 10 mL TMOS and 16.5 mL methanol. The weight percent of the first solution included TMOS at a weight percent of 44.25% and methanol at a weight percent of 55.75%.

B. Preparing a second solution by mixing 16.5 mL methanol, 0.08 mL ammonium hydroxide, and 6.92 mL water. The weight percent of the second solution included methanol at a weight percent of 64.99%, water at a weight percent of 34.65%, and ammonium hydroxide at a weight percent of 0.36%.

C. Mixing the first solution and second solution together to form a mixed solution. The weight percent of the mixed solution included TMOS at a weight percent of 23.81%, methanol at a weight percent of 60.02%, water at a weight percent of 16%, and ammonium hydroxide at a weight percent of 0.17%.

D. Depositing the mixed solution into a mold having interior dimensions of 5 inches by 5 inches by 3.5 mm. Sealing the mold to provide an airtight environment.

E. Allowing components in the mixed solution to react to form a silica wet gel sheet having dimensions of 5 inches by 5 inches by 3.5 mm.

F. Aging the silica wet gel sheet in the mold at room temperature for a time period of 240 hours.

G. Preparing a third solution by mixing 2 mL MTMS and 398 mL methanol. The MTMS was provided in a controlled amount such that a molar ratio of the TMOS: MTMS was 4.6:1. The weight percent of the third solution included MTMS at a weight percent of 0.61% and methanol at a weight percent of 99.39%.

H. Adding the third solution to the aged silica wet gel sheet in the mold after aging is complete.

I. Allowing the third solution to react with the aged silica wet gel sheet to form a hydrophobic silica wet gel sheet. The total weight percent of all components used to form the hydrophobic silica wet gel sheet of Example #10 is listed in Table 3.

Steps J through M were repeated as performed in Example #9. Properties obtained for the resulting hydrophobic silica aerogel sheet of Example #10 are shown in Table 3.

Example #11 (TMOS/MTMS at 6.9:1 Ratio at 150 mg/cc)

Example #11 was prepared according to the following steps:

A. Preparing a first solution by mixing 15 mL TMOS and 16 mL methanol. The weight percent of the first solution included TMOS at a weight percent of 55.11% and methanol at a weight percent of 44.89%.

B. Preparing a second solution by mixing 16 mL methanol, 0.08 mL ammonium hydroxide, and 6.92 mL water. The weight percent of the second solution included methanol at a weight percent of 64.28%, water at a weight percent of 35.35%, and ammonium hydroxide at a weight percent of 0.37%.

C. Mixing the first solution and second solution together to form a mixed solution. The weight percent of the mixed solution included TMOS at a weight percent of 32.45%, methanol at a weight percent of 52.87%, water at a weight percent of 14.53%, and ammonium hydroxide at a weight percent of 0.15%.

D. Depositing the mixed solution into a mold having interior dimensions of 5 inches by 5 inches by 3.5 mm. Sealing the mold to provide an airtight environment.

E. Allowing components in the mixed solution to react to form a silica wet gel sheet having dimensions of 5 inches by 5 inches by 3.5 mm.

F. Aging the silica wet gel sheet in the mold at room temperature for a time period of 240 hours.

G. Preparing a third solution by mixing 2 mL MTMS and 397 mL methanol. The MTMS was provided in a controlled amount such that a molar ratio of the TMOS: MTMS was 6.9:1. The weight percent of the third solution included MTMS at a weight percent of 0.61% and methanol at a weight percent of 99.39%.

H. Adding the third solution to the aged silica wet gel sheet in the mold after aging is complete.

I. Allowing the third solution to react with the aged silica wet gel sheet to form a hydrophobic silica wet gel sheet. The total weight percent of all components used to form the hydrophobic silica wet gel sheet of Example #11 is listed in Table 3.

Steps J through M were repeated as performed in Example #9. Properties obtained for the resulting hydrophobic silica aerogel sheet of Example #11 are shown in Table 3.

Example #12 (TMOS/MTMS at 9.2:1 Ratio at 200 mg/cc)

Example #12 was prepared according to the following steps:

A. Preparing a first solution by mixing 20 mL TMOS and 12.4 mL methanol. The weight percent of the first solution included TMOS at a weight percent of 67.87% and methanol at a weight percent of 32.13%.

B. Preparing a second solution by mixing 12.4 mL methanol, 0.1 mL ammonium hydroxide, and 9.9 mL water. The weight percent of the second solution included methanol at a weight percent of 49.4%, water at a weight percent of 50.14%, and ammonium hydroxide at a weight percent of 0.46%.

C. Mixing the first solution and second solution together to form a mixed solution. The weight percent of the mixed solution included TMOS at a weight percent of 41.12%, methanol at a weight percent of 38.94%, water at a weight percent of 19.76%, and ammonium hydroxide at a weight percent of 0.18%.

D. Depositing the mixed solution into a mold having interior dimensions of 5 inches by 5 inches by 3.5 mm. Sealing the mold to provide an airtight environment.

E. Allowing components in the mixed solution to react to form a silica wet gel sheet having dimensions of 5 inches by 5 inches by 3.5 mm.

F. Aging the silica wet gel sheet in the mold at room temperature for a time period of 240 hours.

G. Preparing a third solution by mixing 2 mL MTMS and 398 mL methanol. The MTMS was provided in a controlled amount such that a molar ratio of the TMOS:MTMS was 9.2:1. The weight percent of the third solution included MTMS at a weight percent of 0.61% and methanol at a weight percent of 99.39%.

H. Adding the third solution to the aged silica wet gel sheet in the mold after aging is complete.

I. Allowing the third solution to react with the aged silica wet gel sheet to form a hydrophobic silica wet gel sheet. The total weight percent of all components used to form the hydrophobic silica wet gel sheet of Example #12 is listed in Table 3.

Steps J through M were repeated as performed in Example #9. Properties obtained for the resulting hydrophobic silica aerogel sheet of Example #12 are shown in Table 3.

G. Preparing a third solution by mixing 2 mL MTMS and 398 mL methanol. The MTMS was provided in a controlled amount such that a molar ratio of the TMOS:MTMS was 3.86:1. The weight percent of the third solution included MTMS at a weight percent of 0.61% and methanol at a weight percent of 99.39%.

H. Adding the third solution to the aged silica wet gel sheet in the mold after aging is complete.

I. Allowing the third solution to react with the aged silica wet gel sheet to form a hydrophobic silica wet gel sheet. The total weight percent of all components used to form the hydrophobic silica wet gel sheet of Example #13 is listed in Table 4.

Steps J through M were repeated as performed in Example #9. Properties obtained for the resulting hydrophobic silica aerogel sheet of Example #13 are shown in Table 4.

TABLE 3

| | Example #9 | Example #10 | Example #11 | Example #12 |
|---|---|---|---|---|
| Density | 100 mg/cc | 120 mg/cc | 150 mg/cc | 200 mg/cc |
| TMOS | 2.308 wt % | 2.875 wt % | 4.270 wt % | 5.643 wt % |
| MTMS | 0.535 wt % | 0.533 wt % | 0.528 wt % | 0.523 wt % |
| Methanol | 95.197 wt % | 94.639 wt % | 93.269 wt % | 91.097 wt % |
| Water | 1.940 wt % | 1.933 wt % | 1.913 wt % | 2.712 wt % |
| $NH_4OH$ | 0.020 wt % | 0.020 wt % | 0.020 wt % | 0.025 wt % |
| TMOS:MTMS Molar Ratio | 3.7:1 | 4.6:1 | 6.9:1 | 9.2:1 |
| Visible Transmission | 98.5-99.5% | 98-99.5% | 98-99% | 97.8-98.9% |
| Haze | 1-1.3 | 1.4-1.6 | 1.3-1.6 | 1.5-1.9 |
| Water Contact Angle | 120-125 | 120-127 | 120-125 | 120-127 |
| Thermal Conductivity | 11-12.5 | 11-13 | 11-13.5 | 11-13.5 |
| Specific Surface Area | 995-1100 $m^2/g$ | 850-1000 $m^2/g$ | 800-900 $m^2/g$ | 750-900 $m^2/g$ |
| Average Pore Size | 15-22 nm | 18-22 nm | 19-25 nm | 19-27 nm |
| Shrinkage | 1.67% | 1.75% | 1.79% | 1.65% |
| Thickness | 3.5 mm | 3.5 mm | 3.5 mm | 3.5 mm |

Example #13 (TMOS/MTMS at 3.86:1 Ratio at 100 mg/cc)

Example #13 was prepared according to the following steps:

A. Preparing a first solution by mixing 8 mL TMOS and 17 mL methanol. The weight percent of the first solution included TMOS at a weight percent of 38.13% and methanol at a weight percent of 61.87%.

B. Preparing a second solution by mixing 17 mL methanol, 0.024 mL ammonium hydroxide, and 6.976 mL water. The weight percent of the second solution included methanol at a weight percent of 65.64%, water at a weight percent of 34.25%, and ammonium hydroxide at a weight percent of 0.11%.

C. Mixing the first solution and second solution together to form a mixed solution. The weight percent of the mixed solution included TMOS at a weight percent of 19.63%, methanol at a weight percent of 63.7%, water at a weight percent of 16.62%, and ammonium hydroxide at a weight percent of 0.05%.

D. Depositing the mixed solution into a mold having interior dimensions of 5 inches by 5 inches by 3.5 mm. Sealing the mold to provide an airtight environment.

E. Allowing components in the mixed solution to react to form a silica wet gel sheet having dimensions of 5 inches by 5 inches by 3.5 mm.

F. Aging the silica wet gel sheet in the mold at room temperature for a time period of 240 hours.

Example #14 (TMOS/MTMS at 4.83:1 Ratio at 120 Mg/Cc)

Example #14 was prepared according to the following steps:

A. Preparing a first solution by mixing 10 mL TMOS and 16.5 mL methanol. The weight percent of the first solution included TMOS at a weight percent of 44.25% and methanol at a weight percent of 55.75%.

B. Preparing a second solution by mixing 16.5 mL methanol, 0.024 mL ammonium hydroxide, and 6.976 mL water. The weight percent of the second solution included methanol at a weight percent of 64.97%, water at a weight percent of 34.92%, and ammonium hydroxide at a weight percent of 0.11%.

C. Mixing the first solution and second solution together to form a mixed solution. The weight percent of the mixed solution included TMOS at a weight percent of 23.81%, methanol at a weight percent of 60.01%, water at a weight percent of 16.13%, and ammonium hydroxide at a weight percent of 0.05%.

D. Depositing the mixed solution into a mold having interior dimensions of 5 inches by 5 inches by 3.5 mm. Sealing the mold to provide an airtight environment.

E. Allowing components in the mixed solution to react to form a silica wet gel sheet having dimensions of 5 inches by 5 inches by 3.5 mm.

F. Aging the silica wet gel sheet in the mold at room temperature for a time period of 240 hours.

G. Preparing a third solution by mixing 2 mL MTMS and 398 mL methanol. The MTMS was provided in a controlled amount such that a molar ratio of the TMOS: MTMS was 4.83:1. The weight percent of the third solution included MTMS at a weight percent of 0.61% and methanol at a weight percent of 99.39%.

H. Adding the third solution to the aged silica wet gel sheet in the mold after aging is complete.

I. Allowing the third solution to react with the aged silica wet gel sheet to form a hydrophobic silica wet gel sheet. The total weight percent of all components used to form the hydrophobic silica wet gel sheet of Example #14 is listed in Table 4.

Steps J through M were repeated as performed in Example #9. Properties obtained for the resulting hydrophobic silica aerogel sheet of Example #14 are shown in Table 4.

Example #15 (TMOS/MTMS at 5.79:1 Ratio at 150 mg/cc)

Example #15 was prepared according to the following steps:

A. Preparing a first solution by mixing 15 mL TMOS and 14 mL methanol. The weight percent of the first solution included TMOS at a weight percent of 58.38% and methanol at a weight percent of 41.62%.

B. Preparing a second solution by mixing 14 mL methanol, 0.024 mL ammonium hydroxide, and 6.976 mL water. The weight percent of the second solution included methanol at a weight percent of 61.15%, water at a weight percent of 38.73%, and ammonium hydroxide at a weight percent of 0.12%.

C. Mixing the first solution and second solution together to form a mixed solution. The weight percent of the mixed solution included TMOS at a weight percent of 34.74%, methanol at a weight percent of 49.52%, water at a weight percent of 15.69%, and ammonium hydroxide at a weight percent of 0.05%.

D. Depositing the mixed solution into a mold having interior dimensions of 5 inches by 5 inches by 3.5 mm. Sealing the mold to provide an airtight environment.

E. Allowing components in the mixed solution to react to form a silica wet gel sheet having dimensions of 5 inches by 5 inches by 3.5 mm.

F. Aging the silica wet gel sheet in the mold at room temperature for a time period of 240 hours.

G. Preparing a third solution by mixing 2.5 mL MTMS and 398 mL methanol. The MTMS was provided in a controlled amount such that a molar ratio of the TMOS: MTMS was 6.79:1. The weight percent of the third solution included MTMS at a weight percent of 0.76% and methanol at a weight percent of 99.24%.

H. Adding the third solution to the aged silica wet gel sheet in the mold after aging is complete.

I. Allowing the third solution to react with the aged silica wet gel sheet to form a hydrophobic silica wet gel sheet. The total weight percent of all components used to form the hydrophobic silica wet gel sheet of Example #15 is listed in Table 4.

Steps J through M were repeated as performed in Example #9. Properties obtained for the resulting hydrophobic silica aerogel sheet of Example #15 are shown in Table 4.

Example #16 (TMOS/MTMS at 6.11:1 Ratio at 200 mg/cc)

Example #16 was prepared according to the following steps:

A. Preparing a first solution by mixing 19 mL TMOS and 11.5 mL methanol. The weight percent of the first solution included TMOS at a weight percent of 68.39% and methanol at a weight percent of 31.61%.

B. Preparing a second solution by mixing 11.5 mL methanol, 0.024 mL ammonium hydroxide, and 6.976 mL water. The weight percent of the second solution included methanol at a weight percent of 56.38%, water at a weight percent of 43.48%, and ammonium hydroxide at a weight percent of 0.14%.

C. Mixing the first solution and second solution together to form a mixed solution. The weight percent of the mixed solution included TMOS at a weight percent of 43.82%, methanol at a weight percent of 40.51%, water at a weight percent of 15.62%, and ammonium hydroxide at a weight percent of 0.05%.

D. Depositing the mixed solution into a mold having interior dimensions of 5 inches by 5 inches by 3.5 mm. Sealing the mold to provide an airtight environment.

E. Allowing components in the mixed solution to react to form a silica wet gel sheet having dimensions of 5 inches by 5 inches by 3.5 mm.

F. Aging the silica wet gel sheet in the mold at room temperature for a time period of 240 hours.

G. Preparing a third solution by mixing 3 mL MTMS and 398 mL methanol. The MTMS was provided in a controlled amount such that a molar ratio of the TMOS: MTMS was 6.11:1. The weight percent of the third solution included MTMS at a weight percent of 0.91% and methanol at a weight percent of 99.09%.

H. Adding the third solution to the aged silica wet gel sheet in the mold after aging is complete.

I. Allowing the third solution to react with the aged silica wet gel sheet to form a hydrophobic silica wet gel sheet. The total weight percent of all components used to form the hydrophobic silica wet gel sheet of Example #16 is listed in Table 4.

Steps J through M were repeated as performed in Example #9. Properties obtained for the resulting hydrophobic silica aerogel sheet of Example #16 are shown in Table 4.

TABLE 4

| | Example #13 | Example #14 | Example #15 | Example #16 |
|---|---|---|---|---|
| Density | 100 mg/cc | 120 mg/cc | 150 mg/cc | 200 mg/cc |
| TMOS | 2.308 wt % | 2.875 wt % | 4.293 wt % | 5.427 wt % |
| MTMS | 0.535 wt % | 0.533 wt % | 0.663 wt % | 0.795 wt % |
| Methanol | 95.196 wt % | 94.638 wt % | 93.100 wt % | 91.838 wt % |
| Water | 1.955 wt % | 1.948 wt % | 1.938 wt % | 1.934 wt % |
| $NH_4OH$ | 0.006 wt % | 0.006 wt % | 0.006 wt % | 0.006 wt % |
| TMOS:MTMS Molar Ratio | 3.86:1 | 4.83:1 | 5.79:1 | 6.11:1 |
| Visible Transmission | 98.5-99.5% | 98-99.5% | 98-99% | 97.8-98.9% |
| Haze | 1-1.3 | 1.4-1.6 | 1.3-1.6 | 1.5-1.9 |

TABLE 4-continued

| | Example #13 | Example #14 | Example #15 | Example #16 |
|---|---|---|---|---|
| Water Contact Angle | 120-125 | 120-127 | 120-125 | 120-127 |
| Thermal Conductivity | 11-12.5 | 11-13 | 11-13.5 | 11-13.5 |
| Specific Surface Area | 995-1100 $m^2/g$ | 850-1000 $m^2/g$ | 800-900 $m^2/g$ | 750-900 $m^2/g$ |
| Average Pore Size | 15-22 nm | 18-22 nm | 19-25 nm | 19-27 nm |
| Shrinkage | 1.67% | 1.75% | 1.79% | 1.65% |
| Thickness | 3.5 mm | 3.5 mm | 3.5 mm | 3.5 mm |

Some embodiments provide an article 10 comprising a hydrophobic silica aerogel sheet as described herein. The article is not limited to window and other glazing applications, but rather can be any article designed to provide thermal insulation. For example, the hydrophobic silica aerogel sheet can be provided on articles such as glass, solar panels, vehicle roofs, walls of refrigerated trucks, walls of buildings and more.

Figure 5:
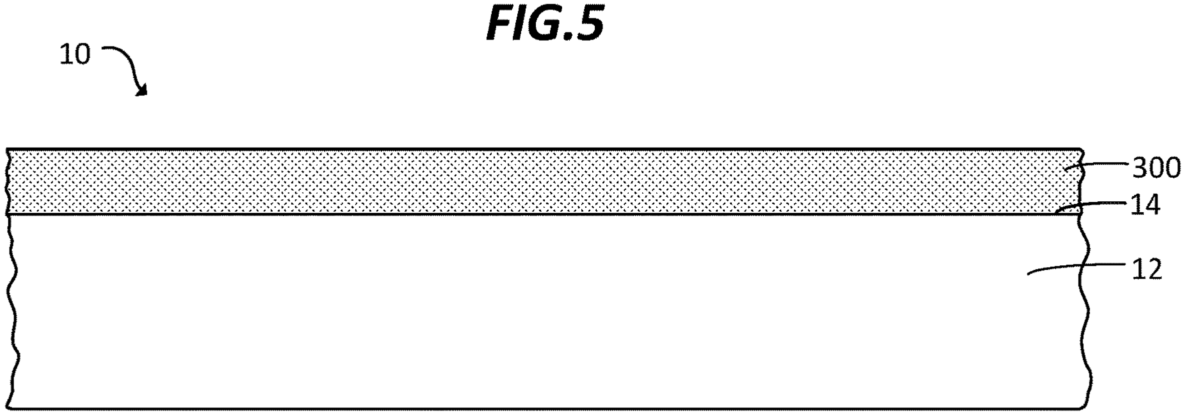
FIG. 5 is a schematic, broken-away, cross-sectional side view of an article that includes a glass sheet and a hydrophobic silica aerogel sheet in accordance with certain embodiments.

FIG. 5 illustrates an article 10 comprising a glass sheet 12 and a hydrophobic silica aerogel sheet 300. The hydrophobic silica aerogel sheet 300 is adhered to or otherwise carried or mounted alongside the glass sheet 12. The hydrophobic silica aerogel sheet 300 can have any of the features and properties discussed elsewhere herein.

The hydrophobic silica aerogel sheet 300 preferably is adhered to a surface 14 of the glass sheet 12. By saying the hydrophobic silica aerogel sheet 300 is "adhered to" a surface of a glass sheet, this does not require a separate adhesive, though an adhesive can optionally be used. It also does not require the hydrophobic silica aerogel sheet 300 to contact the glass; there may be a coating or layer therebetween. Thus, although "adhered to" may involve direct contact, the broader meaning as used herein is "carried alongside." This can optionally mean the hydrophobic silica aerogel sheet 300 is supported by the glass surface, and in some preferred embodiments the hydrophobic silica aerogel sheet 300 does contact the glass surface. In certain embodiments, there is at most one layer (e.g., an optical adhesive layer) between the hydrophobic silica aerogel sheet 300 and the glass sheet 12. In some cases, the hydrophobic silica aerogel sheet adheres to the glass sheet directly through van der Waals forces. In other cases, the hydrophobic silica aerogel sheet adheres to a glass sheet by an optical adhesive, optionally such that certain portions of the silica aerogel sheet are devoid of the optical adhesive. In embodiments of this nature, the optical adhesive can be located at a perimeter of the hydrophobic silica aerogel sheet.

A variety of known glass types can be used for the glass sheet 12, including soda-lime glass, borosilicate glass or aluminosilicate glass. In some cases, it may be desirable to use "white glass," a low iron glass, etc. For some applications, it may be desirable to use tinted glass for the glass sheet 12. Moreover, there may be applications where the glass sheet 12 is formed of extremely thin, flexible glass, such as glass sold under the trademark Willow glass by Corning Inc. (Corning, New York, U.S.A.). If desired, the glass sheet 12 may be formed of a chemically strengthened glass, such as glass sold under the trademark Gorilla glass by Corning Inc. In certain embodiments, the glass sheet is part of a window, door, skylight, or other glazing. In some cases, the glass sheet is part of a window insert or interior window designed to be retrofitted to an inside of an existing window. Exemplary window inserts are sold as Indow Inserts (Indow, Oregon, U.S.A.) or ComfortSEAL Interior Windows (Larson Manufacturing, South Dakota, U.S.A.). In alternative embodiments, the glass sheet 12 is replaced with a sheet formed of a polymer, such as polycarbonate, acrylic, or PVC. Various other polymer materials (e.g., transparent polymers) may be used in such alternative embodiments.

Glass sheets of many sizes can be used. Commonly, large-area glass sheets are used. For example, the glass sheet 12 can have a major dimension (e.g., a length or width) of at least about 0.1 meter, preferably at least about 0.5 meter, more preferably at least about 1 meter, or at least about 1.5 meters (e.g., between about 2 meters and about 4 meters), and in some cases at least about 3 meters. In some embodiments, the glass sheet 12 is a jumbo glass sheet having a length and/or width that is between about 3 meters and about 10 meters, e.g., a glass sheet 12 having a width of about 3.5 meters and a length of about 6.5 meters.

Glass sheets of various thicknesses can be used. In some embodiments, the glass sheet 12 can have a thickness of about 1-8 mm. In some cases, the glass sheet 12 has a thickness of between about 2.3 mm and about 4.8 mm, and more preferably between about 2.5 mm and about 4.8 mm. In one particular embodiment, the glass sheet 12 has a thickness of about 3 mm.

Figure 6:
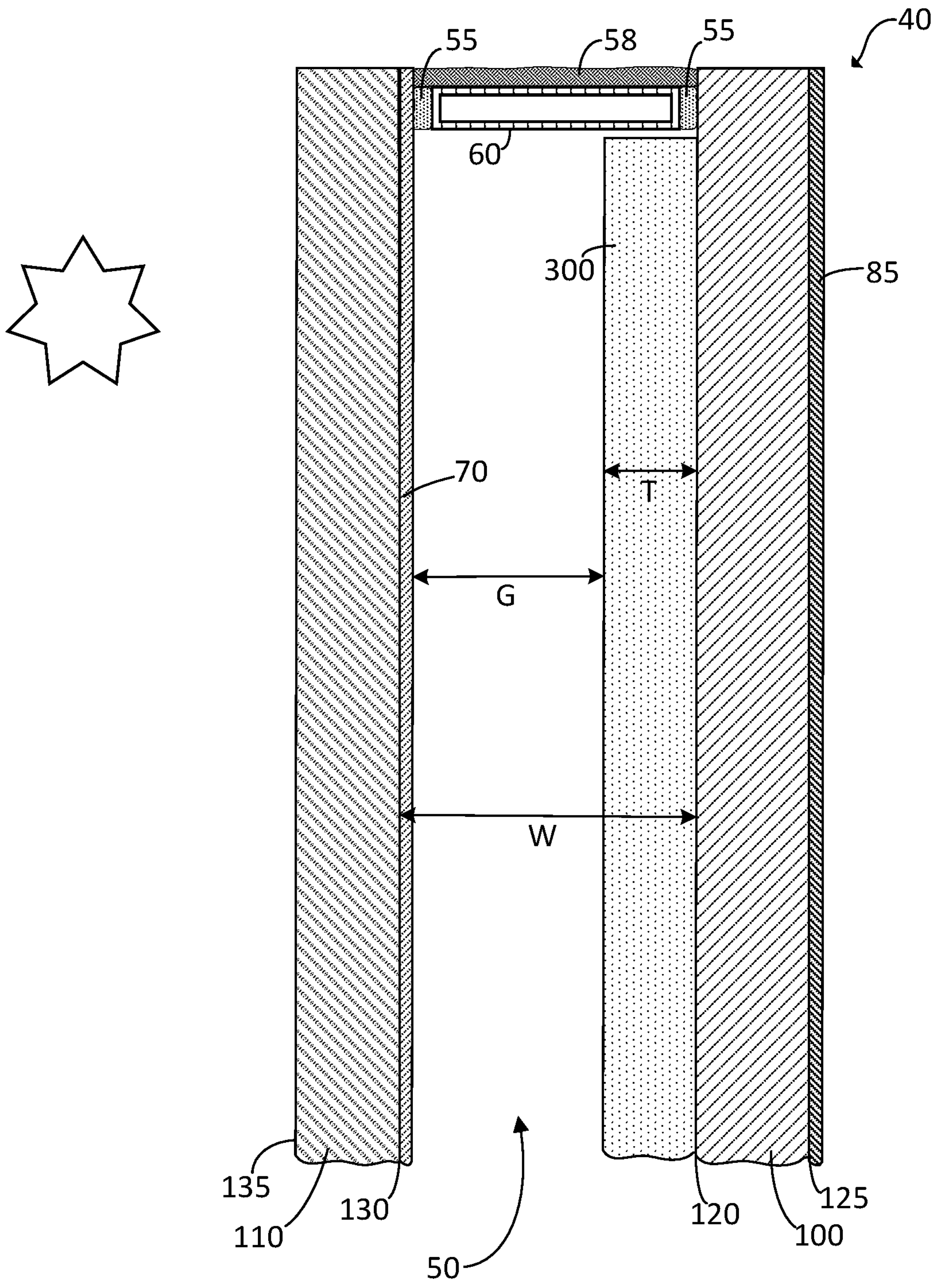
FIG. 6 is a schematic, partially broken-away, cross-sectional side view of an insulating glazing unit in accordance with certain embodiments.

Some embodiments provide an insulating glazing unit. FIG. 6 illustrates an insulating glazing unit 40 according to certain embodiments comprising a first glass sheet 100, a second glass sheet 110, and a between-pane space 50. The between-pane space 50 is located between the two glass sheets. The glass sheets 100, 110 can have any of the features described for a glass sheet elsewhere herein. In alternative embodiments, one or both glass sheets 100, 110 are replaced with sheets formed of a polymer, such as polycarbonate. Various other polymer materials may be used in such alternative embodiments. The insulating glazing unit further comprises a hydrophobic silica aerogel sheet 300 within the between-pane space 50. The hydrophobic silica aerogel sheet 300 can have any of the features and properties described elsewhere herein.

In some cases, the hydrophobic silica aerogel sheet 300 is a single aerogel sheet. In such cases, there is only one hydrophobic silica aerogel sheet 300 in the between-pane space 50. The single hydrophobic silica aerogel sheet 300 can, for example, have a major dimension (e.g., a length or width) of at least 0.375 meter, for example at least about 0.7 meter, 0.75 meter, 0.8 meter, 0.85 meter, 0.9 meter, 0.95 meter, 1.0 meter, or in some cases at least about 1.125 meters or 1.25 meters. In certain embodiments, the hydrophobic silica aerogel sheet 300 has a major dimension of between 0.7 meter and 3 meters.

In other cases, the hydrophobic silica aerogel sheet 300 comprises plurality of hydrophobic silica aerogel sheets. In such cases, there are a plurality of hydrophobic silica aerogel sheets in the between-pane space 50. A plurality of hydrophobic silica aerogel sheets may thus collectively define the hydrophobic silica aerogel sheet 300. When multiple aerogel sheets are used, they can be arranged in a tiled configuration between the two glass sheets 100, 110. When a tiled configuration is used, multiple aerogel sheets preferably are arranged in a non-overlapping manner so as to cover a majority (i.e., greater than 50%, preferably at least 75%) of the area of an adjacent interior glass surface 120, 130.

Whether the hydrophobic silica aerogel sheet 300 is formed by one or multiple aerogel sheets, it preferably covers more than 60% (e.g., more than 70%, more than 80%, or even more than 90%) of an adjacent interior glass surface 120, 130. A coverage within any one or more (e.g., all) of these ranges can optionally be used in any embodiment of the present disclosure.

When the hydrophobic silica aerogel sheet 300 comprises a plurality of aerogel sheets, those sheets can have any desired shape and tiling arrangement. As non-limiting examples, the aerogel sheets can be square, rectangular, or hexagonal in shape. In some embodiments, edges of each aerogel sheet are aligned both vertically and horizontally with edges of adjacent aerogel sheets. Reference is made to U.S. patent application Ser. No. 17/390,178, the teachings of which relating to aerogel sheet tiling arrangements are hereby incorporated by reference.

When multiple hydrophobic silica aerogel sheets are provided in a tiling arrangement, the size of the hydrophobic silica aerogel sheets is not particularly limited. In some cases, all of the hydrophobic silica aerogel sheets have the same dimensions. In other cases, some of the hydrophobic silica aerogel sheets have different dimensions (e.g., a greater length) compared to some of the other hydrophobic silica aerogel sheets. Preferably, each of the hydrophobic silica aerogel sheets has a length and a width of at least 10 cm. For each of the hydrophobic silica aerogel sheets, the length, the width, or both are preferably less than 1 meter. Such dimensions can provide one way for the hydrophobic silica aerogel sheets to be scaled-up so as to cover large areas between two glass sheets of an insulating glazing unit, while still allowing the hydrophobic silica aerogel sheets to be dried using a small high-pressure vessel. Larger or smaller hydrophobic silica aerogel sheets may alternatively be used. Moreover, in any embodiment of the present disclosure, a single aerogel sheet (rather than multiple aerogel sheets) can optionally be provided in a between-pane space.

In certain embodiments, the between-pane space 50 contains a gaseous atmosphere, preferably comprising a thermally insulative gas, such as argon, krypton, or both. In some cases, the gaseous atmosphere comprises a mix of argon and air (e.g., 90% argon and 10% air). In other cases, the gaseous atmosphere comprises a mix of krypton and air. In still other cases, the gaseous atmosphere comprises a mix of argon, krypton, and air. In yet other cases, the gaseous atmosphere is just air.

In certain cases, a gas gap G is provided in the between-pane space 50 alongside the hydrophobic silica aerogel sheet 300. In some cases, the gas gap G has a width in a range of from 9 to 14 mm and it contains a gaseous atmosphere comprising argon, air, or both. In certain cases, the between-pane space has a width W in a range of from 14 to 21 mm, the gaseous atmosphere comprises argon, and the width of the gas gap G is from 10.5 to 13.5 mm. Reference is made to U.S. patent application Ser. No. 17/389,603, the teachings of which relating to gas gap and between-pane space configurations are hereby incorporated by reference.

Certain embodiments include a spacer 60 between the two glass sheets 100, 110. The spacer 60 may be a conventional metal channel spacer, e.g., formed of stainless steel or aluminum. Or it can comprise polymer and metal, or just polymer (e.g., foam). The spacer can alternatively be an integral part of a sash, frame, etc. so as to maintain the IG unit in the desired configuration.

The spacer 60 can be adhered to the two glass sheets 100, 110 by one or more beads of sealant, as is conventional and well-known to skilled artisans. In FIG. 6, the spacer 60 is shown with a primary sealant 55 on opposite sides of the spacer 60 and a secondary sealant 58 provided on an outside wall of the spacer 60. Another option is to omit the secondary sealant and provide a single deposit of sealant along both sides of the spacer and on the outside wall of the spacer. Various other known sealant arrangements/systems can alternatively be used. In other cases, the spacer may be omitted while one or more beads of sealant (optionally together with a moisture vapor barrier) are provided about the perimeter of the unit so as to encompass the hydrophobic silica aerogel sheet 300.

In some embodiments, the hydrophobic silica aerogel sheet 300 does not contact the spacer 60. For example, the hydrophobic aerogel sheet 300 may be separated (i.e., spaced-apart) from the spacer 60 by about 1 mm to about 5 mm (e.g., about 2-4 mm, such as about 3 mm). When provided, the sealant 55, 58 between the spacer 60 and the two adjacent glass sheets 100, 110 can also be spaced from the hydrophobic silica aerogel sheet 300.

The first glass sheet 100 has opposed surfaces 120, 125, which preferably are opposed major surfaces (or "opposed faces"). Similarly, the second glass sheet 110 has opposed surfaces 130, 135, which preferably are opposed major surfaces. In some cases, surfaces 120 and 130 are interior surfaces facing a between-pane space 50, while surfaces 125 and 135 are exterior surfaces, e.g., such that surface 135 is an exterior surface exposed to an outdoor environment (and thus exposed to periodic contact with rain). This, however, is not required.

In some embodiments, the second glass sheet 110 is an outboard pane that defines both a #1 surface (i.e., surface 135) and a #2 surface (i.e., surface 130), while the first glass sheet 100 is an inboard pane that defines both a #3 surface (i.e., surface 120) and a #4 surface (i.e., surface 125). The IG unit 40 can optionally be mounted in a frame such that the #1 surface is exposed to an outdoor environment, while the #4 surface is exposed to an indoor environment (e.g., an environment inside a building).

The hydrophobic silica aerogel sheet 300 can be adhered to either the #2 surface or the #3 surface of the insulating glazing unit 40. Another option is to have hydrophobic silica aerogel sheets on both the #2 and the #3 surfaces. FIG. 6 illustrates one embodiment where the hydrophobic silica aerogel sheet 300 is adhered to an interior surface 120 (e.g., the #3 surface) of the first glass sheet 100.

While FIG. 6 shows a double-pane insulating glazing unit, other embodiments provide a triple-pane insulating glazing unit having a hydrophobic silica aerogel sheet 300 on the #2 surface, the #3 surface, the #4 surface, or the #5 surface. In triple-pane embodiments, hydrophobic silica aerogel sheets can optionally be provided on both the #3 surface and either the #4 or #5 surface. Another option is to provide hydrophobic silica aerogel sheets on both the #2 surface and the #4 or #5 surface. In one preferred group of embodiments, however, the insulating glazing unit 40 includes only two glass panes 100, 110 and only one between-pane space 50.

The hydrophobic silica aerogel sheet 300 has a thickness T. In some embodiments, the hydrophobic silica aerogel sheet 300 has a thickness in a range of from 1.5 mm to 15 mm, such as greater than 2 mm but less than 8 mm, or from 2 mm to 4 mm (e.g., 3 mm). It is to be appreciated, however, that other thicknesses can be used.

The between-pane space 50 has a thickness W, which is measured from the interior surface 130 of the second glass pane 110 to the interior surface 120 of the first glass pane 100. In certain embodiments, the hydrophobic silica aerogel sheet 300 does not occupy the entire thickness W of the between-pane space 50. In other cases, the hydrophobic silica aerogel sheet occupies the entire thickness of the between-pane space.

A ratio of the thickness T of the hydrophobic silica aerogel sheet 300 to the thickness W of the between-pane space 50 preferably is between 0.15 and 0.85. In some embodiments, the thickness W of the between-pane space 50 is at least 10 mm, optionally together with the thickness of the hydrophobic silica aerogel sheet 300 being greater than 2 mm but less than 8 mm. In certain preferred embodiments, the hydrophobic aerogel sheet 300 occupies less than 50% of the thickness W of the between-pane space 50 (e.g., less than 45%, less than 40%, or even less than 35% of the thickness W of the between-pane space 50).

In other embodiments, the hydrophobic silica aerogel sheet 300 occupies a majority of the thickness W of the between-pane space 50. In such instances, the thickness T of the hydrophobic silica aerogel sheet 300 preferably is greater than 8 mm but less than 15 mm (e.g., about 10 mm), while the thickness of the gas gap G alongside the hydrophobic silica aerogel sheet 300 is optionally less than 5 mm (e.g., about 3 mm).

Certain embodiments provide an insulating glazing unit 40 that includes both a hydrophobic silica aerogel sheet 300 and a low-emissivity coating 70. In some cases, the hydrophobic silica aerogel sheet 300 is provided on an interior surface of one glass sheet and the low-emissivity coating 70 is provided on an interior surface of the other glass sheet. FIG. 6 illustrates an embodiment that includes a hydrophobic silica aerogel sheet 300 on a #3 surface (i.e., surface 120) and an optional low-emissivity coating 70 on a #2 surface (i.e., surface 130). In another embodiment, a hydrophobic silica aerogel sheet is provided on a #2 surface (i.e., surface 130) and an optional low-emissivity or solar control coating is provided on a #3 surface (i.e., surface 120). In still another embodiment, both a hydrophobic silica aerogel sheet and a coating (e.g., a low-emissivity or solar control coating) are provided on a #2 surface, such as by having a low-emissivity coating on the #2 surface and the aerogel sheet on the low-emissivity coating.

When provided, the optional low-emissivity coating 70 preferably includes at least one silver-inclusive film, which desirably contains more than 50% silver by weight (e.g., a metallic silver film). In certain preferred embodiments, the low-emissivity coating 70 includes three or more infrared-reflective films (e.g., silver-containing films). Low-emissivity coatings having three or more infrared-reflective films are described in U.S. patent application Ser. No. 11/546,152 and U.S. Pat. Nos. 7,572,511 and 7,572,510 and 7,572,509 and Ser. No. 11/545,211 and U.S. Pat. Nos. 7,342,716 and 7,339,728, the teachings of each of which are incorporated herein by reference. In some cases, the low-emissivity coating 70 includes four silver layers. In other cases, the low-emissivity coating can be a "single silver" or "double silver" low-emissivity coating, which are well-known to skilled artisans. Advantageous coatings of this nature are commercially available from, for example, Cardinal CG Company (Eden Prairie, Minnesota, U.S.A.).

Certain embodiments provide an insulating glazing unit 40 that includes both a hydrophobic silica aerogel sheet 300 and an optional transparent conductive oxide coating 85. In some cases, the hydrophobic silica aerogel sheet 300 is provided on an interior surface of a glass sheet and a transparent conductive oxide coating 85 is provided on an exterior surface of a glass sheet. In certain embodiments, a hydrophobic silica aerogel sheet 300 is provided on an interior surface and a transparent conductive oxide coating 85 is provided on an exterior surface of the same glass sheet. FIG. 6 illustrates an embodiment where the hydrophobic silica aerogel sheet 300 is provided on a #3 surface (i.e., surface 120) and an optional transparent conductive oxide coating 85 is provided on a #4 surface (i.e., surface 125). Another option is to provide the hydrophobic silica aerogel sheet on a #2 surface (i.e., surface 120) in combination with providing optional transparent conductive oxide coating 85 on a #1 surface, on a #4 surface, or both.

When provided, the optional transparent conductive oxide coating 85 can include indium tin oxide. In alternate embodiments, zinc aluminum oxide, SnO:Sb, SnO:F, or another known transparent conductive oxide is used. In some cases, transparent conductive oxide coating 85 comprises tin oxide together with antimony, fluorine, or another dopant. Further, in some cases, the transparent conductive oxide coating 85 is a sputtered film. In other embodiments, the transparent conductive oxide coating 85 comprises a pyrolytic film that includes tin (e.g., comprising tin oxide together with antimony, fluorine, or another dopant). Also, in some cases, the transparent conductive oxide coating 85 includes carbon nanotubes.

When provided, the transparent conductive oxide coating 85 preferably is provided at a thickness of 10,000 Å or less, such as between about 1,000 Å and about 7,000 Å, e.g., from 1,000 Å to 1,750 Å, such as about 1,300-1,600 Å. For any embodiment where the transparent conductive oxide coating 85 is provided, it can optionally comprise a transparent conductive oxide film having a thickness of from 1,000 Å to 1,750 Å.

The transparent conductive oxide coating 85 can, for example, be a coating of the type described in any of U.S. Pat. Nos. 9,862,640 or 10,000,965 or 10,000,411 or Ser. No. 16/740,006, the teachings of which concerning the transparent conductive oxide coating are hereby incorporated herein by reference. In the embodiment of FIG. 6, the illustrated transparent conductive oxide coating 85 can optionally be omitted.

In some cases, the insulating glazing unit 40 includes both a transparent conductive oxide coating 85 and a low-emissivity coating 70. This, however, is by no means required. For example, in some cases, the insulating glazing unit 40 includes the low-emissivity coating 70 but is devoid of the transparent conductive oxide coating 85.

Other embodiments provide a method of making an insulating glazing unit. The method comprises forming a hydrophobic silica aerogel sheet according to any method described herein and assembling the hydrophobic silica aerogel sheet together with the first and second glass sheets 100, 110 in forming the insulating glazing unit. The hydrophobic silica aerogel sheet can be adhered to a surface of a glass sheet (e.g., through van der Waals forces, or by using an optical adhesive). The hydrophobic silica aerogel sheet may be placed either manually or, more preferably, with robotics. In some embodiments, the hydrophobic silica aerogel sheet is adhered to a temporary surface for handling and placement. The hydrophobic silica aerogel sheet can be picked up using electrostatic adhesion, e.g., using commercially available Stackit robots manufactured by Grabit, Inc. (Sunnyvale, California, U.S.A.) or using technology described in U.S. patent application Ser. No. 18/536,611, the contents of which are incorporated herein by reference.

Figure 7:
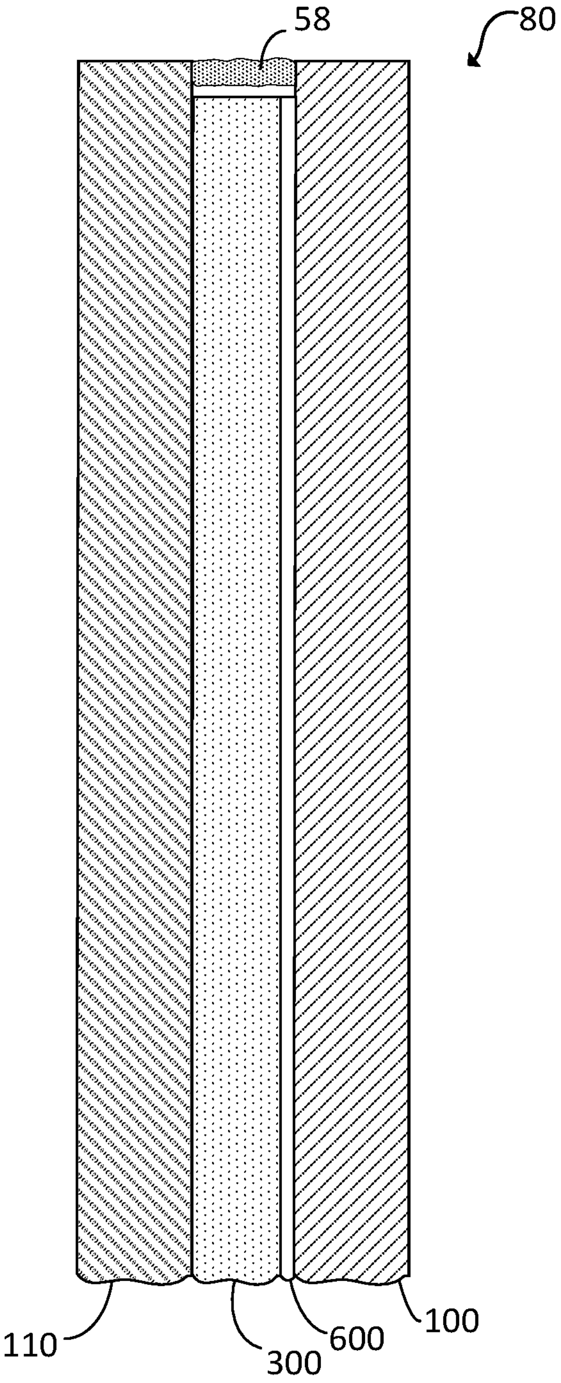
FIG. 7 is a schematic, partially broken-away, cross-sectional side view of a laminated glass assembly that includes a hydrophobic silica aerogel sheet in accordance with certain embodiments.

Certain embodiments provide a laminated glass assembly. FIG. 7 illustrates a laminated glass assembly 80 comprising a first glass sheet 100, a second glass sheet 110 and a hydrophobic silica aerogel sheet 300. In some embodiments, the laminated glass assembly 80 also includes a spacer. In other cases, the spacer is omitted and the laminated glass assembly 80 just has one or more beads of sealant 58 (optionally together with a foil moisture barrier, tape, or both) at the perimeter of the assembly.

The hydrophobic silica aerogel sheet 300 can have any of the features and properties discussed elsewhere herein. Likewise, the hydrophobic silica aerogel sheet 300 of the laminated glass assembly 80 can have the same dimensions and material properties as the hydrophobic silica aerogel sheet 300 described elsewhere herein for the insulating glazing unit 40.

The laminated glass assembly 80 can also include a polymer interlayer 400. The polymer interlayer 400 preferably is a tear-resistant polymer layer. In some cases, it is a sheet of ionoplast plastic. In other cases, it is a sheet of polyvinyl butyral (PVB). Various other materials known to be suitable for the interlayer of a laminated glass panel can also be used. In certain embodiments, both glass sheets 100, 110 can be clear 3 mm soda-lime float glass and the polymer interlayer 400 can be 0.30-inch thick PVB. It is to be appreciated, however, that these details are by no means limiting.

FIG. 7 shows an embodiment having a single polymer interlayer 400. In such embodiments, the hydrophobic silica aerogel sheet 300 can be adhered to one of the two glass sheets 100, 110 (e.g., through van der Waals forces, or by using an optical adhesive). In other embodiments, there are two polymer interlayers. In such embodiments, the hydrophobic silica aerogel sheet is sandwiched between, and laminated to, the two polymer interlayers. In such cases, the polymer interlayers are each in contact with one of the glass sheets on opposite sides of the hydrophobic silica aerogel sheet. In still other embodiments, the polymer interlayer(s) are omitted, and the hydrophobic silica aerogel sheet replaces the interlayer(s).

Other embodiments provide a method of making a laminated glass assembly. Here too, the method comprises forming a hydrophobic silica aerogel sheet according to any method described herein and assembling the hydrophobic silica aerogel sheet together with the first and second glass sheets 100, 110 in forming the laminated glass assembly. The hydrophobic silica aerogel sheet, the glass sheets, and one or more polymer interlayers can be assembled together as part of a laminated glass assembly using any suitable techniques. The lamination process may include various known autoclave glass lamination techniques. In some other cases, the process may include one or more steps described in U.S. Pat. Nos. 7,117,914 and 7,143,800, the teachings of which concerning non-autoclave glass lamination are incorporated herein by reference.

While some preferred embodiments of the invention have been described, it should be understood that various changes, adaptations and modifications may be made therein without departing from the spirit of the invention and the scope of the appended claims.

EMBODIMENTS

1. A method of making a hydrophobic silica wet gel having a density of between 100 mg/cc and 200 mg/cc, comprising the steps of:
   - preparing a first solution by mixing tetramethyl orthosilicate and solvent;
   - preparing a second solution by mixing solvent, ammonium hydroxide and water;
   - mixing the first solution and the second solution together to form a mixed solution;
   - allowing components in the mixed solution to react to form silica wet gel;
   - preparing a third solution by mixing methyltrimethoxysilane and diluent, wherein the third solution comprises the methyltrimethoxysilane in a controlled amount selected to provide a molar ratio of tetramethyl orthosilicate:methyltrimethoxysilane of greater than or equal to 3.7:1 and less than or equal to 9.2:1;
   - adding the third solution to the silica wet gel;
   - allowing the third solution to react with the silica wet gel to form hydrophobic silica wet gel.
2. The method of embodiment 1 wherein the molar ratio of tetramethyl orthosilicate:methyltrimethoxysilane is greater than or equal to 3.8:1 and less than or equal to 6.11:1.
3. The method of embodiment 1 wherein the density of the hydrophobic silica wet gel is between 120 mg/cc and 200 mg/cc and the molar ratio of tetramethyl orthosilicate:methyltrimethoxysilane is greater than or equal to 4.6:1 and less than or equal to 9.2:1.
4. The method of embodiment 3 wherein the molar ratio of tetramethyl orthosilicate:methyltrimethoxysilane is greater than or equal to 4.83:1 and less than or equal to 6.11:1.
5. The method of embodiment 1 wherein the density of the hydrophobic silica wet gel is between 120 mg/cc and 150 mg/cc and the molar ratio of tetramethyl orthosilicate:methyltrimethoxysilane is greater than or equal to 4.6:1 and less than or equal to 6.9:1.
6. The method of embodiment 5 wherein the molar ratio of tetramethyl orthosilicate:methyltrimethoxysilane is greater than or equal to 4.83:1 and less than or equal to 5.79:1.
7. The method of any preceding embodiment wherein the solvent is selected from methanol, ethanol, 2-propanol, acetone, N,N-demethylformadide and demethylsulfoxide.
8. The method of embodiment 7 wherein the solvent is methanol.
9. The method of any preceding embodiment wherein the diluent is methanol.
10. The method of any preceding embodiment further comprising a step of aging the silica wet gel for a time period of at least 7 days (168 hours), at least 8 days (192 hours), at least 9 days (216 hours) or at least 10 days (240 hours) before the step of adding the third solution to the silica wet gel.
11. A hydrophobic silica aerogel having a density of between 100 mg/cc and 200 mg/cc and being synthesized from tetramethyl orthosilicate and methyltrimethoxysilane in a controlled amount selected to provide a molar ratio of tetramethyl orthosilicate:methyltrimethoxysilane of greater than or equal to 3.7:1 and less than or equal to 9.2:1.
12. The hydrophobic silica aerogel of embodiment 11 wherein the molar ratio of tetramethyl orthosilicate:methyltrimethoxysilane is greater than or equal to 3.8:1 and less than or equal to 6.11:1.
13. The hydrophobic silica aerogel of embodiment 11 wherein the density is between 120 mg/cc and 200 mg/cc and the molar ratio of tetramethyl orthosilicate:methyltrimethoxysilane is greater than or equal to 4.6:1 and less than or equal to 9.2:1.

14. The hydrophobic silica aerogel of embodiment 13 wherein the molar ratio of tetramethyl orthosilicate: methyltrimethoxysilane is greater than or equal to 4.83:1 and less than or equal to 6.11:1.
15. The hydrophobic silica aerogel of embodiment 11 wherein the density is 120 mg/cc and 150 mg/cc and the molar ratio of tetramethyl orthosilicate:methyltrimethoxysilane is greater than or equal to 4.6:1 and less than or equal to 6.9:1.
16. The hydrophobic silica aerogel of embodiment 15 wherein the molar ratio of tetramethyl orthosilicate: methyltrimethoxysilane is greater than or equal to 4.83:1 and less than or equal to 6.11:1.
17. The hydrophobic silica aerogel of any preceding embodiment wherein the hydrophobic silica aerogel is in the form of a hydrophobic silica aerogel sheet.
18. The hydrophobic silica aerogel of embodiment 17 wherein the hydrophobic silica aerogel sheet has a thickness of between 2 mm and 5 mm.
19. The hydrophobic silica aerogel of any preceding embodiment wherein the hydrophobic silica aerogel has a visible transmission of at least 97.8% and a haze value of 3% or less, for example a visible transmission of at least 98% and a haze value of 3% or less, a visible transmission of at least 98.6% and a haze value of 2.5% or less, or a visible transmission of at least 99% and a haze value of 2% or less.
20. The hydrophobic silica aerogel of any preceding embodiment wherein the hydrophobic silica aerogel has a shrinkage value of 4% or less, for example 3.5% or less, 3% or less, 2.5% or less, 2% or less or 1.75% or less.
21. The hydrophobic silica aerogel of any preceding embodiment wherein the hydrophobic silica aerogel has a water contact angle of at least 90°, for example at least 100° or at least 110°.
22. A method of making a hydrophobic silica aerogel having a density of between 100 mg/cc and 200 mg/cc, comprising the steps of:
 preparing a first solution by mixing tetramethyl orthosilicate and solvent;
 preparing a second solution by mixing solvent, ammonium hydroxide and water;
 mixing the first solution and the second solution together to form a mixed solution;
 allowing components in the mixed solution to react to form silica wet gel;
 preparing a third solution by mixing methyltrimethoxysilane and diluent, and wherein the third solution comprises the methyltrimethoxysilane in a controlled amount selected to provide a molar ratio of tetramethyl orthosilicate:methyltrimethoxysilane of greater than or equal to 3.7:1 and less than or equal to 9.2:1;
 adding the third solution to the silica wet gel;
 allowing the third solution to react with the silica wet gel to form hydrophobic silica wet gel; and
 drying the hydrophobic silica wet gel to form hydrophobic silica aerogel.
23. The method of embodiment 22 wherein the molar ratio of tetramethyl orthosilicate:methyltrimethoxysilane is greater than or equal to 3.8:1 and less than or equal to 6.11:1.
24. The method of embodiment 22 wherein the density of the hydrophobic silica aerogel is between 120 mg/cc and 200 mg/cc and the molar ratio of tetramethyl orthosilicate:methyltrimethoxysilane is greater than or equal to 4.6:1 and less than or equal to 9.2:1.
25. The method of embodiment 24 wherein the molar ratio of tetramethyl orthosilicate:methyltrimethoxysilane is greater than or equal to 4.83:1 and less than or equal to 6.11:1.
26. The method of embodiment 22 wherein the density of the hydrophobic silica aerogel is between 120 mg/cc and 150 mg/cc and the molar ratio of tetramethyl orthosilicate:methyltrimethoxysilane is greater than or equal to 4.6:1 and less than or equal to 6.9:1.
27. The method of embodiment 26 wherein the molar ratio of tetramethyl orthosilicate:methyltrimethoxysilane is greater than or equal to 4.83:1 and less than or equal to 5.79:1.
28. The method of any preceding embodiment wherein the solvent is selected from methanol, ethanol, 2-propanol, acetone, N,N-demethylformadide and demethylsulfoxide.
29. The method of embodiment 28 wherein the solvent is methanol.
30. The method of any preceding embodiment wherein the diluent is methanol.
31. The method of any preceding embodiment further comprising a step of aging the silica wet gel or the hydrophobic silica wet gel for a time period of at least 7 days (168 hours), at least 8 days (192 hours), at least 9 days (216 hours) or at least 10 days (240 hours) before the step of adding the third solution to the silica wet gel.
32. The method of any preceding embodiment further comprising a step of subjecting the hydrophobic silica wet gel to solvent extraction with methanol for an extraction time period of less than 24 hours.
33. The method of any preceding embodiment wherein the step of drying the hydrophobic silica wet gel to form hydrophobic silica aerogel comprises subjecting the hydrophobic silica wet gel to drying to form the hydrophobic silica aerogel with a shrinkage value of 4% or less, for example 3.5% or less, 3% or less, 2.5% or less, 2% or less or 1.75% or less.
34. The method of any preceding embodiment wherein the step of drying the hydrophobic silica wet gel to form hydrophobic silica aerogel comprises subjecting the hydrophobic silica wet gel to drying to form the hydrophobic silica aerogel with a visible transmission of at least 97.8% and a haze value of 3% or less, for example a visible transmission of at least 98% and a haze value of 3% or less, a visible transmission of at least 98.6% and a haze value of 2.5% or less, or a visible transmission of at least 99% and a haze value of 2% or less.
35. The method of any preceding embodiment wherein the method is devoid of using a surfactant.
36. An article comprising a glass substrate and a hydrophobic silica aerogel sheet, the hydrophobic silica aerogel sheet being adhered to the glass substrate, the hydrophobic silica aerogel sheet having a density of between 100 mg/cc and 200 mg/cc and being synthesized from tetramethyl orthosilicate and methyltrimethoxysilane in a controlled amount selected to provide a molar ratio of tetramethyl orthosilicate:methyltrimethoxysilane of greater than or equal to 3.7:1 and less than or equal to 9.2:1.

37. The article of embodiment 36 wherein the molar ratio of tetramethyl orthosilicate:methyltrimethoxysilane is greater than or equal to 3.8:1 and less than or equal to 6.11:1.
38. The article of embodiment 36 wherein density of the hydrophobic silica aerogel sheet is between 120 mg/cc and 200 mg/cc and the molar ratio of tetramethyl orthosilicate:methyltrimethoxysilane is greater than or equal to 4.6:1 and less than or equal to 9.2:1.
39. The article of embodiment 36 wherein the molar ratio of tetramethyl orthosilicate:methyltrimethoxysilane is greater than or equal to 4.83:1 and less than or equal to 6.11:1.
40. The article of embodiment 36 wherein density of the hydrophobic silica aerogel sheet is between 120 mg/cc and 150 mg/cc and the molar ratio of tetramethyl orthosilicate:methyltrimethoxysilane is greater than or equal to 4.6:1 and less than or equal to 6.9:1.
41. The article of embodiment 40 wherein the molar ratio of tetramethyl orthosilicate:methyltrimethoxysilane is greater than or equal to 4.83:1 and less than or equal to 5.79:1.
42. The article of any preceding embodiment wherein the hydrophobic silica aerogel sheet has a thickness of between 2 mm and 5 mm.
43. The article of any preceding embodiment wherein the hydrophobic silica aerogel sheet has a visible transmission of at least 97.8% and a haze value of 3% or less, for example a visible transmission of at least 98% and a haze value of 3% or less, a visible transmission of at least 98.6% and a haze value of 2.5% or less, or a visible transmission of at least 99% and a haze value of 2% or less.
44. The article of any preceding embodiment wherein the hydrophobic silica aerogel sheet has a haze value of 4% or less, for example 3.5% or less, 3% or less, 2.5% or less, 2% or less or 1.75% or less.
45. The article of any preceding embodiment wherein the hydrophobic silica aerogel sheet has a water contact angle of at least 90°, for example at least 100° or at least 110°.
46. An insulating glazing unit comprising two glass sheets and a between-pane space, the between-pane space being located between the two glass sheets, the insulating glazing unit further comprising a hydrophobic silica aerogel sheet received in the between-pane space, the hydrophobic silica aerogel sheet having a density of between 100 mg/cc and 200 mg/cc and being synthesized from tetramethyl orthosilicate and methyltrimethoxysilane in a controlled amount selected to provide a molar ratio of tetramethyl orthosilicate:methyltrimethoxysilane of greater than or equal to 3.7:1 and less than or equal to 9.2:1.
47. The insulating glazing unit of embodiment 46 wherein the molar ratio of tetramethyl orthosilicate:methyltrimethoxysilane is greater than or equal to 3.8:1 and less than or equal to 6.11:1.
48. The insulating glazing unit of embodiment 46 wherein the hydrophobic silica aerogel sheet has a density of between 120 mg/cc and 200 mg/cc and the molar ratio of tetramethyl orthosilicate:methyltrimethoxysilane is greater than or equal to 4.6:1 and less than or equal to 9.2:1.
49. The insulating glazing unit of embodiment 48 wherein the molar ratio of tetramethyl orthosilicate:methyltrimethoxysilane is greater than or equal to 4.83:1 and less than or equal to 6.11:1.
50. The insulating glazing unit of embodiment 46 wherein the hydrophobic silica aerogel sheet has a density of between 120 mg/cc and 150 mg/cc and the molar ratio of tetramethyl orthosilicate:methyltrimethoxysilane is greater than or equal to 4.6:1 and less than or equal to 6.9:1.
51. The insulating glazing unit of embodiment 50 wherein the molar ratio of tetramethyl orthosilicate:methyltrimethoxysilane is greater than or equal to 4.83:1 and less than or equal to 5.79:1.
52. The insulating glazing unit of any preceding embodiment wherein the hydrophobic silica aerogel sheet has a thickness of between 2 mm and 5 mm.
53. The insulating glazing unit of any preceding embodiment wherein the hydrophobic silica aerogel sheet has a visible transmission of at least 97.8% and a haze value of 3% or less, for example a visible transmission of at least 98% and a haze value of 3% or less, a visible transmission of at least 98.6% and a haze value of 2.5% or less, or a visible transmission of at least 99% and a haze value of 2% or less.
54. The insulating glazing unit of any preceding embodiment wherein the hydrophobic silica aerogel sheet has a haze value of 4% or less, for example 3.5% or less, 3% or less, 2.5% or less, 2% or less or 1.75% or less.
55. The insulating glazing unit of any preceding embodiment wherein the hydrophobic silica aerogel sheet has a water contact angle of at least 90°, for example at least 100° or at least 110°.
56. A laminated glass assembly comprising two glass sheets and a hydrophobic silica aerogel sheet between the two glass sheets, the hydrophobic silica aerogel sheet having a density of between 100 mg/cc and 200 mg/cc and being synthesized from tetramethyl orthosilicate and methyltrimethoxysilane in a controlled amount selected to provide a molar ratio of tetramethyl orthosilicate:methyltrimethoxysilane of greater than or equal to 3.7 and less than or equal to 9.2:1.
57. The laminated glass assembly of embodiment 56 wherein the molar ratio of tetramethyl orthosilicate:methyltrimethoxysilane is greater than or equal to 3.8:1 and less than or equal to 6.11:1.
58. The laminated glass assembly of embodiment 56 wherein the density of the hydrophobic silica aerogel sheet is between 120 mg/cc and 200 mg/cc and the molar ratio of tetramethyl orthosilicate:methyltrimethoxysilane is greater than or equal to 4.6:1 and less than or equal to 9.2:1.
59. The laminated glass assembly of embodiment 58 wherein the molar ratio of tetramethyl orthosilicate:methyltrimethoxysilane is greater than or equal to 4.83:1 and less than or equal to 6.11:1.
60. The laminated glass assembly of embodiment 56 wherein the density of the hydrophobic silica aerogel sheet is between 120 mg/cc and 150 mg/cc and the molar ratio of tetramethyl orthosilicate:methyltrimethoxysilane is greater than or equal to 4.6:1 and less than or equal to 6.9:1.
61. The laminated glass assembly of embodiment 58 wherein the molar ratio of tetramethyl orthosilicate:methyltrimethoxysilane is greater than or equal to 4.83:1 and less than or equal to 5.79:1.
62. The laminated glass assembly of any preceding embodiment wherein the hydrophobic silica aerogel sheet has a thickness of between 2 mm and 5 mm.
63. The laminated glass assembly of any preceding embodiment wherein the hydrophobic silica aerogel sheet has a visible transmission of at least 97.8% and a haze value of 3% or less, for example a visible transmission of at least 98% and a haze value of 3% or less, a visible transmission of at least 98.6% and a haze value of 2.5% or less, or a visible transmission of at least 99% and a haze value of 2% or less.

64. The laminated glass assembly of any preceding embodiment wherein the hydrophobic silica aerogel sheet has a haze value of 4% or less, for example 3.5% or less, 3% or less, 2.5% or less, 2% or less or 1.75% or less.

65. The laminated glass assembly of any preceding embodiment wherein the hydrophobic silica aerogel sheet has a water contact angle of at least 90°, for example at least 100° or at least 110°.

What is claimed is:

1. A method of making a hydrophobic silica aerogel having a density of between 100 mg/cc and 200 mg/cc, comprising the steps of:

preparing a first solution by mixing tetramethyl orthosilicate and solvent;

preparing a second solution by mixing solvent, ammonium hydroxide and water;

mixing the first solution and the second solution together to form a mixed solution;

allowing components in the mixed solution to react to form silica wet gel;

preparing a third solution by mixing methyltrimethoxysilane and diluent, and adding the third solution to the silica wet gel;

allowing the third solution to react with the silica wet gel to form hydrophobic silica wet gel; and drying the hydrophobic silica wet gel to form hydrophobic silica aerogel;

wherein the tetramethyl orthosilicate and methyltrimethoxysilane are provided in a controlled amount selected to provide a molar ratio of tetramethyl orthosilicate:methyltrimethoxysilane of greater than or equal to 3.7:1 and less than or equal to 9.2:1.

2. The method of claim 1 wherein the molar ratio of tetramethyl orthosilicate:methyltrimethoxysilane is greater than or equal to 3.8:1 and less than or equal to 6.11:1.

3. The method of claim 1 wherein the density of the hydrophobic silica aerogel is between 120 mg/cc and 200 mg/cc and the molar ratio of tetramethyl orthosilicate: methyltrimethoxysilane is greater than or equal to 4.6:1 and less than or equal to 9.2:1.

4. The method of claim 3 wherein the molar ratio of tetramethyl orthosilicate:methyltrimethoxysilane is greater than or equal to 4.83:1 and less than or equal to 6.11:1.

5. The method of claim 1 wherein the density of the hydrophobic silica aerogel is between 120 mg/cc and 150 mg/cc and the molar ratio of tetramethyl orthosilicate: methyltrimethoxysilane is greater than or equal to 4.6:1 and less than or equal to 6.9:1.

6. The method of claim 5 wherein the molar ratio of tetramethyl orthosilicate:methyltrimethoxysilane is greater than or equal to 4.83:1 and less than or equal to 5.79:1.

7. The method of claim 1 wherein the solvent is methanol.

8. The method of claim 1 wherein the diluent is methanol.

9. The method of claim 1 further comprising a step of aging the silica wet gel or the hydrophobic silica wet gel for a time period of at least 7 days (168 hours) before the step of adding the third solution to the silica wet gel.

10. The method of claim 1 further comprising a step of subjecting the hydrophobic silica wet gel to solvent extraction with methanol for an extraction time period of less than 24 hours.

11. The method of claim 1 wherein the step of drying the hydrophobic silica wet gel to form hydrophobic silica aerogel comprises subjecting the hydrophobic silica wet gel to drying to form the hydrophobic silica aerogel with a shrinkage value of 4% or less.

12. The method of claim 1 wherein the step of drying the hydrophobic silica wet gel to form hydrophobic silica aerogel comprises subjecting the hydrophobic silica wet gel to drying to form the hydrophobic silica aerogel to have a visible transmission of at least 97.8% and a haze value of 3% or less.

13. The method of claim 1 wherein the method is devoid of using a surfactant.

14. The method of claim 9 wherein the time period for aging the silica wet gel is at least 10 days.

15. The method of claim 11 wherein the hydrophobic silica aerogel formed by drying the hydrophobic silica wet gel has a shrinkage value of 3% or less.

16. The method of claim 15 wherein the hydrophobic silica aerogel formed by drying the hydrophobic silica wet gel has a shrinkage value of 2% or less.

17. The method of claim 16 wherein the hydrophobic silica aerogel formed by drying the hydrophobic silica wet gel has a shrinkage value of 1.75% or less.

18. The method of claim 12 wherein the hydrophobic silica aerogel formed by drying the hydrophobic silica wet gel has a visible transmission of at least 98% and a haze value of 3% or less.

19. The method of claim 18 wherein the hydrophobic silica aerogel formed by drying the hydrophobic silica wet gel has a visible transmission of at least 98.6% and a haze value of 2.5% or less.

20. The method of claim 19 wherein the hydrophobic silica aerogel formed by drying the hydrophobic silica wet gel has a visible transmission of at least 99% and a haze value of 2% or less.

21. The method of claim 1 wherein the step of drying the hydrophobic silica wet gel to form hydrophobic silica aerogel comprises subjecting the hydrophobic silica wet gel to drying to form the hydrophobic silica aerogel with a water contact angle of at least 90°.

22. The method of claim 21 wherein the hydrophobic silica aerogel formed by drying the hydrophobic silica wet gel has a water contact angle of at least 100°.

23. The method of claim 22 wherein the hydrophobic silica aerogel formed by drying the hydrophobic silica wet gel has a water contact angle of at least 110°.

* * * * *